(12) United States Patent
Petrenko et al.

(10) Patent No.: US 7,883,609 B2
(45) Date of Patent: *Feb. 8, 2011

(54) ICE MODIFICATION REMOVAL AND PREVENTION

(75) Inventors: Victor Petrenko, Lebanon, NH (US);
Charles Sullivan, W. Lebanon, NH (US); Lev Deresh, Plainfield, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 1503 days.

This patent is subject to a terminal disclaimer.

(21) Appl. No.: 10/466,940

(22) PCT Filed: Jan. 22, 2002

(86) PCT No.: PCT/US02/01858
§ 371 (c)(1),
(2), (4) Date: Feb. 23, 2004

(87) PCT Pub. No.: WO03/062056
PCT Pub. Date: Jul. 31, 2003

(65) Prior Publication Data
US 2004/0149734 A1    Aug. 5, 2004

Related U.S. Application Data

(60) Continuation-in-part of application No. 10/043,752, filed on Jan. 9, 2002, now Pat. No. 7,138,599, and a continuation-in-part of application No. 09/872,295, (Continued)

(60) Provisional application No. 60/262,775, filed on Jan. 19, 2001, provisional application No. 60/263,943, filed on Jan. 24, 2001, provisional application No. (Continued)

(51) Int. Cl.
*H05B 6/54* (2006.01)
(52) U.S. Cl. .................. 204/242; 219/770; 219/780; 62/80; 62/276
(58) Field of Classification Search ................ 204/242; 219/770, 780; 62/80, 276
See application file for complete search history.

(56) References Cited

U.S. PATENT DOCUMENTS

| 2,496,279 A | 2/1950 | Ely et al. |
| 3,204,084 A | 8/1965 | Spencer, Jr. et al. |
| 3,610,861 A | 10/1971 | Storey et al. |

(Continued)

FOREIGN PATENT DOCUMENTS

| EP | 1168888 | 1/2002 |
| JP | 411332074 | 11/1999 |
| WO | WO 95/30495 | 11/1995 |

OTHER PUBLICATIONS

Courville, Zoe and Petrenko, V.F., "De-icing Layers of Interdigitated Microelectrodes," Mat. Res. Soc. Symp. Proc. 2000, vol. 604, pp. 329-334.

*Primary Examiner*—Arun S Phasge
(74) *Attorney, Agent, or Firm*—Lathrop & Gage LLP

(57) ABSTRACT

An alternating electric field is applied to ice (530) to generate a resistive AC having a frequency greater than 1000 Hz in interfacial ice at interface (554). A first electrode (510) and a second electrode (514) proximate to the interface are separated by an electrical insulator (512). An AC power source (520) provides a voltage of about 10 to 500 volts across the electrodes to create the alternating electric field. A portion of the capacitive AC associated with the alternating electric field is present in the interfacial ice as conductivity (resistive) AC, which causes dielectric loss heating in the interfacial ice.

33 Claims, 45 Drawing Sheets

Related U.S. Application Data

(60) filed on Jun. 1, 2001, which is a continuation-in-part of application No. 09/426,685, filed on Oct. 25, 1999, which is a division of application No. 09/094,779, filed on Jun. 15, 1998, now Pat. No. 6,027,075, application No. 10/466,940, which is a continuation-in-part of application No. 09/971,287, filed on Oct. 4, 2001, which is a continuation-in-part of application No. 09/426,685, filed on Oct. 25, 1999, which is a division of application No. 09/094,779, filed on Jun. 15, 1998, now Pat. No. 6,027,075, application No. 10/466,940, which is a continuation-in-part of application No. 09/970,555, filed on Oct. 4, 2001, which is a continuation-in-part of application No. 09/426,685, filed on Oct. 25, 1999, which is a division of application No. 09/094,779, filed on Jun. 15, 1998, now Pat. No. 6,027,075, which is a continuation-in-part of application No. PCT/US00/35529, filed on Dec. 28, 2000, application No. 10/466,940, which is a continuation-in-part of application No. 09/976,210, filed on Oct. 11, 2001, and a continuation-in-part of application No. 09/426,685, filed on Oct. 25, 1999, which is a division of application No. 09/094,779, filed on Jun. 15, 1998, now Pat. No. 6,027,075, application No. 10/466,940, which is a continuation-in-part of application No. PCT/US00/35529, filed on Dec. 28, 2000, and a continuation-in-part of application No. 09/426,685, filed on Oct. 25, 1999, which is a division of application No. 09/094,779, filed on Jun. 15, 1998, now Pat. No. 6,027,075, application No. 10/466,940, which is a continuation-in-part of application No. PCT/US00/05665, filed on Mar. 1, 2000, and a continuation-in-part of application No. PCT/US99/28330, filed on Nov. 30, 1999, and a continuation-in-part of application No. PCT/US99/25124, filed on Oct. 26, 1999.

(60) 60/272,747, filed on Mar. 1, 2001, provisional application No. 60/283,670, filed on Apr. 12, 2001, provisional application No. 60/299,693, filed on Jun. 20, 2001, provisional application No. 60/347,699, filed on Jan. 11, 2002, provisional application No. 60/173,920, filed on Dec. 30, 1999, provisional application No. 60/122,463, filed on Mar. 1, 1999, provisional application No. 60/105,782, filed on Oct. 27, 1998, provisional application No. 60/131,082, filed on Apr. 26, 1999, provisional application No. 60/110,440, filed on Dec. 1, 1998.

(56) References Cited

U.S. PATENT DOCUMENTS

| | | | |
|---|---|---|---|
| 3,790,752 A | 2/1974 | Boaz et al. | |
| 4,137,447 A | 1/1979 | Boaz | |
| 4,278,875 A | 7/1981 | Bain | |
| 4,296,298 A | 10/1981 | Macmaster et al. | |
| 4,321,296 A | 3/1982 | Rougier | |
| 4,732,351 A | 3/1988 | Bird | |
| 4,737,618 A | 4/1988 | Barbier et al. | |
| 4,974,503 A | 12/1990 | Koch | |
| 5,398,547 A | 3/1995 | Gerardi et al. | |
| 5,441,305 A | 8/1995 | Tabar | |
| 5,496,989 A | 3/1996 | Bradford et al. | |
| 5,523,959 A | 6/1996 | Seegmiller | |
| 6,027,075 A | 2/2000 | Petrenko | |
| 6,031,214 A | 2/2000 | Bost et al. | |
| 6,239,601 B1 | 5/2001 | Weinstein | |
| 6,427,946 B1 | 8/2002 | Petrenko | |
| 6,550,508 B1 | 4/2003 | Yamaguchi et al. | |
| 6,653,598 B2 | 11/2003 | Petrenko et al. | |
| 6,684,647 B2 * | 2/2004 | Petrenko | 62/80 |
| 6,723,971 B1 | 4/2004 | Petrenko et al. | |
| 6,832,742 B2 | 12/2004 | Petrenko | |
| 7,087,876 B2 * | 8/2006 | Petrenko | 219/770 |

* cited by examiner

AIR, T = 22° C

ICE MODIFICATION REMOVAL AND PREVENTION

PRIORITY

This application claims priority to: U.S. provisional application Ser. No. 60/262,775, filed 19 Jan. 2001; U.S. provisional application Ser. No. 60/263,943, filed 24 Jan. 2001; U.S. provisional application Ser. No. 60/272,747, filed 1 Mar. 2001; U.S. provisional application Ser. No. 60/283,670, filed 12 Apr. 2001; U.S. patent application Ser. No. 09/872,295, filed 1 Jun. 2001; U.S. provisional application Ser. No. 60/299,693, filed 20 Jun. 2001; U.S. patent application Ser. No. 09/971,287, filed 4 Oct. 2001; U.S. patent application Ser. No. 09/970,555, filed 4 Oct. 2001; U.S. patent application Ser. No. 09/976,210, filed 11 Oct. 2001; U.S. patent application entitled Plasma-Based De-Icing, Ser. No. 10/043,752, filed 9 Jan. 2002 under Express Mail label EL820327193US; U.S. provisional application entitled Melting And Prevention Of Freezer Ice With High-Frequency Electric Field, Ser. No. 60/347,699, filed 11 Jan. 2002 under Express Mail label EL743675605US.

RELATED APPLICATIONS

This application claims the benefit of U.S. provisional application Ser. No. 60/299,693, filed Jun. 20, 2001, of U.S. provisional application Ser. No. 60/283,670, filed Apr. 12, 2001, of U.S. provisional application Ser. No. 60/272,747, filed Mar. 1, 2001, of U.S. provisional application Ser. No. 60/263,943, filed Jan. 24, 2001, and of U.S. provisional application Ser. No. 60/262,775, filed Jan. 19, 2001, and of U.S. provisional application entitled Melting And Prevention Of Freezer Ice With High-Frequency Electric Field, Ser. No. 60/347,699, filed Jan. 11, 2002 under Express Mail label EL743675605US.

This application is also a continuation-in-part application of commonly-owned and U.S. patent application entitled Plasma-Based De-Icing, Ser. No. 10/043,752, filed Jan. 9, 2002, now U.S. Pat. No. 7,138,599 under Express Mail label EL820327193US. This application is also a continuation-in-part application of commonly-owned and copending U.S. patent application Ser. No. 09/872,295, filed Jun. 1, 2001, which is a continuation-in-part application of commonly-owned and copending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000. This application is also a continuation-in-part application of commonly-owned and copending U.S. patent application Ser. No. 09/971,287, filed Oct. 4, 2001, which is a continuation-in-part application of commonly-owned and copending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000; and which is also a continuation-in-part application of commonly-owned PCT application PCT/US00/35529, filed 28 Dec. 2000, which claims the benefit of U.S. provisional application Ser. No. 60/173,920, filed Dec. 30, 1999, now abandoned. This application is also a continuation-in-part application of commonly-owned and copending U.S. patent application Ser. No. 09/970,555, filed Oct. 4, 2001, which is a continuation-in-part application of commonly-owned and co-pending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000. This application is also a continuation-in-part application of commonly-owned PCT application PCT/US00/35529, filed 28 Dec. 2000, which claims the benefit of U.S. provisional application Ser. No. 60/173,920, filed Dec. 30, 1999, now abandoned. This application is also a continuation-in-part application of commonly-owned and copending U.S. patent application Ser. No. 09/976,210, filed Oct. 11, 2001, is also a continuation-in-part application of commonly-owned and co-pending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000. This application is also a continuation-in-part application of commonly-owned PCT application PCT/US00/35529, filed 28 Dec. 2000, which claims the benefit of U.S. provisional application Ser. No. 60/173,920, filed Dec. 30, 1999, now abandoned. This application is also a continuation-in-part application of commonly-owned and copending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000. This application is also a continuation-in-part application of commonly-owned PCT application PCT/US00/05665, filed 1 Mar. 2000, which claimed the benefit of U.S. provisional application Ser. No. 60/122,463, filed 1 Mar. 1999, now abandoned, and provisional application Ser. No. 60/131,082, filed 26 Apr. 1999, now abandoned, and which is a continuation-in-part application of commonly-owned PCT application PCT/US99/28330, filed 30 Nov. 1999, which claims the benefit of U.S. provisional application Ser. No. 60/110,440, filed Dec. 1, 1998, now abandoned, the benefit of U.S. provisional application Ser. No. 60/122,463 filed Mar. 1, 1999, now abandoned, and the benefit of U.S. provisional application Ser. No. 60/131,082 filed Apr. 26, 1999, now abandoned. This application is also a continuation-in-part application of commonly-owned PCT application PCT/US99/28330, filed 30 Nov. 1999, which claims the benefit of U.S. provisional application Ser. No. 60/110,440, filed Dec. 1, 1998, now abandoned, the benefit of U.S. provisional application Ser. No. 60/122,463 filed Mar. 1, 1999, now abandoned, and the benefit of U.S. provisional application Ser. No. 60/131,082 filed Apr. 26, 1999, now abandoned. This application is also a continuation-in-part application of commonly-owned copending PCT application PCT/US99/25124, filed 26 Oct. 1999, which claims the benefit of U.S. provisional application Ser. No. 60/105,782, filed 27 Oct. 1998, now abandoned, each of which is hereby incorporated by reference.

GOVERNMENT LICENSE RIGHTS

The U.S. Government has certain rights in this invention as provided for by the terms of Grant No. DAAH 04-95-1-0189, awarded by the Army Research Office, and of Grant No. MSS-9302792, awarded by the National Science Foundation.

FIELD OF THE INVENTION

The invention is related to the field of ice modification, specifically, to the prevention and removal of ice, and the modification of physical properties of ice.

BACKGROUND OF THE INVENTION

Statement of the Problem

Ice accumulation on aircraft wings endangers the plane and its passengers. Ice on ship hulls causes navigational difficulties, expenditure of additional power to navigate through water and ice, and unsafe conditions. Ice on windshields and windows of motor vehicles decreases driver visibility and safety. Accumulations of ice formed by the condensation and freezing of water on the outside surfaces of heat exchangers in freezers reduces heat transfer efficiency and often results in physical damage to cooling coils.

Ice adhesion to freezer packages also causes problems. Food, medical and biological materials, and other materials often are stored below the freezing temperature of water. The material is typically stored in freezer bags and various other types of freezer packages. Water vapor that condenses in a freezer and water from other sources freezes between the packages. As a result, adjacent packages are stuck together by ice adhering to adjacent outside surfaces of packages. Individual packages frozen to one or more other packages cannot be moved individually unless the ice is melted. Melting the ice to separate the packages raises the temperature of the material contained in the packages. This often results in undesired thawing of food, or otherwise raising the temperature of a package's contents above an undesired or a critical temperature. Therefore, the package's contents may be destroyed or rendered useless. Melting all of the ice between a large number of packages in a freezer by raising the freezer temperature causes downtime and an accumulation of liquid water, which must be removed from the freezer separately.

Ice on power transmission lines adds weight to the power lines causing them to break. In addition to the costs of repair, the resulting power outages cause billions of dollars in direct and indirect economic damage. The large surface areas of power transmission lines exposed to icing conditions and the remoteness of many power lines require de-icing systems that are both reliable and have low costs per unit distance.

Cableways, bridges, towers and other structures are exposed to wide ranges and varying conditions of temperature, humidity and precipitation that lead to the formation and buildup of ice. Ice interferes with smooth and efficient operation of cableways. Ice on cables and associated structures frequently cause expensive damage. Deposits of ice and snow on structures such as cableways, bridges, and towers cause system malfunctions. Ice on cableways and towers poses safety risks. For example, deposits of snow and ice that accumulate on ski-lift cables and other ski-lift structures and break off at elevated places pose a risk of falling on people below.

Problems associated with ice are particularly obvious with respect to land-based surfaces in transportation systems, such as roads and highways, bridges, parking lots, sidewalks, airport runways, train tracks. Ice on roads and bridges is frequently a cause of automobile accidents resulting in personal injury and death, as well as material damage. Ice on airport runways causes delays in air traffic. Large amounts of material resources, money and man-hours are spent annually to remove ice and snow from roads and other transportation-related surfaces to clear them for use and to reduce risks of slipping and skidding on iced surfaces.

Effects of DC electrical fields on friction between ice and a "slider" have been reported in the literature. See, for example, "The effect of static electric field on ice friction", V. Petrenko, *Journal of Applied Physics,* 76 (2), 1994; "Electromechanical Phenomena in Ice", V. Petrenko, Special Report 96-2, US Army Corps of Engineers CRREL, 1996. The experiments reported in these publications were restricted to DC electric fields. Also, these publications did not teach practical uses of electric fields to increase friction between a solid surface and ice.

Conventional heating systems to remove ice and snow have high, sometimes economically unfeasible, power requirements. Application of chemical agents to remove ice has temporary effects, is limited to relatively small surface areas, and is labor and equipment intensive. Once ice has formed on surfaces, it may be difficult to remove. Also, some applications require the prevention of ice in the first place. Growth of even 1 mm of ice at certain locations on airplane wings and helicopter blades seriously decreases their performance. Other examples include ice growth on windshields of airplanes and automobiles and on the outside of freezer coils, which have a low level of tolerance to even thin layers of ice.

SUMMARY OF THE INVENTION

The invention helps to solve some of the problems mentioned above by providing systems and methods for preventing ice, removing ice, and modifying the adhesion strength between ice and other surfaces.

In one aspect, the invention helps to solve some of the problems mentioned above by providing systems and methods for melting interfacial ice at an ice interface. Systems and methods in accordance with the invention are particularly applicable for alleviating optical interference associated with the presence of ice on transparent surfaces, such as windows and windshields. Nevertheless, systems and methods in accordance with the invention are generally applicable for removing ice, in particular for deicing surfaces of solid objects. For example, embodiments in accordance with the invention are particularly useful for preventing and removing ice on freezer coils and on freezer packages.

In another aspect, a high-frequency alternating electric field (AEF") is generated at an ice interface to melt interfacial ice. In still another aspect, an AC voltage is applied across a first electrode and a second electrode to generate a high-frequency AEF. In one aspect, a system for melting interfacial ice includes a first electrode and a second electrode. In another aspect, an electrical insulator is disposed in the interelectrode space between electrodes. For example, in certain embodiments, a nonconductive rubber windshield wiper blade is located in the interelectrode space between electrodes. In another aspect, an AC power source provides the AC voltage across the first and second electrodes. Typically, an AC power source provides an AC voltage in a range of about from 10 volts to 500 volts. Preferably, the AC voltage has a frequency greater than 1000 Hz. Preferably, the ice-solid interface is located in the interelectrode space. The interelectrode distance typically has a value in a range of about from 50 μm to 500 μm. In certain embodiments, the interelectrode distance has a value less than 50 μm since an interelectrode distance as small as possible is preferred. In other embodiments, the interelectrode distance has a value greater than 500 μm.

In another aspect, a system for both preventing ice and for melting ice on and between freezer packages includes a first electrode and a second electrode, which define an interelectrode space for accommodating a freezer package. In another aspect, a system in accordance with the invention includes an AC power source for providing an AC voltage across the first and second electrodes. Typically, the AC voltage is a high-frequency voltage, with a frequency not less than about 1000 Hz. Preferably, the AC voltage has a frequency in a range of about from 10 kHz to 30 kHz. In still another aspect of the invention, the AC voltage does not significantly heat the contents of the freezer package. Typically, the AC voltage has an amplitude in a range of about from 10 volts to 10 kilovolts, but the voltage exceeds 10 kV in certain conditions. In one aspect, a system further includes a freezer package located in the interelectrode space. In another aspect, heating of the contents of a freezer package is insignificant, amounting generally to less than 1 calorie per gram, and typically less than 1/10 calorie per gram. In another aspect of the invention, a system further includes a plurality of freezer packages arranged in a stack with a first freezer package proximate to the first electrode, and a last freezer package proximate to the second electrode, each of the plurality of freezer packages including an outer dielectric film and a continuous inner conductive layer contiguous to the outer dielectric film. A freezer package in accordance with the invention is useful for holding a variety of types of contents; for example, food and biological materials.

In another aspect, the invention further includes a freezer with a housing, and a first electrode and a second electrode that define an interelectrode space. Preferably, the first electrode is movable.

In another aspect, a system in accordance with the invention for melting and preventing ice using a high-frequency AEF includes a plurality of first electrodes and a plurality of second electrodes, wherein the first electrodes alternate with the second electrodes, and wherein the interelectrode distance between adjacent first and second electrodes is in a range of about from 100 μm to 2 cm. In another aspect, the first electrodes and the second electrodes are interdigitated. In still another aspect, interdigitated first and second electrodes are disposed on a surface of a solid object. In another aspect, the invention is useful for protecting various types of surfaces; for example, a cooling coil and other surfaces of a heat exchanger, an interior of a freezer, an external surface of an aircraft, an external surface of a ship, and a transportation surface. In one aspect, the first electrodes and the second electrodes include heat exchanger fins. In another aspect, each side surface of the first electrode fins and second electrode fins has a surface area in a range of about from 1 $cm^2$ to 100 $cm^2$. In another aspect, the first electrode fins are physically connected to a cooling coil and are electrically connected to ground, and the second electrode fins are electrically connected to the AC power source.

In another aspect, the AC power source provides a voltage in a range of about 250 volts (rms) to 2.5 kV (rms). In still another aspect, the AC power source generates an AEF in a plurality of interelectrode spaces having a field strength in a range of about from 100 V/cm to 100 kV/cm. In one aspect, the AC power source provides a voltage greater than 10 V. In another aspect, the AC power source provides a voltage greater than 2 kV. In another aspect, the AC power source provides a voltage having a frequency greater than 1000 Hz. In another aspect, the AC power source provides a voltage having a frequency in a range of about from 100 Hz to 100 MHz. In another aspect, the AC power source provides power in a range of about from 1 $W/m^2$ to 50 $kW/m^2$ of surface area protected against ice.

In another aspect, a system in accordance with the invention includes an electrode grid having a plurality of first electrode wires and second electrode wires separated by a grid spacing in a range of about from 0.05 mm to 20 mm. In another aspect, the first electrode wires and second electrode wires are coated with an insulating layer that separates the wires electrically. A high-frequency electric field in accordance with the invention typically has a field strength in a range of about from 100 V/cm to 100 kV/cm and a frequency not less than 100 Hz.

In another basic embodiment of the invention, a system for melting ice includes a gas-filled layer that includes a plasma-forming gas, which is selected to form a plasma in an alternating electric field. In one aspect, a system includes an electrical conductor for generating an AEF in response to an AC voltage. In another aspect, the gas-filled layer is proximate to the electrical conductor so that the AEF is sufficiently strong to cause electric breakdown and plasma formation in the gas-filled layer. The plasma-forming gas may be air, nitrogen, argon or other gas. The electric breakdown discharges electrostatic energy through the plasma in the gas-filled layer. Because the plasma is conductive, the discharge of electric energy through the plasma generates resistive AC, which heats the plasma and melts the ice.

In one aspect, the alternating electric field ("AEF") has sufficient field strength to cause electrical breakdown of air (or other plasma-forming gas in the gas-filled layer) and thereby to generate a plasma in the gas-filled layer. In another aspect, the strength of the AEF in and near the gas-filled layer is increased by the presence of an electrically conductive layer. In still another aspect in accordance with the invention, the gas-filled layer containing plasma-forming gas preferably is located between the electrical conductor and a conductive layer. Because the conductive layer is much more conductive than air (or other ambient gas), the voltage drop across the gas-filled layer between the electrical conductor and the conductive layer is much higher than in the surrounding air, increasing the electric field strength between the electrical conductor and the conductive layer. Typically, the conductive layer is an ice layer.

In another aspect, the electrical conductor is a main conductor of a power transmission line. Typically, the electrical conductor conducts an AC at a voltage capable of generating an AEF having a strength in a range of about from 1 to 100 kV/cm. The AC typically has a frequency in a range of about from 50 Hz to 1 MHz, or higher. Generally, the voltage in the electrical conductor is in a range of about from 10 kV to 1300 kV. The gas-filled layer typically has a thickness in a range of about from 0.5 to 10 mm. In another aspect, an embodiment in accordance with the invention may further include an outer shell, the gas-filled layer being disposed between the electrical conductor and the outer shell. In another aspect, the gas filled layer may include gas-containing balls. In still another aspect, a flexible band contains a gas-filled layer, and the flexible band covers a surface being deiced.

Systems and methods in accordance with another basic embodiment of the invention de-ice components of cableway systems and other structures by melting ice in high-frequency alternating electric fields through dielectric loss heating. In certain aspects, an electrical conductor is disposed proximate to a cableway or other object to to be protected against icing. A high-frequency AC voltage provided in the electrical conductor creates a high-frequency alternating electric field ("AEF") possessing capacitive AC. The capacitive AC (displacement current) associated with the AEF in air flows through ice on the surface of the cableway system component. A portion of the current flows through the ice capacitively, and a portion of the current flows through the ice resistively (conductively). The resistive AC flowing through the ice generates Joule heat, which melts the ice. Thus, ice absorbs capacitive energy in the AEF, transforming it into heat that melts ice.

In one aspect, a system for de-icing a surface of a cableway system component includes an electrical conductor proximate to the surface, and an AC power source for providing a high-frequency AC voltage in the electrical conductor. Preferably, the AC power source supplies power having a frequency in a range of about from 60 kHz to 100 kHz and a voltage in a range of about from 3 to 15 kV.

Numerous factors affect the dielectric loss heating of the ice. Generally, increasing voltage increases the strength of the AEF, thereby increasing the capacitive energy of the AEF. Increasing voltage increases the total current associated with the AEF. Increasing frequency also increases the total amount of AC flowing through ice. Typically, the electrical conductor is an electrically conducting cable. An advantage of one aspect of the invention is that the electrical conductor and the cableway system component, which preferably functions as electrical system ground, are disposed relatively close to each other. Typically, the electrical conductor is disposed in a range of from 0 to 30 cm from the surface of the cableway system component acting as electrical ground. Commonly, the surface of a cableway is being protected against ice and snow. In another common application of the invention, the surface of a cableway system tower is protected. Preferably, the cableway system component being protected against ice functions as an electrical sink, or electrical ground. Another aspect of the invention may include a separate electrical sink, with the surface of the cableway system component preferably located between the electrical conductor and the electrical sink. In another aspect of the invention, the electrical conductor is electrically insulated from electrical ground. In typical embodiments, therefore, in which a cableway system component being protected serves as electrical ground, the electrical conductor is electrically insulated from the cableway system component, that is, from the cableway, cableway system tower or other component.

Further, dielectric loss heating may be combined with skin-effect ("induction") heating at high frequency to melt ice and snow on cableways. Other aspects of the invention may include a means for frequency-tuning the high-frequency AC voltage to match the standing-wave effects of ice-dielectric heating and the skin-effect heating resulting from high-frequency current flow in a conductor. An aspect of the invention may also include a means for varying the AC frequency to change the heating pattern produced by standing wave effects of ice-dielectric heating and skin-effect heating, thereby providing sufficient heat at all locations at various times to prevent icing.

In another aspect, the present invention helps to solve some of the problems mentioned above by de-icing elongated objects, in particular, cableways by flowing electric current through conductors. Through separate electrical connections to one or more power sources, a cableway or other elongated conductor is electrically divided into branches of parallel circuit or into separate circuits. As a result, de-icing is accomplished at a lower voltage than if heating work performed in series. Through switching, one or more separate segments of a cableway or other elongated conductor are connected to a power source, while one or more other segments are disconnected from power, thereby reducing power requirements. Through utilization of one or more transformers, high-voltage low-current power is transported near to its point of use, where it is then transformed to low-voltage power, which is safer to humans.

In still other aspects, certain embodiments of the invention help to solve some of the problems mentioned above by utilizing electrolysis to modify the adhesion strength of ice to surfaces of solids. Systems and methods in accordance with the invention are particularly applicable to problems associated with ice and surfaces in the field of transportation. Nevertheless, systems and methods in accordance with the invention are generally applicable to reduce problems caused by ice.

In one aspect, first and second electrodes define an interelectrode space between the electrodes. When conductive water fills the interelectrode space between the electrodes, the water completes an electrical circuit including the two electrodes. A DC or low-frequency AC is applied, causing electrolysis of the water molecules and formation of gas bubbles that reduce ice adhesion. Water in the electrode space providing electrical connection between the electrodes may be ice or liquid water. The interelectrode distance typically does not exceed 10 mm. Preferably, the interelectrode distance has a value in a range of about from 0.5 to 10 mm. The power source is typically capable of providing a voltage in a range of about from 2 to 100 volts. The current density in the water in the interelectrode space at the electrodes has a value in a range of about from 0.1 to 10 mA/cm$^2$.

In other aspects, the invention helps to solve some of the problems mentioned above by preventing the freezing of a liquid water layer and the formation of ice. In preferred embodiments, AC power is utilized, instead of DC power, thereby avoiding some of the disadvantages associated with DC power and utilizing readily available AC power.

When conductive water fills the interelectrode space between the electrodes, the water completes an electrical circuit including the two electrodes. Preferably, the power source provides an AC voltage having a frequency in a range of from 15 Hz to 1 kHz. The interelectrode distance generally does not exceed 3 mm. Typically, the interelectrode distance does not exceed 500 μm ("microns", micrometers). Preferably, the interelectrode distance does not exceed 100 μm, and most preferably, it does not exceed 10 μm. When the thickness of the interelectrode distance is very small, that is, not greater than 100 μm, the voltage of the AC power source is generally in a range of from 0.1 to 100 volts, preferably in a range of from 5 to 25 volts. When the interelectrode distance does not exceed 100 μm, then suitable prevention of ice formation is typically achieved when the current density in a liquid water layer in the interelectrode space is in a range of from 1 to 100 mA/cm$^2$.

Electrodes in accordance with the invention have various shapes. For example, a first electrode or a second electrode may have the shape of, among others, a point or sphere, a line, a strip or a surface-conforming layer.

Other embodiments in accordance with the invention help to solve some of the problems mentioned above by providing systems and methods for modifying the friction force between ice and the surfaces of solids. In one aspect, friction between a solid object and a layer of ice is increased by generating a strong electric field at the contact interface of the solid and the ice. Increasing friction is particularly applicable to problems associated with ice and surfaces in the field of automotive transportation; however, systems and methods in accordance with the invention are generally applicable to reduce problems caused by skidding, slipping and sliding on ice.

A strong electric field at the contact interface is generated in a system including a plurality of electrodes. The electrodes are located proximate to the contact interface. A power source is electrically connected to the electrodes for providing a potential difference across the electrodes to generate an electric field at the contact interface. The electric field strength at the contact interface typically has a value in a range of from 100 V/cm to $10^5$ V/cm. Preferably, an AC power source provides the potential difference to generate an AC electric field at the contact interface. Typically, the AC electric field has a frequency not exceeding 1000 Hz. Preferably, the AC electric field has a frequency not exceeding 200 Hz. More preferably, the AC frequency is in a range of about 5 to 100 Hz. An advantage of a system and a method in accordance with the invention is that relatively low-frequency power may be used to generate an AC electric field at the contact interface. Alternatively, the power source may be a DC power source.

In embodiments in accordance with the invention, the interelectrode spacing separating oppositely polarized electrodes is preferably as small as possible. Generally, the electrodes are separated from each other by an interelectrode spacing not exceeding 10 mm. Preferably, the interelectrode spacing does not exceed 100 micrometers (μm). The electrodes may be interdigitated. Also, the electrodes should be at or as close as possible to the contact interface of the surfaces of the solid object and the ice. In one aspect, the region between electrodes corresponding to the interelectrode spacing contains electrically insulating material so that the voltage difference across the electrodes generates a strong electric field.

Embodiments for increasing friction in accordance with the invention are useful in a wide variety of situations. For example, the solid object may be, among others, a rubber tire, a wheel of a rail vehicle, a track of a tracked vehicle, a shoe sole, or a snow ski.

The power source provides a voltage in a range of about 1 to 5000 volts, but more commonly in a range of about 5 to 2000 volts. Preferably, a power source providing a voltage not exceeding 500 volts generates a sufficiently strong electric field at the contact interface to increase friction. Under preferred conditions, when the interelectrode spacing is less than one mm, and the electrodes are located within one mm of the contact interface, a voltage in a range of about 5 to 100 volts is effective.

In preferred embodiments, only a small group of electrode pairs, which are proximate to the ice-solid contact interface, are electrically connected to the power source, while electrodes that are not proximate to the contact interface are not electrically connected to the AC power source. Various types of switching mechanisms are useful for connecting and disconnecting the AC power source to electrodes. In tires, for example, the electrical connection may be achieved with slip rings that are similar to the slip rings used in electromotors. (In electromotors, the slip rings provide connections of the rotor coils that are directly opposed to the static electromagnets.) Another feature in preferred embodiments is an additional impedance between the AC power source and the electrodes to limit AC at the electrodes. Typically, a capacitor is located in series between the AC power source and the electrodes.

DETAILED DESCRIPTION OF THE INVENTION

Figure 1:
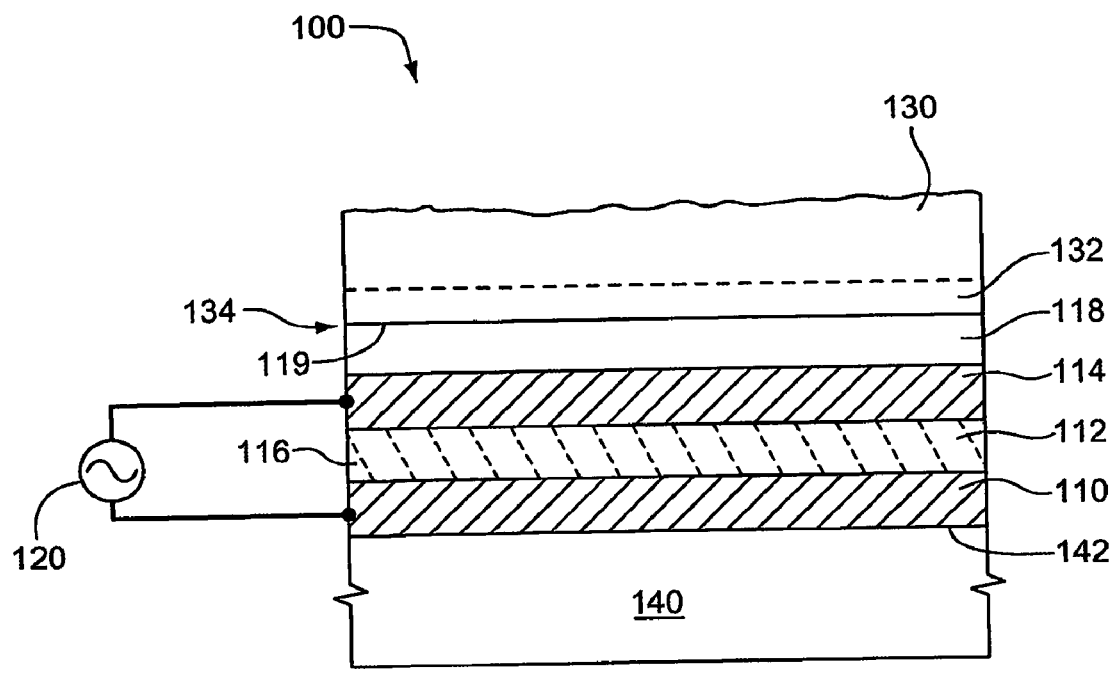
FIG. 1 depicts a generalized system in accordance with the invention in which an AC power source generates an alternating electric field in interfacial ice at an ice-solid interface.

The embodiments described herein are exemplary and are not intended to limit the scope of the invention, which is defined in the claims below.

The term "de-icing" is used in a general sense in this specification. It refers to systems and methods for removing ice and snow. It also refers to preventing the formation of ice and snow altogether, as well as preventing significant deposits of ice and snow. It also refers to melting of snow and ice. Throughout this specification, reference is often made to "ice". The term "ice" refers generally to all forms of frozen water, including snow.

Certain embodiments utilizing the dielectric properties of ice in a high-frequency AEF to generate Joule heating in interfacial ice are described herein use in FIGS. 1-10, mainly with reference to windshields. It is understood, however, that systems and methods in accordance with the invention are useful for deicing surfaces of solids in many different applications; for example, the deicing of airplane wings, ship surfaces, roads and highways, bridges, parking lots, sidewalks, airport runways, train tracks, freezer coils, and freezer packages, among others.

In one aspect, a high-frequency alternating electric field ("AEF") is provided at an ice interface. Practically, the AEF usually has a frequency greater than 1000 Hz. Typically, a high-frequency AC voltage is applied across a first electrode and a second electrode in order to generate the AEF. The AC voltage and the AEF preferably have a frequency not less than 10 kHz. Typically, the ice interface is an ice-solid contact interface at the outside surface of a solid object being protected; for example, the outside surface of a windshield covered by a layer of ice. Therefore, the AEF is generated preferably at or near the ice-solid contact interface to maximize AEF strength at the contact interface.

The AEF contains capacitive AC energy in the form of capacitive AC. Ice is semiconductive at low frequencies; for example, at 50 Hz. The electrical conductivity of ice increases as AC frequency increases. AC associated with the AEF is present in the ice. A significant portion of the AC in the interfacial ice is conductivity (resistive) AC. The resistive AC flowing through the interfacial ice generates Joule heat in the interfacial ice. The Joule heat causes the interfacial ice at the contact interface to melt. The term "contact interface" is used generally herein to denote a region in which a surface of a solid object and the surface of ice are adjacent and contiguous to each other. It is understood that an ice-solid contact interface typically includes air gaps and voids and perhaps areas occupied by a liquid-like water layer, as well as areas of actual physical contact between the solid and the ice.

The Joule heating power generated in interfacial ice and a high-frequency AEF is:

$$W_h = \rho_{if} j^2 \quad (1)$$

where $W_h$ is the heating power per m³, $\rho_{if}$ is interfacial ice electric resistivity, and j is the current density. Substitution of values for the resistivity of water and bulk ice into Equation (1) yields an expression for the heating power in liquid water and in bulk ice, respectively.

For a given voltage, the heating power delivered to ice in an AEF is a function of the electrical conductivity of the ice. The conductivity of interfacial ice is significantly higher than the conductivity of bulk ice. For example, in an interdigitated circuit in which the interelectrode distance, d, is the same as the width of the interdigitated electrodes, the ratio of the surface conductance, $G_s$, to the bulk conductance, $G_B$, is $$\frac{G_s}{G_B} \approx \frac{3}{2} \cdot \frac{\sigma_s}{\sigma_B \cdot d} \quad (2)$$

where $\sigma_s$ is the conductivity at the interfacial ice surface, and $\sigma_B$ is ice bulk conductivity. Using experimental data for pure ice at −10° C. and a value of d=10⁻⁴ m (i.e., 100 µm) yields:

$$\frac{G_s}{G_B} = \frac{3}{2} \cdot \frac{10^{-8}}{3 \cdot 10^{-10} \cdot 10^{-4}} = 5 \cdot 10^4 \text{ at } f = 10 \text{ Hz} \quad (3)$$

and $$\frac{G_s}{G_B} = \frac{3}{2} \cdot \frac{10^{-7}}{2 \cdot 10^{-5} \cdot 10^{-4}} = 7.5 \cdot 10^3 \text{ at } f = 10 \text{ kHz} \quad (4)$$

As a result, conductivity (resistive) AC concentrates in the interfacial ice, resulting in much higher Joule heating of interfacial ice compared to bulk ice. Thus, an advantage of the invention is that heating power is focused at the ice interface.

Ice at the interface is heated and melted, with very little heat energy dissipated in the bulk ice.

Current density is proportional to alternating electric field strength, which can be expressed by the equation $$E = V/d \qquad (5)$$

where E represents AEF strength, V represents average potential difference, and d represents the distance between conductors having potential difference V. For a given value of resistivity, $\rho_{if}$, and for a given potential difference, V, the heating power, $W_h$, is inversely proportional to $d^2$. Thus, an increase in the value of d by a factor of 10, reduces the electric field strength and $W_h$ by a factor of approximately 100.

Joule heating of a material is effective when the material is semiconductive, that is, when the material possesses a moderate conductivity and a moderate resistivity. As expressed in Equation (1) above, for a given field strength, the heating power delivered to ice is a function of the current density of conductivity AC. An increase in conductivity of a material in an alternating electric field increases current density. The conductivity of interfacial ice is significantly higher than the conductivity of bulk ice. As a result, electrical current concentrates in the interfacial ice, resulting in much higher Joule heating of interfacial ice compared to bulk ice. Thus, an advantage of the invention is that heating power is focused at the ice interface. Interfacial ice at the interface is heated and melted, with very little heating energy dissipated in bulk ice, if bulk ice is present. Heating of bulk ice is insignificant, typically amounting to about 1/100 of the heat dissipated per unit weight of interfacial ice, depending on a variety of variable factors, such as alternating electric field strength, impurities in the ice, thickness of bulk ice and others. In practical terms, heating of bulk ice is generally less than 1 calorie per gram, and typically less than 1/10 calorie per gram.

A method and a system in accordance with the invention also prevent formation of ice, particularly in a freezer. As water vapor cools and condenses on a surface, a thin layer of liquid water is formed on the surface. The conductivity of liquid water is one to two orders of magnitude greater than the conductivity of interfacial ice, and it is about three to four orders of magnitude greater than the conductivity of bulk ice. As a result, an alternating electric field in accordance with the invention generates conductivity AC in the liquid water, causing Joule heat. The Joule heating of the liquid water layer causes the water to evaporate from the surface, thereby preventing the formation of ice.

The electrical conductivity of ice increases as the frequency of the AEF increases. As conductivity increases, the portion of the electrostatic energy of the AEF converted into conductivity AC in the interfacial ice and flowing through the interfacial ice at the ice interface increases, resulting in higher Joule heating power to melt interfacial ice. At high frequency (e.g., 10-30 kHz), interfacial ice is about 1000 times more conductive than at low frequency (50-200 Hz). As a result, for given field strength, V/d, the amount of heating power generated at high frequency is greater than at low frequency. Deicing in accordance with the invention occurs at AC frequencies as low as about 100 Hz; however, such low frequencies require high voltage. Therefore, the frequency of the AEF and the AC voltage usually exceeds 1 kHz, and is preferably 10 kHz or greater. While other considerations may limit practically the frequency, from a heating standpoint, the frequency should be as high as possible.

Also, electrical conductivity of ice increases as the frequency of AC passing through it increases. As conductivity increases, resistive AC absorbed from the AEF and flowing through interfacial ice at the ice interface increases, resulting in higher heating power to melt ice. Deicing in accordance with the invention occurs at AC frequencies as low as about 100 Hz; however, such low frequencies use high voltage. Therefore, the frequency of the AEF and the AC voltage usually exceeds 1 kHz, and is preferably 10 kHz or greater. While other considerations may limit practically the frequency, from a heating standpoint, the frequency should be as high as possible. With high-frequency AC, that is, greater than 1000 Hz (1 kHz), an AC voltage in a range of about from 10 to 500 volts is usually sufficient to melt interfacial ice in accordance with the invention.

Numerous factors affect the Joule heating power generated by the capacitive energy of an AEF in interfacial ice at an ice-solid contact interface. These include, among others: ice purity (affecting conductivity); AC voltage; AC frequency; interelectrode distance; total area of electrode network; temperature; electrode structure and composition. The small interelectrode distance typically has a value in a range of about from 50 μm to 5 mm, preferably not exceeding 0.5 mm.

Melting of ice at the contact interface is usually sufficient for deicing the surfaces of a solid object because the bulk ice no longer adheres to the solid surface being protected. If the ice does not fall off the surface because of gravity, it is easily removed; for example, by the force of wind friction or by some mechanical means; for example, by a scraper or a windshield wiper. Also, since virtually all of the ice and water is removed from the region of the strong AEF, virtually no dielectric loss currents occur after melting and removal of the bulk ice. Thus, very little power is consumed after melting interfacial ice. An advantage, therefore, of a system and a method in accordance with the invention is that heating power is only used to melt interfacial ice. To melt the interfacial ice at an ice-solid interface, neither the ice nor the solid need be heated above 0° C., the melting point of ice. This significantly reduces heat transfer into the environment, compared with conventional ice-heating methods in which a heating element is heated to a temperature above the melting point. As a result, total energy consumption is minimized. Power consumption in methods and systems in accordance with the invention is only about 1/10 or less of the power consumption in systems using conventional resistive heating.

A method in accordance with the invention is useful for melting interfacial ice at virtually any ice interface because electrical conductivity of interfacial ice is higher than the conductivity of bulk ice. Even within ice itself, electrical conductivity is higher along grain boundaries of polycrystalline ice because impurities in the ice tend to concentrate at grain boundaries. At an interface between ice and a non-ice material, electrical conductivity of interfacial ice is higher than that of bulk ice because non-ice material attracts conductive ions in ice to the interface. Interfacial ice on an ice-covered windshield is the ice in contact with or adjacent to the windshield surface. Interfacial ice is also the ice exposed to and having a contact interface with air. Melting of interfacial ice at an ice-solid contact interface deices a solid surface much more efficiently than melting ice at a corresponding ice-air interface. In this specification, therefore, the term "interfacial ice" generally refers to the ice at the ice-solid contact interface at the surface of a solid object being protected against icing.

An AEF in accordance with the invention may be produced using a variety of structures and techniques. For example, an AEF is generated by flowing a high-frequency AC through an electrical conductor proximate to ice being melted. Typically, an AEF is generated by providing a high-frequency AC voltage across a first electrode and a second electrode that are electrically insulated from each other. A key feature of an embodiment in accordance with the invention is a strong AEF in the interfacial ice. Therefore, the stronger the potential difference between the electrodes, the stronger the AEF. The term "electrically insulated" and similar terms have their general meaning that there is no electrical shorting of the first electrode and the second electrode. The terms also imply that there is no closed conductor path connecting the first and second electrodes in a closed circuit. Nevertheless, in one basic type of embodiment, the first and second electrodes are exposed to an open space that water or ice typically occupies, thereby causing some limited electrical connection between the first electrode and the second electrode. For example, in embodiments containing interdigitated first and second electrodes located on a solid nonconductive surface without a layer of insulating material, ice located directly on the interdigitated electrodes acts as a semiconductor between the electrodes. In a second basic type of embodiment, the first and second electrodes are "completely insulated" from each other so that there would be no direct electrical connection between them even if the system were completely immersed in water. In such a system, either or both of the first or second electrodes are completely insulated from any open space that can be filled by ice or water and connect the electrodes. An example is an embodiment containing interdigitated first and second electrodes located on a solid nonconductive surface, but with a layer of insulating material in direct contact with and covering all of the electrodes. In preferred embodiments in accordance with the invention, the first and second electrodes are completely insulated from each other so that air breakdown across the electrodes does not occur. Electric breakdown of air causes sparks that can damage electrode material. An insulating coating covering an electrode also protects the electrode from physical damage, such as scratching. Although there is preferably no direct conductive path between electrodes, it is understood that in a system and in a method in accordance with the invention, the capacitive energy associated with the AEF generates conductivity (resistive) AC in interfacial ice, producing Joule heat.

In contrast, commonly-owned and co-pending U.S. patent application Ser. No. 09/426,685 discloses a structure having two electrodes separated by an insulator, but also having an open space between the electrodes that fills with water or ice to provide electrical contact between the electrodes and to provide a path for DC current between the electrodes; that is, water or ice closes a DC circuit including the electrodes. Thus, the basic principle of operation of the invention disclosed in Ser. No. 09/426,685 is different from a system and a method in accordance with the present invention.

In FIG. 1 is depicted in schematic form a generalized system 100 in accordance with the invention. System 100 includes a first electrode 110, an electrical insulator 112, and a second electrode 114. An interelectrode space 116 is located between first electrode 110 and second electrode 114. First electrode 110 and second electrode 114 are spatially separated from each other by an interelectrode distance. As depicted in FIG. 1, electrical insulator 112 is disposed in interelectrode space 116. It should be understood that electrical insulator 112 need not occupy all of interelectrode space 116; rather, it may, in certain embodiments, be disposed in only a portion of interelectrode space 116. Electrical insulator 112 serves to insulate first electrode 110 from second electrode 114 sufficiently to prevent electrical shorting between electrodes. In other words, electrical insulator 112 maintains a potential difference between first electrode 110 and second electrode 114 when an AC voltage is applied to the electrodes. It is further understood that first electrode 110 and second electrode 114 are electrically insulated from each other in preferred embodiments in accordance with the invention. Therefore, one or more other electrical insulators (not shown in FIG. 1), in addition to electrical insulator 112, may be present in an embodiment in accordance with the invention in order to insulate first electrode 110 from second electrode 114. As depicted in FIG. 1, insulator 112 is a transparent insulating thin film, typically comprising silicon dioxide. The insulating thin film typically has a thickness in a range of from 2 to 10 µm. System 100 further comprises an insulator 118 covering second electrode 114. Transparent insulator 118 has an outer surface 119, and typically has a thickness in a range of from 2 to 10 µm. Insulator 118 protects electrode 114 against physical damage.

System 100 further includes an AC power source 120 connected to first electrode 110 and second electrode 114 for providing an AC voltage across the first and second electrodes. Preferably, AC power source 120 provides AC voltage having a frequency greater than 1000 Hz, and more preferably not less than 10 kHz. FIG. 1 further depicts a layer of ice 130 having a layer of interfacial ice 132 at an ice-solid contact interface 134 at which ice 130 is in contact with outer surface 119 of insulator 118. It is understood that in preferred embodiments in accordance with the invention, ice 130 generally is not in physical contact with either first electrode 110 or second electrode 114. An important feature is that an AC voltage across first electrode 110 and second electrode 114 provides an AEF at ice interface 134. As in system 100, preferred embodiments in accordance with the invention include an electrical insulator or protective layer exposed to ice 130. FIG. 1 shows first electrode 110 disposed on outer surface 142 of solid object 140.

In accordance with the invention, solid object 140 comprises virtually any solid object having an outer surface 142 to be protected against accumulations of ice. For example, solid object 140 may comprise, among others: an airplane wing; a helicopter blade; a ship hull, deck or superstructure; a freezer coil; the surface of a road, highway bridge or airport runway; a windshield. In some embodiments in accordance with the invention, first electrode 110 and second electrode 114 are contained within solid 140.

In FIG. 1, surface 142 is substantially horizontal. It is understood that a surface being protected in accordance with the invention may be spatially oriented in many positions different from horizontal. Terms of orientation, such as "top", "bottom", "above" and others, are used with relation to the surface being protected against ice formation. For example, with reference to FIG. 1, bottom, first electrode layer 110 is closer to surface 142 of object 140 than top, second electrode layer 114. Therefore, top electrode layer 114 is "above" bottom electrode layer 110. The term "cover" indicates that a first element that covers a second element is above the second element. For example, in FIG. 1, top, second electrode 114 covers both bottom, first electrode 110 and surface 142.

The term "proximate" and related terms refer here to a distance between an element and an ice interface, or the distance between a place where a method step is performed and an ice interface. A key aspect of embodiments in accordance with the invention is the application of a high-frequency AEF at an ice interface so that interfacial ice absorbs capacitive energy of the AEF, converting a portion of the capacitive AC into conductivity (resistive) AC. Functionally, a first electrode and second electrode are proximate to an ice interface if an AC voltage across the electrodes generates an AEF having sufficient field strength to melt interfacial ice at the ice interface. Similarly, an AEF applied proximate to interfacial ice at an ice interface melts the interfacial ice. In physical terms, the term "proximate" practically means a distance within about 5 mm of an ice interface (or the solid surface on which an ice-solid interface usually occurs), preferably not exceeding 500 μm.

The term "high-frequency" refers here generally to an AC frequency greater than 1000 Hz, preferably 10 kHz or greater.

Figure 2:
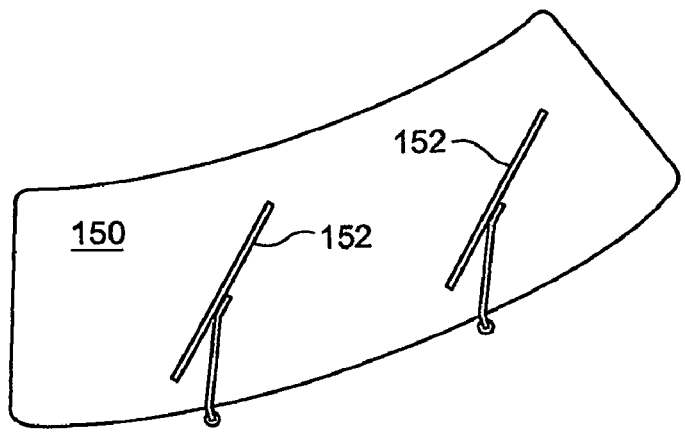
FIG. 2 depicts a windshield, which is commonly deiced by a system and a method in accordance with the invention.

A common application of a system and a method in accordance with the invention is the deicing of a windshield 150 having windshield wipers 152, such as depicted in FIG. 2. With reference to FIG. 1 and FIG. 2, solid object 140 represents nonconductive glass or other transparent windshield material of the bulk of a windshield 150. First electrode 110 is a layer of transparent, electrically conductive material. For example, first electrode 110 may comprise a layer of doped, conductive glass formed during fabrication of the windshield. Or, first electrode 110 may be a layer of transparent, conductive material deposited on the outside surface of a windshield 150. An example of a transparent conductive layer is a thin film of conductive metal oxide deposited on glass using techniques known in the art. Examples of transparent metal oxides include: ITO, fluorine-doped $SnO_2$, $RuO_2$, and AlZnO. Also, first electrode 110 may comprise a rectangular grid of metal wires or thin metal strips embedded in glass or formed on windshield 150. The term "transparent" refers here generally to a structure, such as a layer of material or a grid, that transmits about 70 percent or more of incident light without significant diffusion of the light rays. The term "conductive" refers generally to a material having a conductivity similar to that of a common metal or a common semiconductor. Electrical insulator 112 depicted in FIG. 1 may be a region of nonconductive glass formed during fabrication of the windshield, or may be a separate thin film of dielectric insulator material deposited on first electrode 110. The term "nonconductive" refers generally to a material or structure having a conductivity value similar to that of typical electrical insulators or dielectric materials, such as glasses, ceramics, and dielectric polymers. For example, silicon oxide is a common dielectric material that is formed using one of various, standard deposition techniques known in the art. Also, since air is a good insulator, electrical insulator 112 may consist essentially of air, or it may comprise a composite material containing air or other insulating gas. Second electrode 114 in FIG. 1 may be a layer or region of doped, electrically conductive glass formed during fabrication of the windshield. Or, second electrode 114 may be a layer of transparent, conductive material deposited on the outside surface of a windshield 150. Or, second electrode 114 may comprise a rectangular grid of metal wires or thin metal strips embedded in glass or formed on windshield 150 and then covered with a protective insulator layer.

Figure 3:
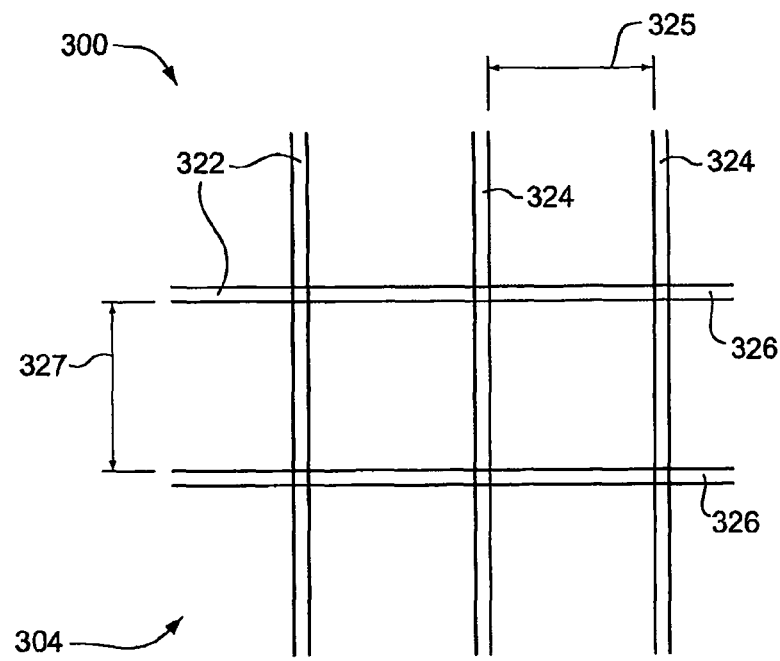
FIG. 3 depicts in schematic form a section of a rectangular grid that functions as a first electrode or a second electrode in accordance with the invention.

FIG. 3 depicts in schematic form a section 300 of a rectangular grid 304 that functions as a first electrode 110 or a second electrode 114. Typically, a rectangular grid 304 is disposed in or on a solid object, such as a windshield, and functions as a first electrode. A second rectangular grid, identical or similar to a rectangular grid 304, is disposed proximate to the first electrode, having the same shape of the first electrode, and separated from the first electrode by an interelectrode distance in accordance with the invention. As depicted in FIG. 1, the first rectangular grid electrode is electrically insulated from the second rectangular grid electrode. Section 300 comprises a plurality of strips or wires 322 (hereinafter "strips") connected to the same terminal of an AC power source (not shown), so that each of the strips has the same voltage during operation. Parallel strips 324 are separated from each other usually by first grid spacing 325. Parallel strips 326 are separated from each other by a second grid spacing 327. Typically, grid spacing 325 and grid spacing 327 are about the same and are uniform throughout the grid. Typically, strips 322 have an electrical conductivity of about $10^7$ S/m in order to carry sufficient AC power. Typically, strips 322 comprise a conductive metal, such as titanium. Strips 322 may be embedded in nonconductive glass or other transparent, nonconductive material of a windshield using one of various techniques known in the art. Alternatively, metal strips may be deposited on the nonconductive windshield material using a variety of metal deposition techniques known in the art. Currently, metal strips capable of carrying sufficient AC are not transparent. Nevertheless, they are sufficiently thin and the grid spacing sufficiently large that light transmission through a windshield is significantly greater than standard minimum requirements. Thus, electrode grid 304 is virtually transparent. Strips 322 used as electrodes in accordance with the invention with a transparent object, such as a windshield, cover as little as about 1-5% of the surface area of the object. Thus, they are essentially invisible and do not interfere significantly with light transmission or with aesthetics. In a typical embodiment, a strip 322 has a width in a range of about from 5 μm to 10 μm, and a depth or thickness in a range of about from 5 μm to 10 μm. A rectangular grid 304 typically has a grid spacing 325 or 327 in a range of about from 50 μm to 1000 μm. When the grid spacing is small, for example, in a system having electrode grids with a grid spacing of 50 μm, a voltage of about 10-50 volts is sufficient. In a coarse grid having a grid spacing of 0.5 mm, a voltage of 100-300 volts is typical.

Figure 4:
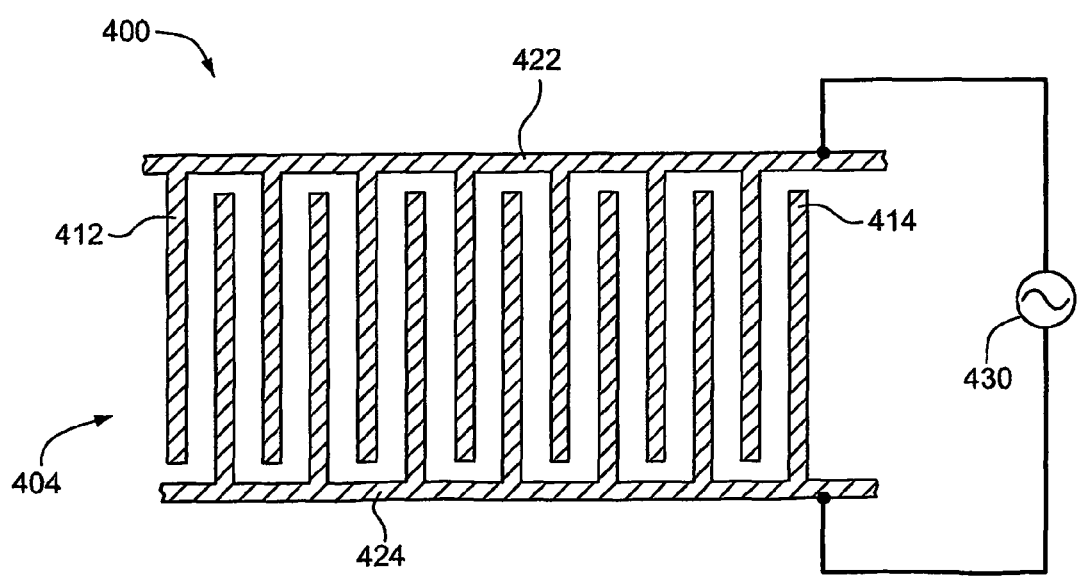
FIG. 4 depicts an embodiment comprising a plurality of interdigitated electrodes.

FIG. 4 depicts in schematic form an alternative embodiment in accordance with the invention. FIG. 4 shows a section 400 of an electrode system 404 comprising a plurality of first electrodes 412 and second electrodes 414, which are interdigitated. The term "interdigitated" means that a plurality of "digits" of a first electrode group are disposed alternately with a plurality of "digits" of a second electrode group. The geometry, dimensions and overall shape of the interdigitated electrodes may vary in different embodiments. Typically, as in FIG. 4, a first electrode stem 422 is disposed proximate to a surface and parallel with a second electrode stem 424, proximate to the same surface. The first electrode stem 422 is connected to one terminal of an AC power source 430, and the second electrode stem 424 is connected to a second terminal of power source 430, so that the first electrode stem and the second electrode stem have opposite polarities. A series of first electrode "digits" 412 extend in a substantially normal direction from first electrode stem 422 towards second electrode stem 424, without touching the second electrode stem. Similarly, a series of "digits" 414 of second electrode stem 424 extend in a substantially normal direction from the second electrode stem towards the first electrode stem, without touching the first electrode stem. First electrodes 412 are spaced so that the digits are adjacent to and substantially parallel with second electrode digits 414. As a result of the alternating arrangement of interdigitated electrodes 412, 414, an electrode having one polarity at a given moment is adjacent to one or more electrodes having the opposite polarity. Alternatively, either one of the electrode stems is connected to electrical ground, and the other is connected to an AC power source, so that a potential difference is generated between adjacent electrodes. Thus, language referring to an AC voltage across electrodes and to electrodes having opposite polarity, as well as other similar language, has its general meaning, including: a) an electrode connected to electrical ground, and in AC voltage applied to another electrode; b) an AC voltage applied to both a first electrode and a second electrode, in which the potential on the first electrode is approximately 180 degrees out of phase with the potential on the second electrode. In preferred embodiments, electrodes 412, 414 and electrode stems 422, 424 are covered by electrical insulation so that neither water nor ice provide a path for electrical conduction between electrodes 412, 414. Instead, ice typically forms on the insulation, and the AC voltage difference between first electrode 412 and second electrode 414 creates a strong AEF. The interfacial ice absorbs capacitive energy from the AEF, which causes an AC in the interfacial ice.

Figure 5:
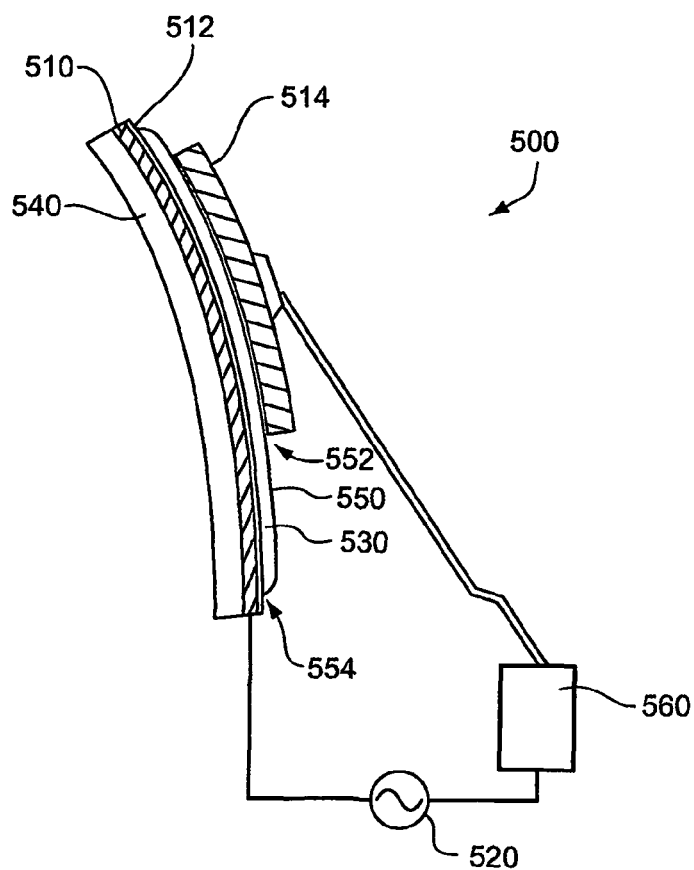
FIG. 5 depicts in schematic form a system in accordance with the invention having a first electrode, an electrical insulator, and a second electrode, in which a conductive windshield wiper functions as the second electrode.

FIG. 5 depicts in schematic form a system 500 in accordance with the invention. System 500 includes a first electrode 510, an electrical insulator 512, and a second electrode 514. First electrode 510 and second electrode 514 are each connected to opposing terminals of AC power source 520. FIG. 5 further depicts an ice layer 530 located between electrical insulator 512 and second electrode 514. First electrode 510 may be a layer of conductive glass forming the outside surface of windshield 540. Alternatively, first electrode 510 may be a layer of conductive material deposited on the outside surface of windshield 540 using deposition techniques known in the art. Typical conductive materials include thin films of metal oxides deposited using known techniques. Alternatively, first electrode 510 may be a rectangular grid of conductive strips, typically metal strips, as described with reference to FIG. 3. Insulator layer 512 is typically a region of nonconductive glass or a layer of electrically insulating, dielectric material deposited as a layer over first electrode 510. In system 500, second electrode 514 is a conductive windshield wiper, typically comprising electrically conductive rubber. Deicing in accordance with the invention is accomplished by using power source 520 to apply an AC voltage across first electrode 510 and second electrode 514. The AC voltage creates an AEF with capacitive AC that generates conductivity (resistive) AC in the interfacial ice at the contact interfaces of ice layer 530. Ice layer 530 has an air-ice contact interface 550, an ice-solid contact interface 552 at the interface between second electrode 514 and ice layer 530, and an ice-solid contact interface 554 at the interface between ice layer 530 and electrical insulator 512. Resistive AC that melts interfacial ice is generated by the AEF at the ice-solid contact interfaces 552, 554 below second electrode 514. Melting of interfacial ice at interfaces 550 and 552 does not contribute significantly to removing ice layer 530 from windshield 540. Rather, melting of interfacial ice principally at contact interface 554 contributes to deicing of windshield 540 (or other solid object being protected). During operation, windshield-wiper electrode 514 moves across windshield 540 in a sweeping motion. As a windshield wiper covers a particular region of the windshield creating an AEF and that region, a portion of the capacitive AC energy of the AEF is transformed into resistive AC in the interfacial ice in that region. The resistive AC generates Joule heat that melts the interfacial ice. Through gravity or by the sweeping motion of the windshield wiper, ice 530 is removed from the windshield. After ice 530 is removed, the electrical power dissipated in system 500 decreases because there is virtually no water or ice present for conducting resistive AC. Thus, system 500 is partly self-regulating. An optional voltage regulator 560 may be included in system 500 and used to decrease the AC voltage supplied by power source 520 after ice layer 530 has been removed. Various techniques are known in the art for detecting the presence and absence of ice. Depending on atmospheric conditions, approximately 1 kW of power is required to deice a windshield having a surface area of about 1 m$^2$. After deicing has been accomplished, about 200-300 W/m$^2$ of power is sufficient to maintain the surface of a windshield ice-free.

Since the time of contact of the moving windshield wiper at a given location on the windshield is relatively short, compared to a system in which both electrodes are stationary, the voltage required to provide suitable heating power is typically higher than in systems in which both electrodes are stationary.

Figure 6:
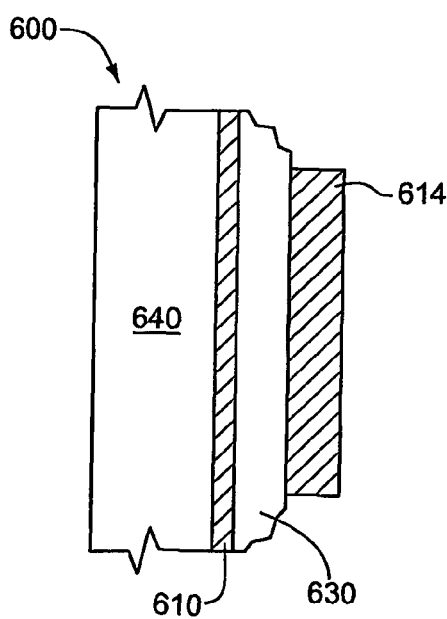
FIG. 6 depicts a system in accordance with the invention that does not include a permanent electrical insulator.

FIG. 6 depicts a system 600 in accordance with the invention, but which is less preferred. System 600 includes a first electrode 610 covering nonconductive glass windshield 640, and a second electrode 614. System 600 does not include a permanent electrical insulator. Instead, during operation, ice layer 630 functions to insulate electrically first electrode 610 from second electrode 64. If no ice is present at a particular spot of first electrode 610 or after ice 630 has been removed in accordance with the invention from windshield 640, first electrode 610 and second electrode 614 are electrically "shorted". As a result of "shorting", electrical power consumption is higher in a system 600 than in system 500 as depicted in FIG. 5.

Figure 7:
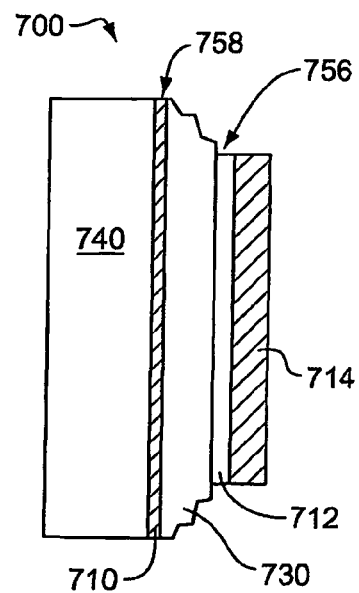
FIG. 7 depicts a system in accordance with the invention in which the second electrode is a conductive portion of a windshield wiper, and a windshield-wiper blade is an electrical insulator.

FIG. 7 depicts in schematic form a system 700 in accordance with the invention. System 700 includes a first electrode 710 and a second electrode 714. Second electrode 714 is a conductive portion of a windshield wiper; for example a conductive metal bracket holding a rubber windshield-wiper blade. System 700 also includes electrical insulator 712, which is a windshield-wiper blade comprising electrically nonconductive rubber. First electrode 710 is typically a region of conductive glass at the outside surface of windshield 740. Alternatively, first electrode 710 is a transparent or virtually transparent layer of conductive material; for example, a thin film of metal oxide deposited using techniques known in the art. FIG. 7 depicts an ice layer 730 located between first electrode 710 and rubber windshield-wiper insulator 712. An AC voltage applied across first electrode 710 and second electrode 714 creates an AEF that generates a resistive AC in the interfacial ice of ice layer 730. An ice-solid contact interface 756 exists at the interface between rubber insulator 712 and ice layer 730. Another ice-solid contact interface 758 exists at the interface between first electrode 710 and ice layer 730. As windshield-wiper electrode 714 sweeps across windshield 740, it creates an AEF between first electrode 710 and second electrode 714 in the region corresponding to contact interfaces 756, 758. The resistive AC generated by the AEF in the interfacial ice at interfaces 756, 758 causes Joule heating, which melts the interfacial ice. As a result of melting of interfacial ice at contact interface 758, ice layer 730 is removed from windshield 740 through gravity or by the sweeping motion of windshield-wiper blade 712.

Figure 8:
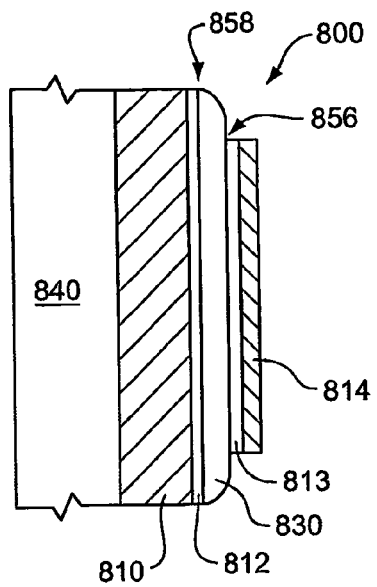
FIG. 8 depicts a further embodiment containing an electrical insulator located on top of the first electrode, and a second insulator in the form of a nonconductive rubber windshield-wiper blade.

FIG. 8 depicts in schematic form a further embodiment in accordance with the invention. The system 800 includes a first electrode 810 and a second electrode 814. As depicted in FIG. 8, first electrode 810 typically comprises conductive glass or other transparent conductive material of the windshield 840. Second electrode 814 is a conductive portion of a windshield wiper; typically a conductive metal bracket holding a rubber windshield-wiper blade. System 800 further comprises an electrical insulator 812 and an electrical insulator 813. Electrical insulator 812 is located on top of first electrode 810. Electrical insulator 812 is a region of nonconductive material covering first electrode 810. Electrical insulator 812 may be formed in various ways. For example, electrical insulator 812 may be nonconductive glass formed during fabrication of glass windshield 840. Alternatively, electrical insulator 812 may be a layer of nonconductive material, for example, silicon oxide, deposited on first electrode 810 using one of a variety of techniques known in the art. Electrical insulator 813 typically comprises nonconductive rubber in a windshield-wiper blade. In FIG. 8, an ice layer 830 covers windshield 840 and is located between first electrode 810 and second electrode 814. Ice layer 830 has a contact interface 856 with electrical insulator 813. Ice layer 830 also has a contact interface 858 with electrical insulator 812. During operation, an AC voltage applied across first electrode 810 and second electrode 814 creates an AEF that generates resistive AC in the interfacial ice at contact interfaces 856 and 858 in the region in which second electrode 814 is located as it sweeps across windshield 840.

Numerous variations of the embodiments described herein may be fabricated and used in accordance with the invention.

Example 1

Figure 9:
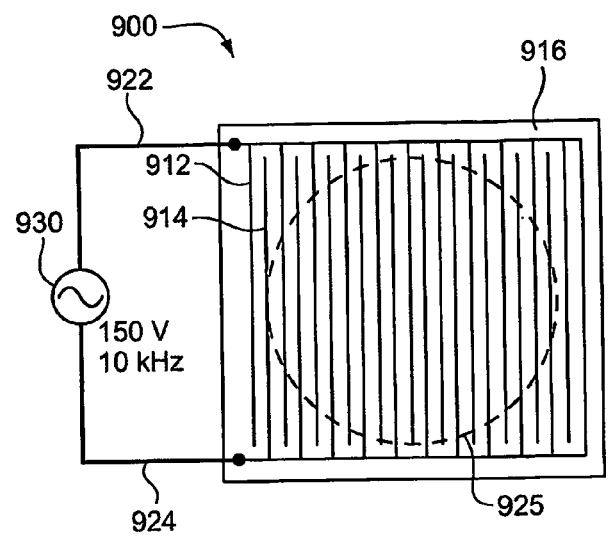
FIG. 9 depicts an exemplary system in accordance with the invention with interdigitated electrodes that melted an ice disc.

A system 900 in accordance with the invention was used for melting interfacial ice. System 900 included a plurality of first electrodes 912 and second electrodes 914. Electrodes 912, 914 were interdigitated, as depicted in FIG. 9. Interdigitated electrodes 912, 914 were formed on nonconductive glass substrate 916, which had a thickness of about 2 mm. Interdigitated electrodes 912, 914 comprised strips of chromium metal. Interdigitated electrodes 912, 914 were about 25 µm wide and had a thickness of about 100 nm. The interelectrode distance between adjacent electrodes 912, 914 was about 500 µm. The plurality of interdigitated first and second electrodes 912, 914 were located in a total surface area on substrate 916 of about 5 cm×5 cm. The metal strips of electrodes 912, 914 occupied about five percent of the total surface area. First electrode stem 922 and second electrode stem 924 were connected to opposing terminals of AC power source 930.

A disc of ice 925 having a diameter of approximately 4 cm was formed on substrate 916, on top of and covering interdigitated first and second electrodes 912, 914, as represented by the circle of dashes 925 in FIG. 9. Ice disc 925 had a thickness of approximately 3 mm. The system was frozen at −10° C. An AC voltage of 150 volts (rms) at a frequency of 10 kHz was applied to first and second electrodes 912, 914 through electrode stems 922, 924, respectively, using power source 930. The ice at the ice-glass interface immediately melted, and ice disc 925 slid away from substrate 916 under its own weight. Electrical measurements showed that the maximum heating power did not exceed 2.5 W, which corresponded to a heating power density, $W_h$, not exceeding 0.1 W/cm².

Figure 10:
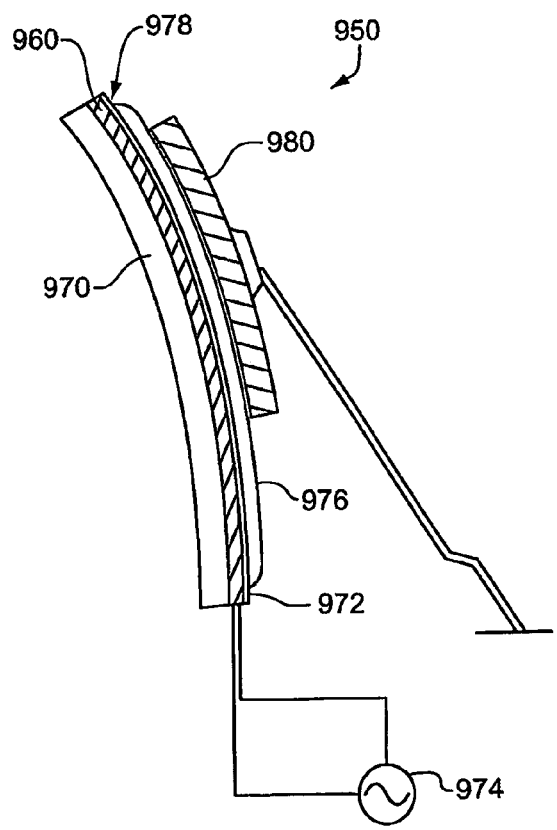
FIG. 10 depicts in schematic form a system in accordance with the invention having a plurality of interdigitated electrodes in a windshield covered by an electrical insulator.

FIG. 10 depicts in schematic form a system 950 in accordance with the invention. System 950 includes a plurality of interdigitated electrodes 960, as described above with reference to FIGS. 4 and 9. Interdigitated electrodes 960 are disposed on the outside surface of solid object 970, typically a transparent windshield 970. System 950 also includes electrical insulator 972 formed on and covering electrodes 960. Insulator 972 contributes to electrical insulation of each electrode 960 from the other electrodes 960. Interdigitated electrodes 960 are connected electrically to AC power source 974, which provides a voltage of opposite polarity to adjacent electrodes during operation. A system 950 is useful for removing ice 976 located on insulator 972 and covering windshield 970. Melting of interfacial ice at ice interface 978 at the interface of ice 976 and insulator 972 reduces the adhesion of ice layer 976 to insulator 972. As a result, ice layer 976 falls by gravity from the windshield 970, or is easily removed by wind friction or by the sweeping action of windshield wiper 980.

Embodiments directed towards high-frequency melting of ice in freezers and freezer packages are further described herein with reference to FIGS. 11-18. It should be understood that the structures and systems depicted in schematic form in FIGS. 13-18 are used to explain the invention and are not precise depictions of actual structures and systems in accordance with the invention. It is further understood that embodiments in accordance with the invention are useful for melting interfacial ice in other, different applications.

A capacitor does not provide strong resistance to high-frequency currents. At high frequency, the capacitor has a low impedance. A capacitor subjected to high-frequency voltage acts virtually as a direct electrical connection between electrical conductors. Thus, a capacitor provides efficient indirect connection of a high-frequency voltage source to an electrical conductor.

In accordance with one embodiment of the invention, dielectric layers such as thin dielectric polymer films are subjected to high-frequency voltage and function as thin film capacitors, providing efficient indirect electrical connection between successive conductive layers at high-frequency voltage. The potential difference between adjacent conductive layers creates a high-frequency AEF between the layers. A portion of the electrostatic energy of the AEF generates conductivity (resistive) AC in semiconductive interfacial ice located in the high-frequency AEF between the conductive layers. The conductivity (resistive) AC in the interfacial ice causes Joule heat, which melts interfacial ice. The Joule heating power is:

$$W_h = \rho_{if} j^2 \quad (1)$$

where $W_h$ is the heating power per m³, $\rho_{if}$ is interfacial ice electric resistivity, and j is the current density. Substitution of values for the resistivity of water and bulk ice into Equation (1) yields an expression for the heating power in liquid water and in bulk ice, respectively.

Current density is proportional to alternating electric field strength, which can be expressed by the equation $$E = V/d \quad (5)$$

where E represents alternating electric field strength, V represents average potential difference, and d represents the distance between conductors having potential difference V. For a given value of resistivity, $\rho_{if}$, and for a given potential difference, V, the heating power, $W_h$, is inversely proportional to d². Thus, an increase in the value of d by a factor of 10, reduces the electric field strength and $W_h$ by a factor of approximately 100.

Combining Equations (1) and (5) yields:

$$W_h = \rho_{if} \cdot \left(\frac{1}{\rho_{if}} \cdot \frac{V^2}{d}\right) = \sigma_{if} \cdot \frac{V^2}{d^2} \quad (6)$$

in which $\sigma_{if}$ interfacial ice conductivity, $\rho_{if}$ is interfacial ice resistivity, and $\sigma_{if} = 1/\rho_{if}$. There is virtually no potential difference between different parts of a particular food package because of the high conductivity of the conductive layer of the food package. Thus, the term "V" in Equation (6) represents the potential difference between two conductive layers of two adjacent packages in close proximity to each other. The distance "d" in smallest at the contact point or other regions of close proximity of two packages. In accordance with Equation (6), most of the heat is generated in such regions where the distance, d, is minimal. Typically, ice and frost "bridges" form in such regions of minimal "d". Thus, in accordance with the invention, heat is generated mainly where it is most useful.

A method and a system in accordance with the invention also prevent formation of ice, particularly in a freezer. As water vapor cools and condenses on a surface, a thin layer of liquid water is formed on the surface. The conductivity of liquid water is one to two orders of magnitude greater than the conductivity of interfacial ice, and it is about three to four orders of magnitude greater than the conductivity of bulk ice. As a result, an alternating electric field in accordance with the invention generates conductivity AC in the liquid water, causing Joule heat. The Joule heating of the liquid water layer causes the water to evaporate from the surface, thereby preventing the formation of ice.

The electrical conductivity of ice increases as the frequency of the AEF increases. As conductivity, $\sigma_{if}$, increases, the heating power, $W_h$, also increases, in accordance with Equation (3). At high frequency (e.g., 10-30 kHz), interfacial ice is about 1000 times more conductive than at low frequency (50-200 Hz). As a result, for given field strength, V/d, the amount of heating power generated at high frequency is greater than at low frequency. Deicing in accordance with the invention occurs at AC frequencies as low as about 100 Hz; however, such low frequencies require high voltage. Therefore, the frequency of the AEF and the AC voltage usually exceeds 1 kHz, and is preferably 10 kHz or greater. While other considerations may limit practically the frequency, from a heating standpoint, the frequency should be as high as possible. With high-frequency AC, that is, not less than about 1000 Hz (1 kHz), an AC voltage in a range of about from 2 volts to 10 volts per layer of ice is usually sufficient to melt ice in accordance with the invention.

An advantage of a system and a method in accordance with the invention, as compared to conventional heaters, is that the heating power, $W_h$, is generated directly where it is needed; that is, in the ice between freezer packages. Power is practically not applied to the bulk ice or to the contents of the packages. Also, virtually no power sinks into the environment. This reduces total energy consumption. Another advantage is that the contents of the freezer packages are not heated. As a result, undesired thawing of food or heating of heat-sensitive contents of freezer packages is avoided.

In typical embodiments in accordance with the invention, a thin dielectric polymer film separates an electrode at a given voltage from a conductive layer in a freezer package adjacent to the electrode. Typically, a conductive layer in a freezer package is a continuous metallized coating. Typically, a conductive layer is part of a laminate structure of a freezer package. For example, a typical freezer package used in accordance with the invention includes a wall with an outer, dielectric polymer film and an inner, metallized conductive layer. Preferably, a freezer package wall also includes an inner, dielectric polymer film, which serves to protect the inner conductive layer against physical injury.

An electrode in accordance with the invention typically has a form of a metal electrode plate or a flexible electrode pad. Preferably, there is not much air space between an electrode and the first freezer package (or last freezer package) in a stack of freezer packages because air acts as a relatively strong electrical insulator, thereby increasing voltage requirements. The outer dielectric film of each freezer package functions as a tin capacitor subjected to high-frequency voltage, thereby providing efficient indirect connection between adjacent electrical conductors; for example, between an electrode and the inner conductive layer of a freezer package, or between the inner conductive layers of adjacent freezer packages. The conductive layer of each freezer package in a stack of freezer packages between two electrodes conducts AC, but typically at a potential that is between the voltages at the two electrodes. A system and a method in accordance with the invention is also useful for preventing ice and melting ice on a single freezer package or a plurality of freezer packages in the interelectrode space between two electrodes.

Prevention of ice and melting of interfacial ice on a freezer package and between freezer packages in accordance with the invention is generally conducted using audio frequencies measured in kHz, for example, in a range of about from 10 to 30 kHz, and even up to several hundred kHz. In contrast, a conventional microwave oven operates with radio frequencies measured in MHz, generally greater than 100 MHz. Generating radio frequencies is much more difficult and expensive than generating audio frequencies.

A conventional microwave oven functions as a resonant cavity. A sufficiently strong electromagnetic field is achieved in a microwave oven only in the absence of conductive materials in the open chamber. If conductive parts are present in a microwave oven, the quality of the chamber degrades, there is no resonance, and therefore, no sufficiently strong electromagnetic field. In contrast, an apparatus and a method in accordance with the invention do not rely on resonance; rather, the strength of an electric field depends principally upon potential difference between inner conductive layers of adjacent freezer packages (or between an inner conductive layer and an electrode) and the interconductor distance.

Containers used in microwave ovens do not contain a conductive layer because a conductive layer would interfere with resonance in a microwave oven. In contrast, the metallized coatings or other conductive layers of freezer packages in accordance with the invention are substantially continuous. "Substantially continuous" means that a conductive layer surrounds the contents of a freezer package and all of the various portions of the conductive layer are electrically connected. As a result, the potential is the same in all portions of the conductive layer, and there is virtually no AEF present within the enclosed volume or contents of the freezer package. Since there is virtually no AEF in the contents of the freezer package, virtually no dielectric loss heating or Joule heating of the contents occurs. Practically, a substantially continuous conductive layer of a freezer package typically completely covers the inside surface of an outer dielectric film of a freezer package wall. Nevertheless, a conductive layer containing distinct conductive portions that are electrically connected may also be a substantially continuous conductive layer in accordance with the invention.

The term "conductive layer" and similar terms are used here in two ways. First, they refer to a layer, coating or other structure of a freezer package with a conductivity in a range typical of a conductive metal or metal oxide, and which provides a continuous conductance path around a freezer package, and which is electrically insulated from the outside surface and the exterior of a freezer package. The thickness of metallized coatings in accordance with the invention is not critical. A coating may be relatively thin; for example, about 5 nm. Or it may be relatively thick; for example, 200 μm. An inner conductive coating typically covers substantially all of the surface area of the inside of a freezer package wall; nevertheless, it need not cover all of the surface area as long as it provides a conductance path connecting substantially all portions of a freezer package wall. Used in a second, broader sense, the term "conductive layer" refers to both an inner conductive layer of a freezer package or an electrode.

Numerous factors affect the Joule heating power delivered at an ice-solid contact interface. These include, among others: ice purity (affecting conductivity); AC voltage; AC frequency; interconductor distance; area of interfacial ice adjacent to opposing conductive layers; temperature. The small interconductor distance typically has a value in a range of about from 50 µm to 10 mm, preferably not exceeding 2.0 mm.

Melting of ice at the contact interface is usually sufficient for loosening a frozen stack of freezer packages and releasing the individual packages for easy movement because the surfaces of a package no longer adhere to the bulk ice between freezer packages. Conversely, the bulk ice no longer adheres to the packages, and if desired, the bulk ice can be easily removed in the frozen state, rather than in a liquid state. An advantage of a system and a method in accordance with the invention is that heating power is used principally to melt interfacial ice. To melt the interfacial ice at an ice-solid interface in accordance with the invention, substantially none of the bulk ice, freezer package contents, ambient freezer space or solid structures of a freezer housing need be heated above 0° C., the melting point of ice. This significantly reduces heat transfer into the environment, compared with conventional ice-heating methods in which a heating element is heated to a temperature above the melting point. Very little power is consumed to melt interfacial ice in accordance with the invention. As a result, total energy consumption is minimized in accordance with the invention.

A method in accordance with the invention is useful for melting interfacial ice at virtually any ice interface because electrical conductivity of interfacial ice is higher than the conductivity of bulk ice. Even within ice itself, electrical conductivity is higher along grain boundaries of polycrystalline ice because impurities in the ice tend to concentrate at grain boundaries. At an interface between ice and a non-ice material, electrical conductivity of interfacial ice is higher than that of bulk ice because non-ice material attracts conductive ions in ice to the interface. In ice located between freezer packages, the thin layer of ice in contact with and adjacent to the outside surface of a freezer package wall is interfacial ice. The ice covering a freezer package and having a contact interface with air is also interfacial ice. Melting of interfacial ice at the two ice-package contact interfaces between adjacent freezer packages in a stack of freezer packages serves to release individual freezer packages. With respect to freezer packages, therefore, the term "interfacial ice" generally refers to the ice at the ice-package contact interface of a freezer package.

An AEF in accordance with the invention may be produced using a variety of structures and techniques. For example, in one aspect, an AEF is generated by flowing a high-frequency AC through an electrical conductor proximate to ice being melted. Generally, an AEF is generated by providing a high-frequency AC voltage across a first electrode and a second electrode that are electrically insulated from each other. Thus, the invention preferably utilizes a strong AEF in the interfacial ice. The stronger the potential difference between the electrodes, the stronger the alternating electric field. The term "electrically insulated" and similar terms have their general meaning that there is no electrical shorting of electrically conductive elements. Accordingly, the terms also mean that there is no closed conductor path connecting a plurality of conductive elements to form a closed circuit. The electrical insulation helps to maintain the potential difference between conductive elements in accordance with the invention. It also prevents generation and dissipation of heat except in the interfacial ice.

Figure 11:
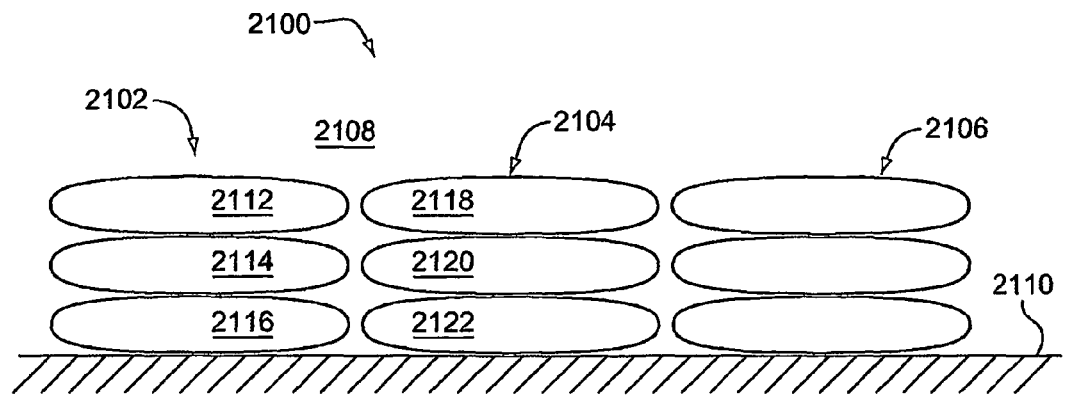
FIG. 11 depicts in schematic form a section of a conventional freezer with three stacks of freezer packages in its freezer space.
Figure 12:
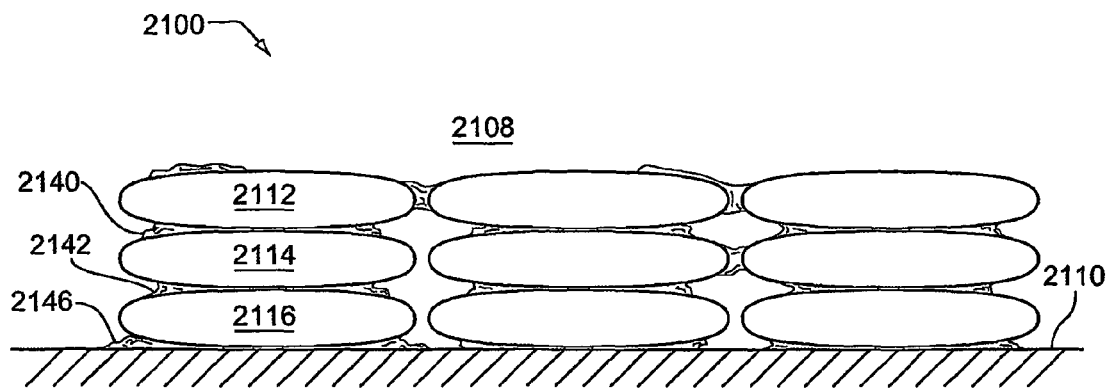
FIG. 12 shows the section of FIG. 11 at a later time at which ice has formed on and between the freezer packages.

In FIG. 11 is depicted in schematic form a section 2100 of a conventional freezer with a freezer bottom 2110, including three stacks 2102, 2104 and 2106 of freezer packages in the freezer space 2108 of the freezer. Stack 2102 includes freezer packages 2112, 2114 and 2116. Stack 2104 includes freezer packages 2118, 2120 and 2122. As depicted in FIG. 11, there is no significant amount of ice on or between the freezer packages. FIG. 12 shows section 2100 at a later time at which ice has formed on and between the freezer packages. Typically, ice forms from condensation of water vapor in air as the air cools in a freezer. As depicted in FIG. 12, ice 2140 is located between freezer package 2112 and freezer package 2114. Ice 2142 is present between freezer package 2114 and freezer package 2116. In addition, ice 2146 has formed between freezer package 2116 and freezer bottom 2110. Ice is also present on and between other freezer packages located in freezer space 2108. Ice 2140, 2142, 2146 makes packages stick together and stick to freezer bottom 2110, making access to or movement of the freezer packages difficult.

Figure 13:
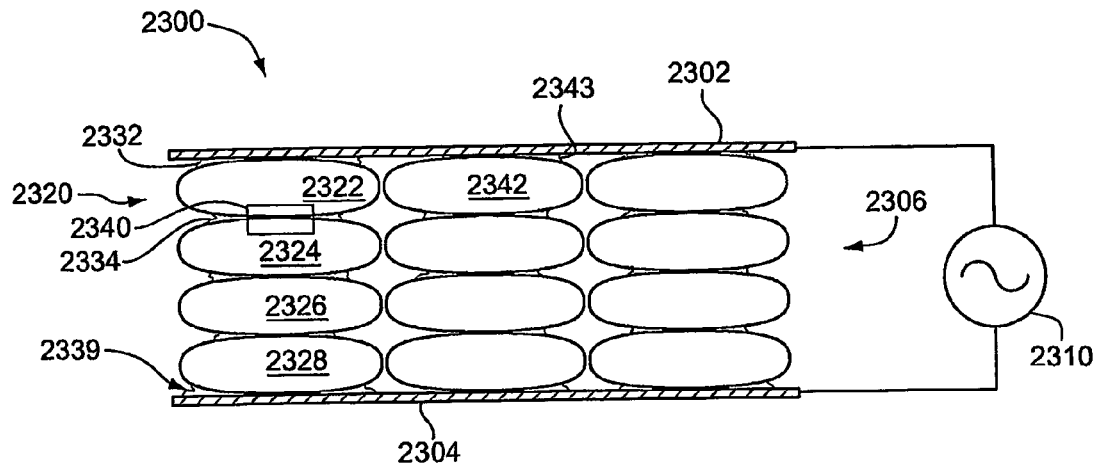
FIG. 13 depicts a system in accordance with the invention for melting ice on and between freezer packages.

A system 2300 in accordance with the invention for melting interfacial ice on a freezer package is depicted in FIG. 13. System 2300 includes a first electrode 2302 and a second electrode 2304. First electrode 2302 and second electrode 2304 define an interelectrode space 2306 between the first and second electrodes for accommodating one or a plurality of freezer packages. System 2300 further includes an AC power source 2310 for providing an AC voltage across first electrode 2302 and second electrode 2304. Generally, the AC voltage has a frequency not less than about 1000 Hz. Preferably, the AC voltage has a frequency in a range of about from 10 kHz to 30 kHz. Typically, AC power source 2310 provides AC voltage with an amplitude in a range of about from 10 volts to 100 volts. Higher voltage, for example, up to 10 kV or higher, may be desirable in large stacks of packages or in very cold temperature ranges.

FIG. 13 further depicts several stacks of a plurality of freezer packages with ice on and between the freezer packages. Freezer package stack 2320 includes a first freezer package 2322 proximate to first electrode 2302. Freezer package 2324 is located adjacent to and below freezer package 2322. Similarly, freezer package 2326 is located adjacent to and below freezer package 2324. Last freezer package 2328 is located proximate to second electrode 2304 and between freezer package 2326 and second electrode 2304. Ice 2332 is located between first freezer package 2322 and first electrode 2302. Ice 2334 is located between freezer package 2322 and freezer package 2324. Ice 2339 is located between last freezer package 2328 and second electrode 2304. First electrode 2302 and first freezer package 2342 define an interconductor space 2343. Similarly, other freezer packages proximate to an electrode define corresponding interconductor spaces with the electrode. Ice, air or combination of ice and air typically occupy most of the volume of an interconductor space.

Figure 14:
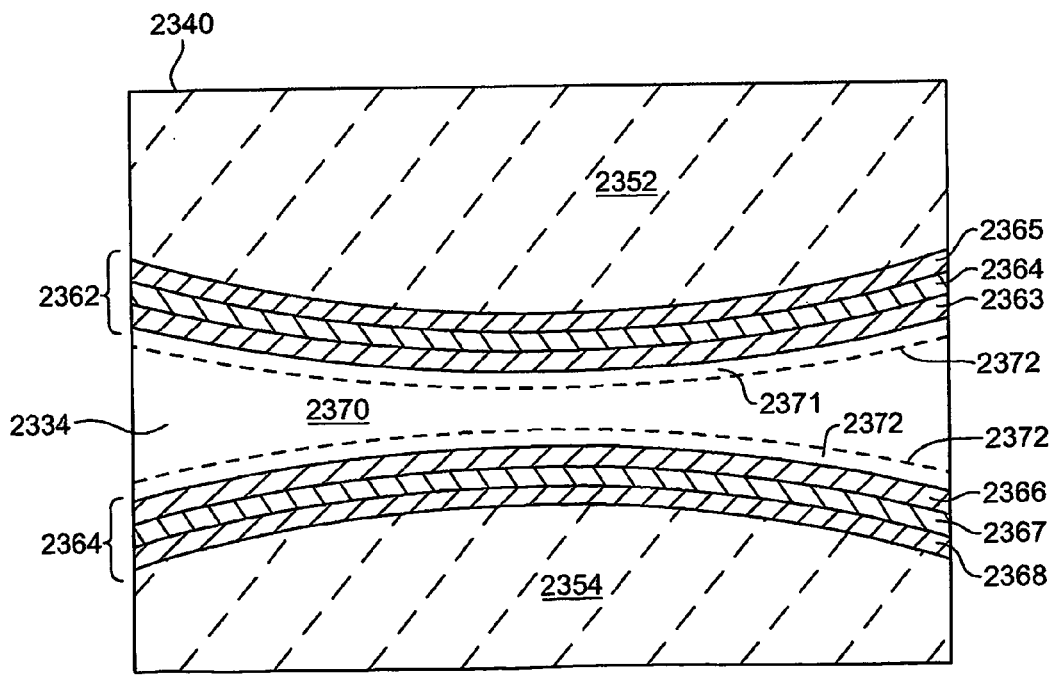
FIG. 14 shows an exploded, cross-sectional view of ice between adjacent regions of two freezer packages in a system in accordance with the invention.

FIG. 14 shows an exploded, cross-sectional view of the region 2340 designated by the rectangle in FIG. 13. FIG. 14 depicts contents 2352 of freezer package 2322 and contents 2354 of freezer package 2324. In accordance with the invention, contents 2352, 2354 of freezer packages 2322, 2324, respectively, may be any material stored in a freezer; for example, food or other solid or liquid materials. Typically, contents 2352, 2354 are moderately or strongly dielectric, so that they do not conduct significant electric current. But, even when contents are conductive, there is no heating of the contents because there is no potential difference across the contents of a particular package. FIG. 14 further shows freezer package wall 2362 of freezer package 2322. Freezer package wall 2362 includes a laminate structure with an outer dielectric film 2363 and a continuous inner conductive layer 2364. Preferably, freezer package wall 2362 also includes an inner dielectric film 2365. FIG. 14 also shows freezer package wall 2364 of freezer package 2324. Freezer package wall 2364 includes outer dielectric film 2366, inner conductive layer 2367 and inner dielectric film 2368. FIG. 14 further shows ice 2334, which includes bulk ice 2370 and interfacial ice layers 2371, 2372. Interfacial ice 2371 is located at the ice-solid interface between ice 2334 and freezer package wall 2362 of freezer package 2322. Similarly, interfacial ice 2372 is located at the ice-solid interface between ice 2334 and freezer package wall 2364 of freezer package 2324. The dashed lines 2373 indicate that there is no clear boundary between bulk ice 2370 and interfacial ice 2371, 2372. The thickness of interfacial ice that melts in accordance with the invention is typically about one micrometer. The distance between inner conductive layer 2364 and inner conductive layer 2367 at any location is referred to as the interconductor distance. Inner conductive layer 2364 and inner conductive layer 2367 also define an interconductor space, some of which is occupied by ice 2334. For a given potential difference between adjacent conductive layers, the strength of the alternating electric field in the interfacial ice is inversely proportional to the interconductor distance. Therefore, it is desirable to minimize the interconductor space between freezer packages and between a first freezer package and a first electrode, or a last freezer package a second electrode.

Figure 15:
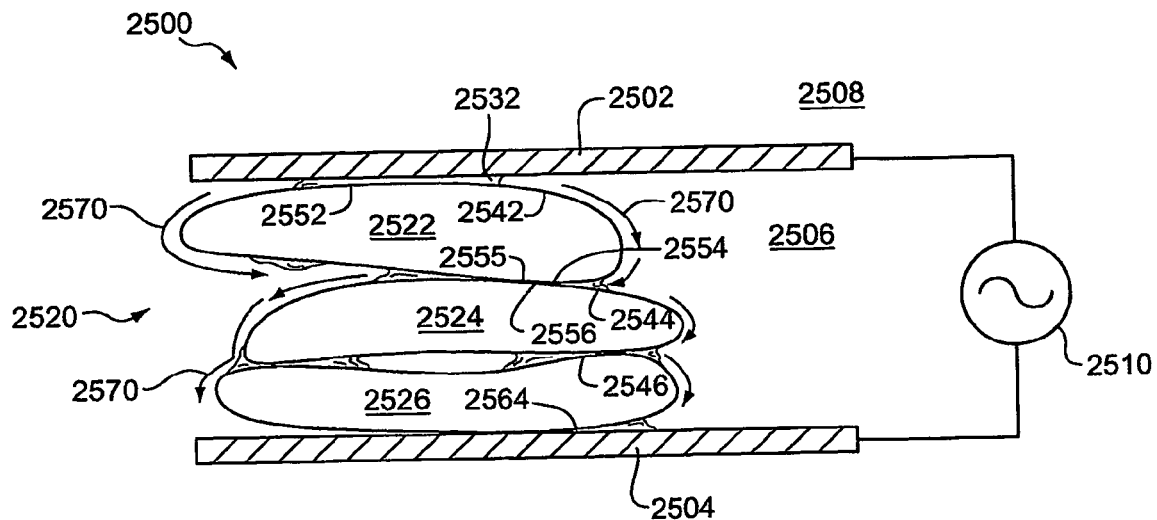
FIG. 15 depicts in schematic form a system in accordance with the invention being operated by a method in accordance with the invention.

FIG. 15 depicts in schematic form a system 2500 in accordance with the invention being operated by a method in accordance with the invention. System 2500 includes a first electrode 2502 and a second electrode 2504 that define an interelectrode space 2506. One or both of electrodes 2502, 2504 may be integral with a freezer housing (not shown). Alternatively, one or both of electrodes 2502, 2504 may be mounted within freezer space 2508 of a freezer housing. Alternatively, one or both of electrodes 2502, 2504 may be movable within the freezer space 2508 of a freezer housing. System 2500 further includes AC power source 2510 for providing an AC voltage across first electrode 2502 and second electrode 2504. A stack 2520 of a plurality of freezer packages is located in the interelectrode space 2506. Stack 2520 includes first freezer package 2522 proximate to first electrode 2502, freezer package 2524 adjacent to freezer package 2522, and freezer package 2526 proximate to second electrode 2504 and located between freezer package 2524 and second electrode 2504. Freezer package 2522 has a freezer package wall 2542, which includes an outer dielectric film and a continuous inner conductive layer, as discussed with reference to FIG. 14. Similarly, freezer packages 2524, 2526 have freezer package walls 2544, 2546, respectively, each of which includes an outer dielectric film and an inner conductive layer. A first wall portion 2552 of freezer package wall 2542 of first freezer package 2522 is adjacent to and proximate to first electrode 2502. Ice 2532 is located on freezer package 2522 at first wall portion 2552 between freezer package 2522 and first electrode 2502. Typically, a thin layer of air may also be located between first electrode 2502 and first freezer package 2522. Accordingly, a portion of the inner conductive layer corresponding to first wall portion 2552 is located proximate to first electrode 2502. The inner conductive layer of first wall portion 2552 and first electrode 2502 are separated by an interconductor distance and define an interconductor space. A second wall portion 2554 of first freezer package 2522 is distal from first electrode 2502 and is located adjacent to and proximate to freezer package 2524. Accordingly, second wall portion 2554 of first freezer package 2522 is adjacent to and proximate to first wall portion 2556 of freezer package wall 2544 of freezer package 2524. First wall portion 2556 includes a corresponding portion of outer dielectric film and a portion of an inner conductive layer. As a result, the inner conductive layer of freezer package wall 2542 at portion 2554 is opposite and proximate to the inner conductive layer of freezer package wall 2544 at portion 2556. The two opposite portions 2554, 2556 of the inner conductive layers define an interconductor space 2555 and are separated by an interconductor distance. As depicted in FIG. 15, second wall portion 2554 is substantially opposite and parallel to first wall portion 2552. It is understood that different relative orientations are possible in accordance with the invention between various wall portions of freezer packages and electrodes. Typically, in a method in accordance with the invention, as explained with reference to FIG. 15, an AC power source 2510 provides a high-frequency AC voltage across first electrode 2502 and second electrode 2504. Generally, the frequency is not less than 1000 Hz. Preferably, the AC voltage has a frequency in a range of about from 10 kHz to 30 kHz. The AC voltage creates an alternating electric field in the interelectrode space 2506. There is, however, essentially no electric field in the interior of the freezer packages. Each freezer package has a continuous inner conductive layer. The continuous inner conductive layer has substantially the same electric potential at all points. Therefore, there is no electric field within a freezer package, and the contents of a freezer package are likewise not subjected to an alternating electric field. For this reason, the contents of a freezer package in accordance with the invention are not heated. A potential difference does exist, however, between first electrode 2502 and the inner conductive layer of freezer package wall 2542 of first freezer package 2522. The inner conductive layer of freezer package wall 2542 is electrically insulated from first electrode 2502 by the outer dielectric film of freezer package wall 2542. A thin layer of air between first electrode 2502 and freezer package 2522 also insulates, if present. Similarly, the inner conductive wall at portion 2564 of last freezer package 2526 is proximate to second electrode 2504, but is electrically insulated from second electrode 2504 by the outer dielectric film of freezer package wall 2546.

The outer dielectric film of freezer package wall 2542 at portion 2552 of first freezer package 2522 is proximate to first electrode 2502 and acts as a thin film capacitor between first electrode 2502 and the inner conductive layer of freezer package wall 2542. Generally, at high frequency, a capacitor has a low impedance and it does not provide strong resistance to high-frequency currents. A capacitor subjected to high-frequency voltage acts virtually as a direct electrical connection. Thus, a capacitor provides efficient indirect connection of a high-frequency voltage source to an electrical conductor. Therefore, when a high-frequency AC voltage is applied across first electrode 2502 and second electrode 2504 in accordance with the invention, it generates an AC in the inner conductive layer of freezer package wall 2542 of first freezer package 2522. Similarly, the AC voltage generates a high-frequency AC in the inner conductive layer of last freezer package 2526. By the same mechanism, high-frequency AC is carried from the inner conductive layer of freezer package wall 2542 at portion 2554 across the outer dielectric film of freezer package 2522, and across the outer dielectric film of freezer package 2524 to the inner conductive layer of freezer package 2524. Arrow symbols 2570 in FIG. 15 represent the flow of AC in the inner conductive layers and across the outer dielectric films of freezer packages 2522, 2524, 2526 during one-half of an AC cycle. During the other half of the AC cycle, the AC flows in the opposite direction. At any given moment during operation, the total voltage difference between first electrode 2502 and second electrode 2504 is essentially distributed along stack 2520 of the plurality of freezer packages 2522, 2524, 2526. The electric potential of each freezer package is essentially uniform because the inner conductive layer is substantially continuous about the package and uniformly distributes potential. Since the potential of an individual freezer package is uniform, there is no alternating electric field within the freezer package or its contents. As a result, there is virtually no dielectric loss heating of the contents. Whatever insignificant heating of the contents occurs is generally less than one calorie per gram, and typically less than 0.1 calorie per gram of contents.

A potential difference occurs between first electrode 2502 and first freezer package 2522, between adjacent freezer packages and between last freezer package 2526 and second electrode 2504. In accordance with the invention, AC flows through each inner conductive layer, with a potential difference between inner conductive layers of adjacent freezer packages. The high-frequency voltage differential across each respective interconductor space generates a high-frequency alternating electric field. The semiconductive interfacial ice absorbs electrostatic energy from the high-frequency alternating electric field. This, in turn, generates high-frequency conductivity AC in the semiconductive interfacial ice. The AC flowing through the moderately resistive semiconductive interfacial ice causes Joule heating, which melts the ice. Thus, the interfacial ice converts a portion of the electrostatic energy into conductivity (resistive) AC, which generates Joule heat. Since the conductivity of interfacial ice is much higher than bulk ice, conductivity AC concentrates in the interfacial ice, heating and melting the interfacial ice. Since practically no conductivity AC flows through the bulk ice, there is insignificant heating and melting of the bulk ice.

Preferably, first electrode 2502 is in direct contact with the outer dielectric film of first freezer package 2522 (or with ice 2532) because air located between the outer dielectric film of freezer package 2522 and first electrode 2502 has a strong dielectric constant. Air causes a voltage drop that is not useful for melting in accordance with the invention. Also, it is preferred that the interconductor distance between adjacent inner conductive layers or between an inner conductive layer and an electrode be minimized. Since the interconductor distance is relatively small, typically on the order of several millimeters or less, a potential difference of about from 2 to 10 volts per layer of ice (e.g., ice between two adjacent freezer packages) is generally sufficient for melting the corresponding interfacial ice.

Figure 16:
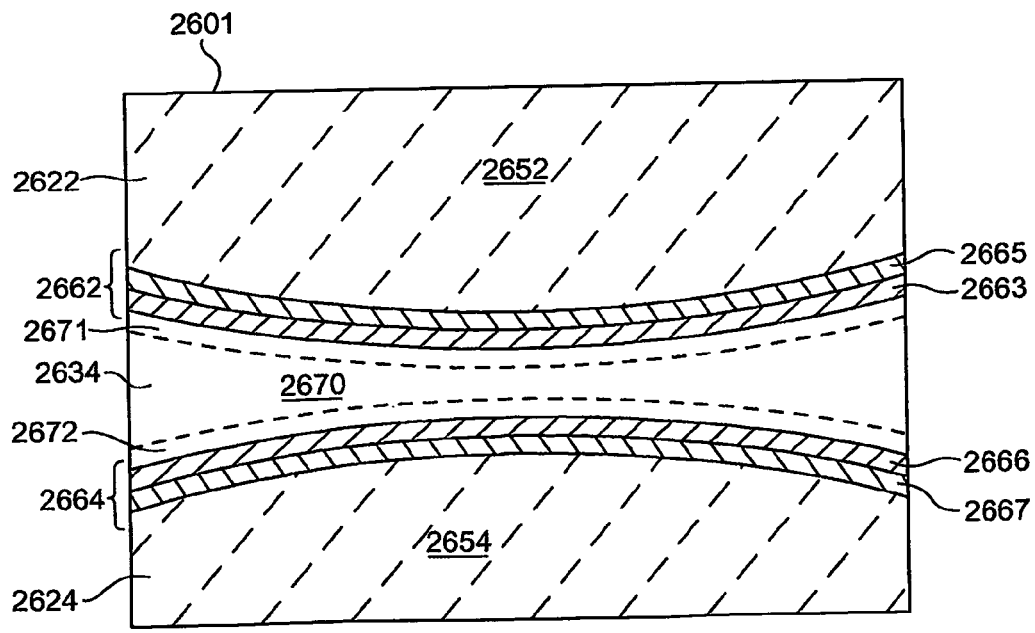
FIG. 16 depicts an exploded, cross-sectional view of ice between adjacent regions of two freezer packages in a system in accordance with the invention.

FIG. 16 depicts an exploded, cross-sectional view of a region 2601 in a system in accordance with the invention in which ice 2634 is located between freezer packages 2622, 2624. Freezer package 2622 includes freezer package wall 2662. Freezer package wall 2662 includes a laminate structure with an outer dielectric film 2663 and a substantially continuous or completely continuous inner conductive layer 2665. Freezer package wall 2664 of freezer package 2624 is also a laminate structure including outer dielectric film 2666 and inner conductive layer 2667. FIG. 16 further shows ice 2634, which includes bulk ice 2670 and interfacial ice layers 2671, 2672. Interfacial ice 2671 is located at the ice-solid interface between ice 2634 and freezer package wall 2662 of freezer package 2622. Similarly, interfacial ice 2672 is located at the ice-solid interface between ice 2634 and freezer package wall 2664 of freezer package 2624. The distance between inner conductive layer 2665 and inner conductive layer 2667 at any location is referred to as the interconductor distance. For a given potential difference between adjacent conductive layers, the strength of the alternating electric field in the interfacial ice is inversely proportional to the interconductor distance. Therefore, it is desirable to minimize the spacing between freezer packages, between a first freezer package and a first electrode, and between a last freezer package a second electrode. As depicted in FIG. 16, contents 2652 of freezer package 2622 are in contact with the inner conductive layer 2665. Similarly, contents 2654 of freezer package 2624 are in contact with inner conductive layer 2667.

Figure 17:
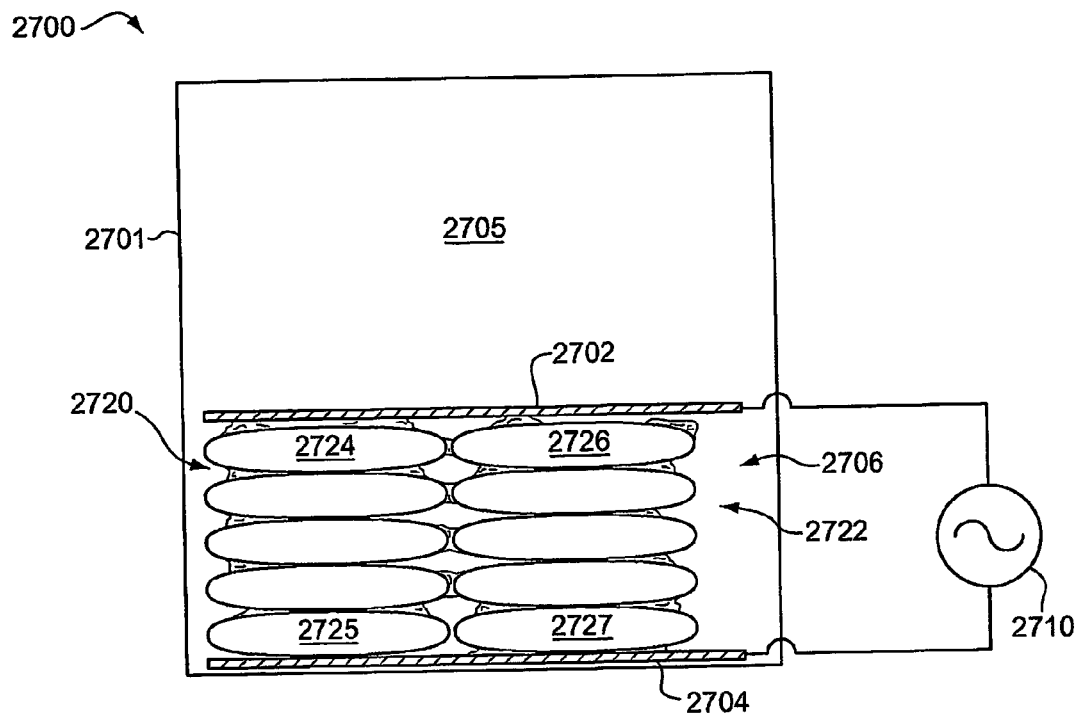
FIG. 17 depicts a freezer system in accordance with the invention that includes a movable first electrode.

FIG. 17 depicts a freezer system 2700 in accordance with the invention. Freezer system 2700 includes freezer housing 2701, first movable electrode 2702 and second electrode 2704. Second electrode 2704 may be integral with freezer housing 2701. Alternatively, second electrode 2704 may be mounted within freezer space 2705 enclosed by freezer housing 2701. Alternatively, second electrode 2704 may be movable within freezer space 2705. As depicted in FIG. 17, a first electrode 2702 is movable for forming a variable interelectrode space 2706 between first movable electrode 2702 and second electrode 2704. Freezer system 2700 further includes AC power source 2710 for providing an AC voltage across the first and second electrodes with a frequency not less than about 1000 Hz, preferably in a range of about from 10 kHz to 30 kHz. A stack 2720 of a plurality of freezer packages and a stack 2722 of a plurality of freezer packages are located in the interelectrode space 2706. Stack 2720 includes a first freezer package 2724 proximate to first electrode 2702, and a last freezer package 2725 proximate to second electrode 2704. Similarly, stack 2722 includes a first freezer package 2726 proximate to fist electrode 2702, and a last freezer package 2727 proximate to second electrode 2704. When a high-frequency AC voltage is applied across electrodes 2702, 2704, Joule heat is generated in the interfacial ice between freezer packages (and between a first or last freezer package and one of the electrodes), causing the interfacial ice to melt, but with insignificant heating of the bulk ice and essentially no heating of the contents of the freezer packages. As a result, freezer packages that were previously frozen stuck in stacks of freezer packages can be moved easily, without undesirable heating of freezer package contents or bulk ice. As freezer packages are removed or moved within the freezer, the size and shape of the stacks 2720, 2722 changes. Movable first electrode 2702 can be moved to minimize the air spacing between first electrode 2702 and first freezer packages 2724 and 2726 in stacks 2720, 2722, respectively. In certain embodiments, first movable electrode 2702 is a flexible mat that conforms to the surfaces of freezer packages (or package) to minimize the interconductor distance between first movable electrode 2702 and the inner conductive layer of the first freezer packages in each stack. A movable electrode in the form of a flexible mat typically includes conductive rubber or a nonconductive flexible material coated with conductive metal or metal oxide. To melt ice located between packages lying at approximately the same vertical level, the first electrode in the second electrode are disposed to generate a potential difference between the packages. For example, ice between packages 2724 and 2726 in FIG. 17 is melted in accordance with the invention by mounting first electrode 2702 on the left side of stack 2720, and mounting second electrode 2704 on the right side of stack 2722.

Figure 18:
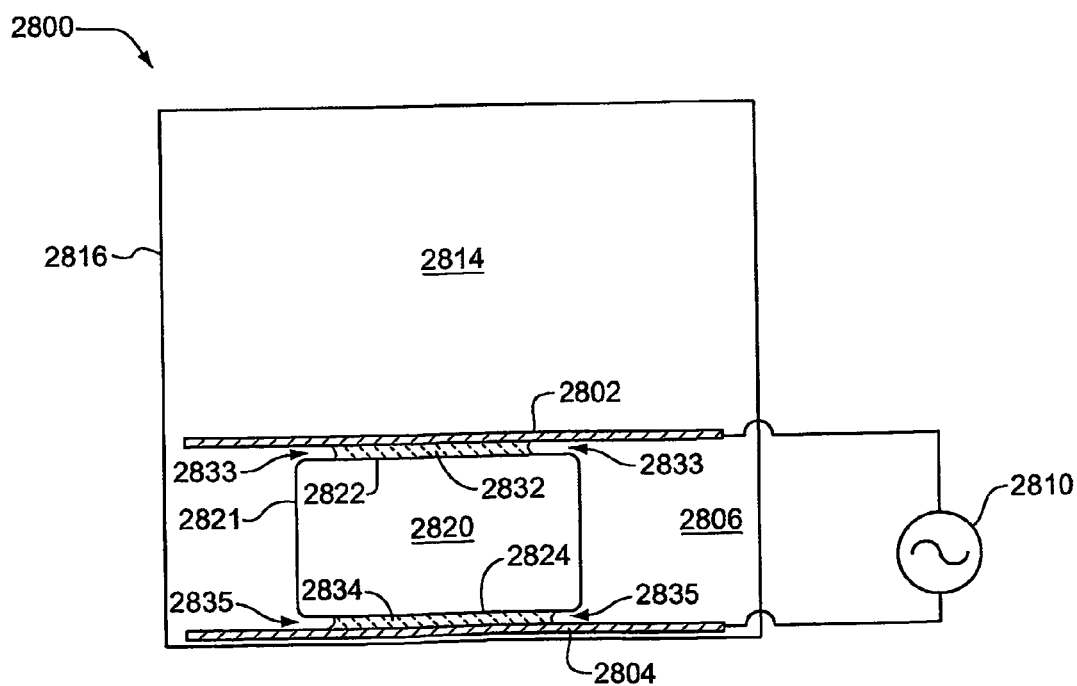
FIG. 18 depicts a system in accordance with the invention for melting ice on a freezer package.

FIG. 18 depicts a freezer system 2800 in accordance with the invention. Freezer system 2800 includes first electrode 2802 and second electrode 2804, which form an interelectrode space 2806. Freezer system 2800 further includes AC power source 2810 for providing an AC voltage across the first and second electrodes with a frequency not less than about 1000 Hz, preferably in a range of about from 10 kHz to 30 kHz. A freezer package 2820 in accordance with the invention is located in the interelectrode space 2806. Typically, interelectrode space 2806 and freezer package 2820 are located within a freezer space 2814, which is enclosed by a freezer housing 2816. Second electrode 2804 may be integral with freezer housing 2801. Alternatively, second electrode 2804 may be mounted within the freezer space 2816. Alternatively, second electrode 2804 may be movable within freezer space 2805. As depicted in FIG. 18, first electrode 2802 is movable for forming a variable interelectrode space 2806 between first movable electrode 2802 and second electrode 2804. Alternatively, first electrode 2802 may be integral with freezer housing 2816 or it may be temporarily or permanently fixed within freezer space 2814. Freezer package 2820 has a freezer package wall 2821, including a wall portion 2822 proximate to first electrode 2802, and a wall portion 2824 proximate to second electrode 2804. Ice 2832 is located in interconductor space 2833 between first electrode 2802 and freezer wall portion 2832. Interfacial ice is located at ice-solid interfaces at the surface of electrode 2802 and at the surface of freezer wall portion 2832. Ice 2834 is located in interconductor space 2835 between second electrode 2804 and freezer wall portion 2824. Interfacial ice is located at the ice-solid interface at the surfaces of electrode 2804 and at the surface of freezer wall portion 2824. When a high-frequency AC voltage is applied across electrodes 2802, 2804, Joule heat is generated in the interfacial ice, causing the interfacial ice to melt, but with no significant heating of the bulk ice and with virtually no heating of the contents of freezer package 2820. As a result, freezer package 2820 can be moved easily, without undesirable heating of freezer package contents or bulk ice.

In embodiments described with reference to FIGS. 13-18, electrodes and freezer packages are arranged vertically. It is understood that a first electrode and a second electrode, freezer packages and other elements described here may be arranged horizontally or in other relative orientations.

Other embodiments in which de-icing is achieved by a high-frequency AEF are described herein mainly with reference to freezer coils and heat exchangers. It is understood, however, that embodiments in accordance with the invention are useful for melting and preventing ice in other, different applications.

A capacitor does not provide strong resistance to high-frequency currents. At high frequency, the capacitor has a low impedance. A capacitor subjected to high-frequency voltage acts virtually as a direct electrical connection between electrical conductors. Thus, a capacitor provides efficient indirect connection of a high-frequency voltage source to an electrical conductor. In systems and methods in accordance with the invention, AC current associated with a high-frequency alternating electric field generated across electrodes by AC voltage causes dielectric loss heating in ice and liquid water.

Figure 19:
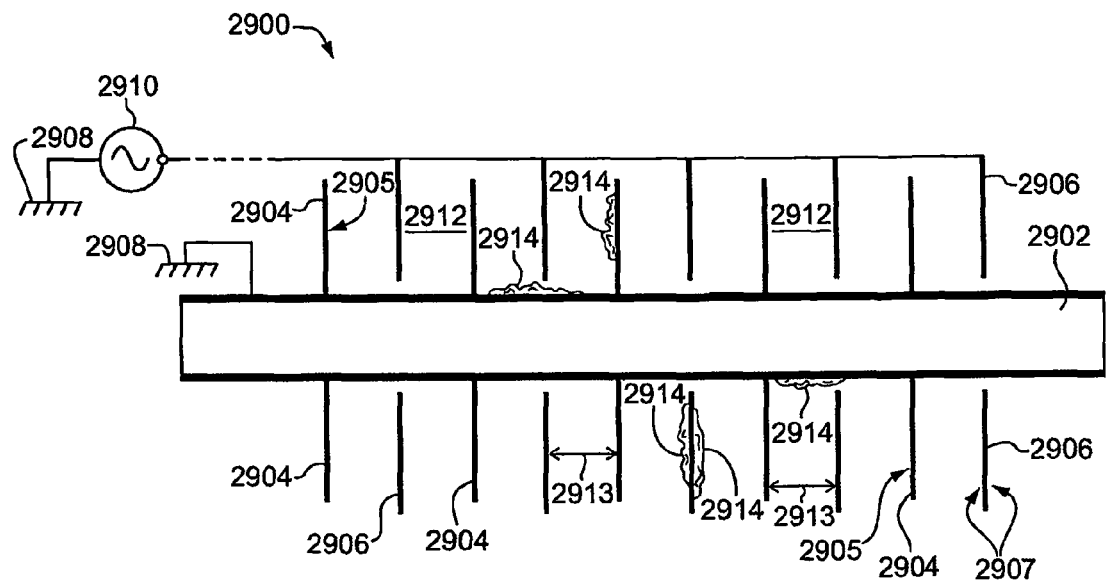
FIG. 19 depicts a system in accordance with the invention in which high-frequency voltage is applied to a set of dummy fins that are alternately disposed adjacent to heat exchanger fins of a cooling coil.
Figure 20:
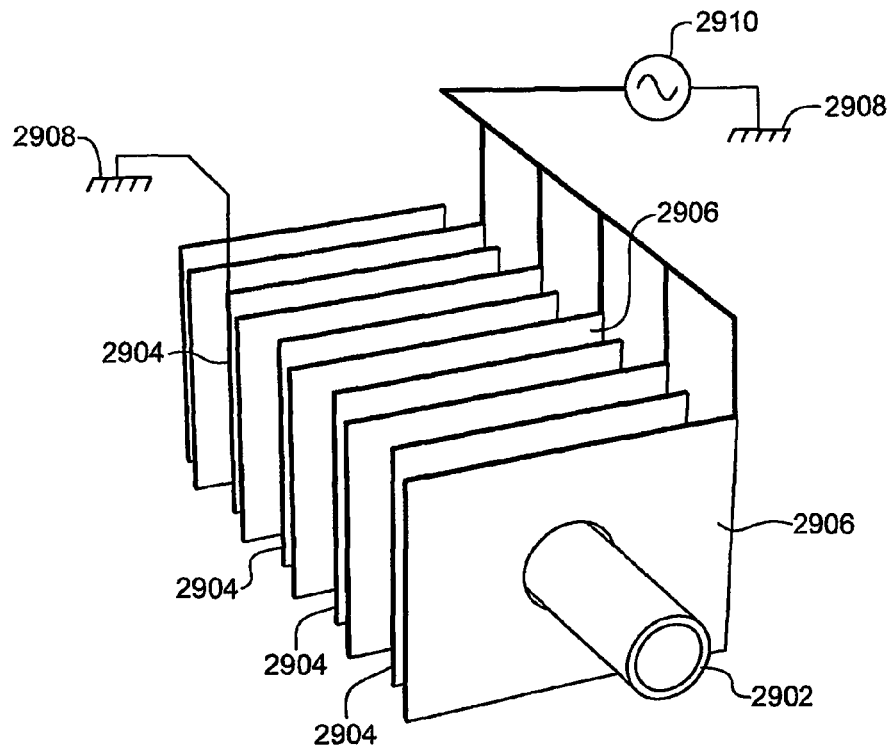
FIG. 20 depicts a prospective view of the system shown in FIG. 19.

FIGS. 19 and 20 depict a system 2900 in accordance with the invention in which high-frequency voltage is applied to two sets of fins of a cooling coil; for example, a cooling coil of a freezer. A system 2900 includes a freezer coil 2902 having conventional heat exchanger fins 2904, which have surfaces 2905. A system 2900 further includes dummy fins 2906, which have surfaces 2907. The surface areas of surfaces 2905, 2907 are typically approximately uniform. The surface areas of surfaces 2905, 2907 are typically in a range of about from 1 $cm^2$ to 100 $cm^2$. The freezing coil 2902 and heat exchanger fins 2904 are connected to electrical ground 2908. Heat exchanger fins 2904 function as first ground electrodes 2904. Dummy fins 2906 are connected to AC power source 2910. Dummy fins 2906 are electrically connected to each other, but are electrically isolated from heat-exchanger fins 2904 and coil 2902. Dummy fins 2906 function as a second electrodes 2906. First electrode fins 2904 have good thermal and electrical contact with cooling coil tube 2902. First electrode fins 2904 and second electrode fins 2906 alternate with each other linearly along freezer coil 2902 and define interelectrode spaces 2912 between each adjacent first electrode 2904 and second electrode 2906. Each pair of adjacent first electrode fin 2904 and second electrode fin 2906 are separated from each other by an interelectrode distance 2913. Typically, the interelectrode distances 2913 between adjacent first and second electrodes is uniform throughout most of system 2900. First ground electrode fins 2904 have the same zero potential because they are connected to electrical ground 2908. The second set of "dummy" fins 2906 carry a high-frequency voltage, thereby generating a high-frequency, high-strength alternating electric field in interelectrode spaces 2912 and on surfaces 2905, 2907 of first-electrode heat-exchanger fins 2904 and second electrode fins 2906, respectively. The electric field strength in the space between the fins is equal to the high-frequency voltage divided by the interelectrode distance 2913. Prevention of atmospheric ice growth on metal surfaces is typically achieved by applying an alternating electric field in a range from 0.5 kV/cm to 5 kV/cm, depending on ambient temperature and relative humidity. For an interelectrode distance 2913 of about 5-mm, the voltage for prevention of icing is typically in a range of 250 volts (rms) to 2.5 kV (rms). Even though the applied voltage is high in certain embodiments, it is not dangerous because the power in the system is low. Typical power consumption is 3 $W/m^2$ in an embodiment in which surfaces 2905, 2907 have areas of about 10 $cm^2$, interelectrode distance 2913 is about 5 mm, and AC power source 2910 has a frequency in a range of about from 1 kHz to 1 MHz. This power corresponds to currents in coil 2902 measured in micro amps. Generally, electric current levels become dangerous about 5 mA.

Ice 2914 located on coil 2902 and ice 2914 on or between fins 2904, 2906 melts because the high-frequency electric field generates dielectric loss heating in the ice. In addition, the high-frequency electric field prevents the formation of significant ice deposits in system 2900. As water vapor cools and condenses on a surface, a thin layer of liquid water is formed on the surface. The conductivity of liquid water is one to two orders of magnitude greater than the conductivity of interfacial ice, and it is about three to four orders of magnitude greater than the conductivity of bulk ice. As a result, a high-frequency alternating electric field in accordance with the invention generates conductivity AC current in the liquid water, causing Joule heat The Joule heating of the liquid water layer causes the water to evaporate from the surface, thereby preventing the formation of ice. Also, because water molecules in water vapor had a large dipole moment, they are energized by the high-frequency electric field and, thus, prevented from condensing of cold fins in the first place.

Figure 21:
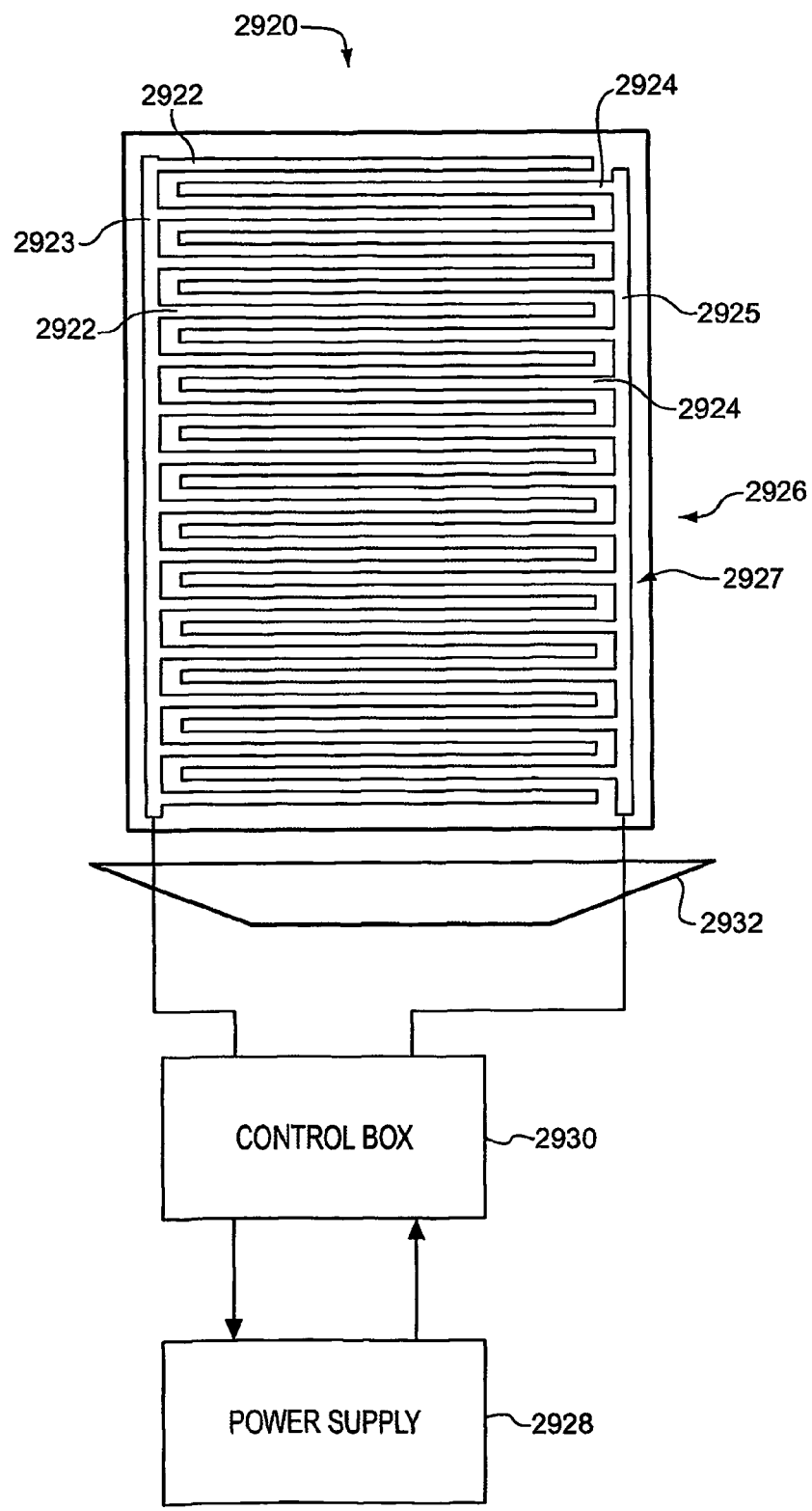
FIG. 21 depicts a system in accordance with the invention in which a plurality of first electrodes and a plurality of second electrodes located on the surfaces of a heat exchanger are interdigitated.

FIG. 21 depicts a system 2920 in accordance with the invention in which a plurality of first electrodes in the plurality of second electrodes are interdigitated. System 2920 includes first electrodes 2922 connected to first electrode stem 2923, and second electrodes 2924 connected to second electrode stem 2925. Interdigitated electrodes 2922, 2924 are disposed on heat exchanger surface 2926 of heat exchanger 2927. As depicted in FIG. 21, first electrode stem 2923 is electrically connected to a terminal of high-frequency power source 2928. Second electrode stem 2925 is connected to another terminal of high-frequency power source 2928. Alternatively, one of either electrode stems 2923, 2925 is connected to power source 2928, and the other electrode stem is connected to electrical ground. As a result, when power supply 2928 applies a voltage to interdigitated electrodes 2922, 2924, there is potential difference between adjacent interdigitated electrodes 2922, 2924. The potential difference generates a high-frequency alternating electric field between adjacent electrodes 2922, 2924. The high-frequency electric field caused by the applied voltage melts ice on heat exchanger 2927. The high-frequency electric field also prevents formation of ice on heat exchanger 2927.

Interdigitated electrodes 2922, 2924 are constructed using one or more a variety of methods and materials. For example, in a typical embodiment in accordance with the invention, interdigitated electrodes 2922, 2924 and electrode stems 2923, 2925 are formed from copper deposited on heat exchanger surface 2926. Preferably, copper electrodes 2922, 2924 are covered by an insulating film, such as a Kapton film. Typically, electrodes 2922, 2924 have a thickness of about 50 µm and a width of about 0.5 mm.

High-frequency power source 2928 typically generates either sinusoidal or square waves of about 30 V to 220 V rms. As electrode width and heating power increases, higher voltage is applied. Typically, the voltage for 0.5 mm-wide electrodes is about 120 volts. The heating power level can be preset to a relatively low value, such as 50 watt/m$^2$, or to a relatively high value, such as 5 kwatt/m$^2$. The greater the high-frequency power, W, the less total energy, Q, is consumed in a de-icing cycle, because Q is inversely proportional to W. The duration of a de-icing operation typically is in a range of from several seconds to several minutes. The power, W, is typically adjusted to such a level that one de-icing cycle per day averaged over a 24-hour time period corresponds to about 2.5 watts.

A variation of an embodiment in accordance with the invention is useful for making ice. In such embodiments, the system does not waste electric power to heat the environment, and it uses relatively little power to melt interfacial ice and to release bulk ice from heat exchanger surface 2927.

Preferably, as depicted in FIG. 21, system 2920 includes control electronics 2930 to detect ice and water on heat exchanger surface 2926 and on interdigitated electrodes 2922, 2924, to measure ice thickness, and to switch "on" and "off" high-frequency power source 2928. Due to a high dielectric constant of ice (e.g., $\in \approx 100$ at $f \leq 1$ kHz), the capacitance between interdigitated electrodes 2922, 2924 gradually increases with increasing ice thickness. When capacitance reaches a preset value corresponding to a threshold ice thickness, the controlling electronics turns on the HF-power supply. The high-frequency alternating electric field caused by the applied voltage generates dielectric loss heating in the interfacial ice at heat exchanger surface 2926. The dielectric loss heating causes the interfacial ice to melt, and ice slides down, preferably into an ice collector container 2932. Impedance of the interdigitated electrodes 2922, 2924 rapidly decreases with appearance of water at the ice/interdigitated-circuit interface surface 2926, because water conductivity exceeds that of ice by one to two orders of magnitude. As impedance decreases below a preset level, control electronics 2930 typically decreases the applied high-frequency voltage and switches power source 2928 completely "off" after a preset time, which allows ice to slide down surfaces 2926. Typically, the control electronics use power of less than 250 mwatt.

Alternatively, interdigitated electrodes 2922, 2924 are thin aluminum electrodes enclosed in anodized aluminum.

Example 2

Figure 22:
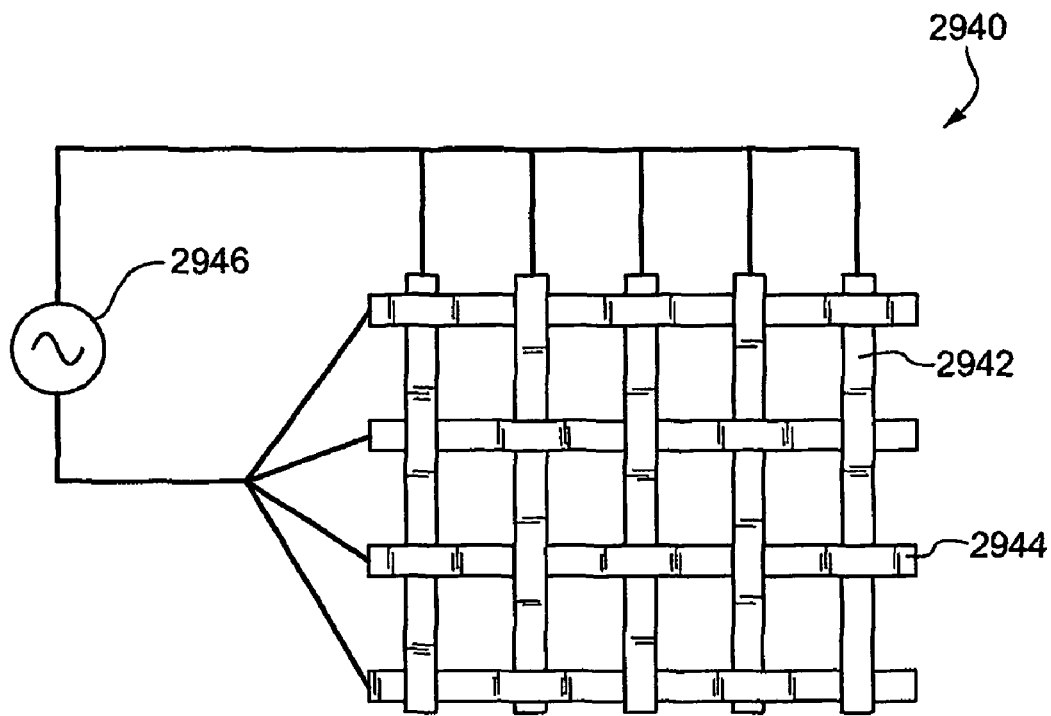
FIG. 22 depicts a wire mesh electrode grid in accordance with the invention, having a plurality of first electrodes perpendicular to a plurality of second electrodes.
Figure 23:
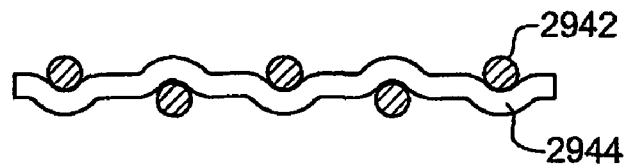
FIG. 23 depicts a cross-sectional view of the electrode mesh of FIG. 22.

An electrode mesh grid 2940 as depicted in FIGS. 22 and 23 was operated to prevent formation of ice in accordance with the invention. Electrode mesh 2940 with a number 120 mesh-gauge had first electrode wires 2942 and second electrode wires 2944 substantially perpendicular to first electrode wires 2942. Electrode wires 2942, 2944 of mesh 2940 were constructed from aluminum, and the aluminum was anodized to separate electrically first electrode wires 2942 from second electrode wires 2944. First electrode wires 2942 were connected to one electric bus, while second electrode wires 2944 were connected to a second bus of a high-frequency power source 2946. As a result, when power source 2946 was turned "on" to apply a voltage to electrode grid 2940, there was a potential difference between first electrodes 2942 and second electrodes 2944.

Figure 24:
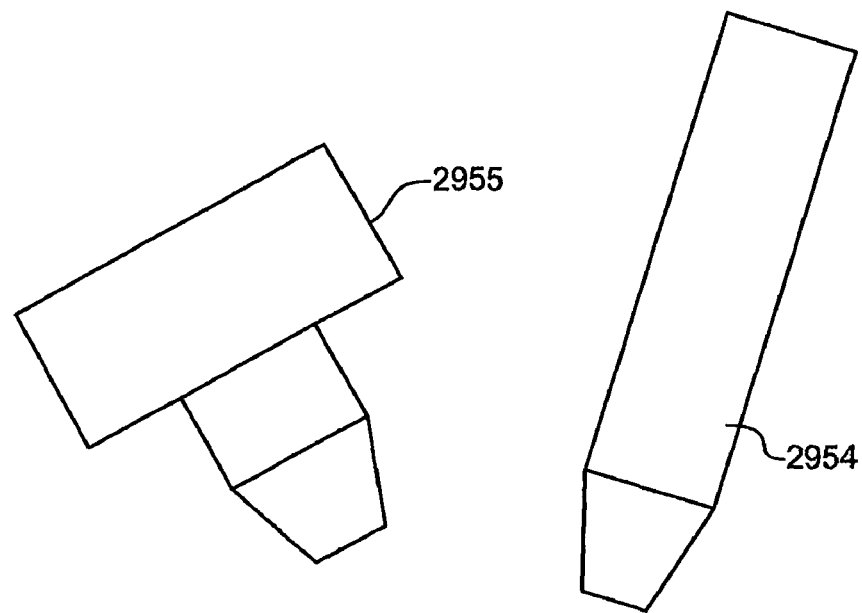
FIG. 24 depicts a system in which a high-frequency voltage is applied to a portion of a grid electrode mesh in accordance with the invention to prevent formation of ice.
Figure 24:
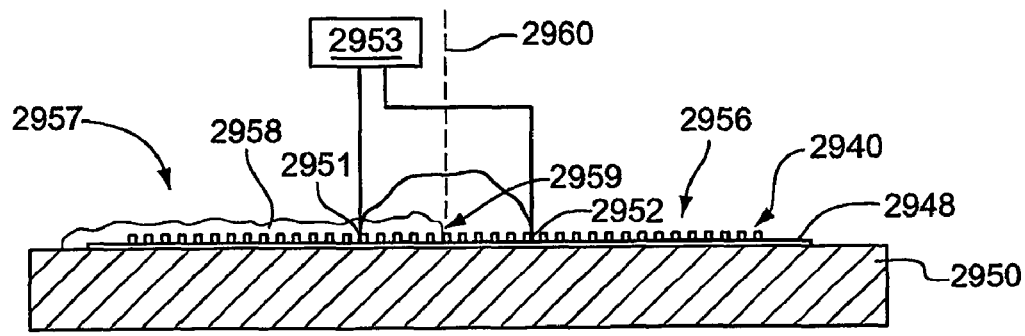
Figure 25:
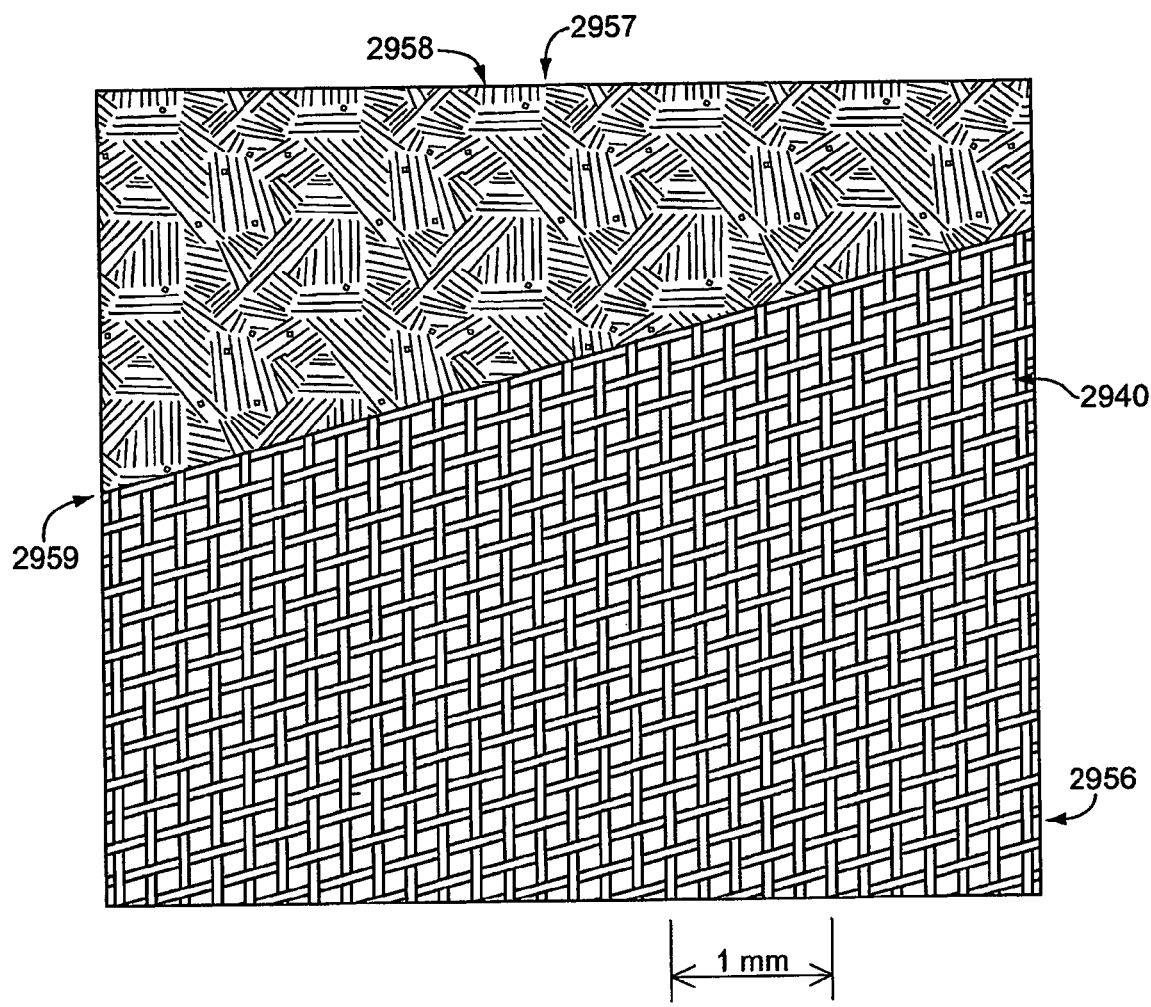
FIG. 25 depicts a top, close-up view of the mesh of FIG. 24 in which ice formation was prevented in accordance with the invention.

As depicted in FIG. 24, electrode mesh 2940 was attached with thermally conductive adhesive 2948 to aluminum plate 2950, which was cooled to and maintained at –7° C. inside a room with an air temperature of 22° C. To increase humidity, a flux of water mist from an air humidifier was directed to the mesh. The mesh temperature was controlled using two differential thermocouples 2951, 2952 attached directly to the mesh 2940 (and connected to meter 2953) and also with a remote infrared optical thermometer 2954. Optical observations were recorded using a digital camera 2955. Mesh 2940 on aluminum plate 2950 had a surface area of about 35 cm$^2$. Only about one-half of the mesh, "active portion" 2956, was connected to high-frequency power source 2946. The other half of mesh 2940, "passive portion" 2957, was not electrically connected to power source 2946. Thermocouple 2951 measured the temperature of passive portion 2957, and thermocouple 2952 measured the temperature of active portion 2956. Power source 2946 was used to apply a voltage of 35 V rms at a frequency of 20 kHz to active portion 2956. The system was observed and measurements taken for approximately three hours. The power consumption did not exceed 4 W/m$^2$. Furthermore, while the high-frequency power was being applied, the mesh temperature of –7° C. did not change outside of the measurement precision range of ±0.25° C. Different icing results were observed on active portion 2956 and passive portion 2957 of electrode mesh 2940. Active portion 2956 remained clear of ice and frost during the whole observation period of approximately 3 hours, while a rapid growth of frost and ice 2958 was observed on passive portion 2957. As depicted in FIGS. 24 and 25, a sharp edge 2959 of the frost and ice deposit was observed, corresponding to the boundary 2960 between active portion 2956 and passive portion 2957. Based on the distances between wires 2942, 2944, a mean strength of the high-frequency alternating electric field was calculated to be about 2.8 kV/cm. Thus, the surface area corresponding to active portion 2956 was protected against formation of ice in accordance with the invention.

Figure 26:
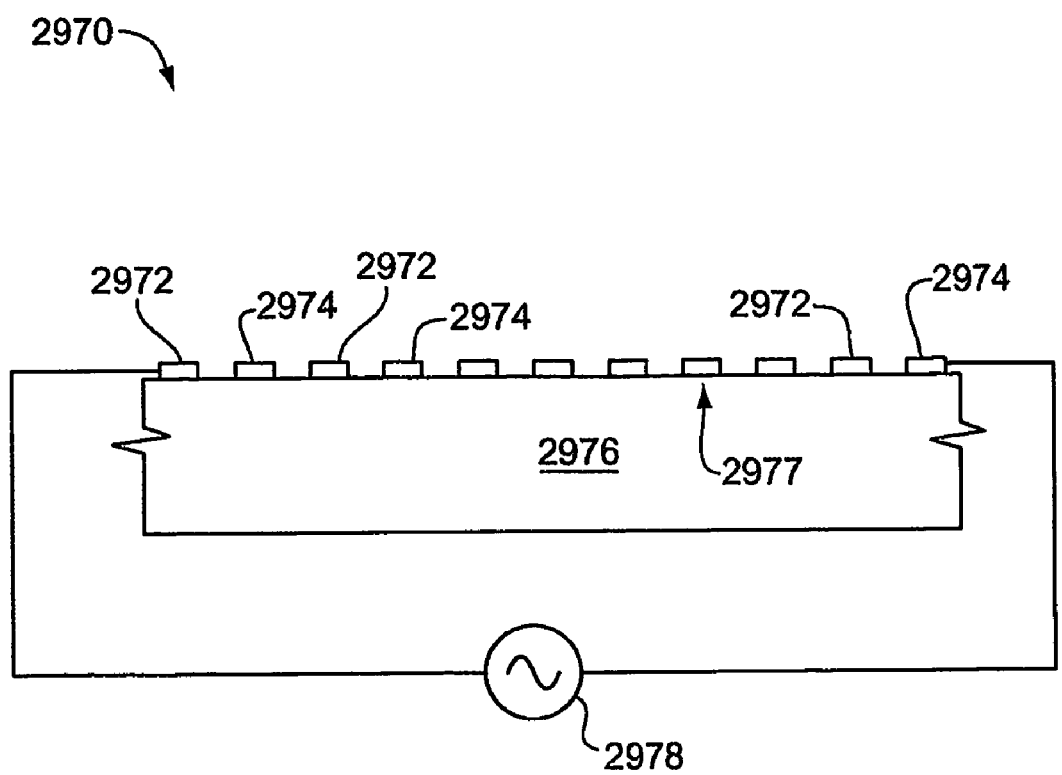
FIG. 26 depicts a generalized system in accordance with the invention in which a plurality of first electrodes and a plurality of second electrodes are disposed in alternating manner on a solid object.

It is understood that a system and a method in accordance with the invention are useful to melt ice and prevent ice formation in locations apart from freezers and heat exchangers. FIG. 26 depicts a generalized system 2970 in which a plurality of first electrodes 2972 and a plurality of second electrodes 2974 are disposed in alternating manner on solid object 2976 having a surface 2977. High-frequency power source 2978 is connected electrically to electrodes 2972, 2974 and applies a voltage to the electrodes so that there is potential difference between first electrodes 2972 and adjacent electrodes 2974. The potential difference generates a high-frequency alternating electric field in accordance with the invention, which melts the ice and prevents ice formation on external surface 2977 and in the space in which the high-frequency electric field exists. Alternatively, power source 2978 is connected to one set electrodes, for example, first electrodes 2972, and the other set of electrodes is connected to electrical ground. Power source 2970 provides a voltage having a frequency not less than 100 Hz, and typically in range of from 1000 Hz to 100 MHz; for example, 10-20 kHz.

Solid object 2976 is typically a freezer heat exchanger. In various embodiments in accordance with the invention, solid object 2976 is any object to be protected against ice; for example, part of an aircraft, a ship, a window or windshield, or a transportation surface. Typical transportation surfaces include: roads, bridges, and airport runways.

Systems and methods in accordance with the invention are useful in a wide variety of circumstances and applications to melt ice and to prevent formation of ice, particularly on a solid surface. Examples of surfaces that may be protected in accordance with the invention include, nonexclusively: airplane wings and helicopter blades; windshields and windows of planes, automobiles, and trains; and heat exchanger coils.

Methods, systems and structures in accordance with the invention also prevent and remove ice and snow on surfaces of objects by utilizing electric discharge of plasma in an AEF to generate heat. The composition and pressure of the gas in the gas-filled layer is selected so that the AEF causes electric breakdown and generates a plasma in the gas-filled layer. Electric discharge through the plasma results in Joule heating, causing ice to melt. In one preferred embodiment in accordance with the invention, the AEF causes electric breakdown and plasma formation when ice is present on the cable, but does not cause electric breakdown when there is no ice present.

In one aspect, an embodiment in accordance with the invention for preventing ice and snow on a surface of an object typically includes an electrical conductor. The conductor generates an AEF in response to an AC voltage. A power source typically provides AC voltage in a range of about from 10 kV to 1300 kV. A system also includes a gas-filled layer proximate to the electrical conductor. The gas is selected so that it forms a plasma in response to the AEF. Preferably, the gas pressure is selected so that electric breakdown occurs at peak field strength. If the gas pressure in the gas-filled layer is higher than atmospheric pressure, the gas electric strength is higher than the strength at atmospheric pressure. This results in breakdown at higher voltage. If the gas pressure in the gas-filled layer is lower than atmospheric pressure, the gas electric strength is less than the strength at atmospheric pressure, and electric breakdown of the gas occurs at lower electric field strength.

Upon electric breakdown, accumulated electrostatic energy discharges through the plasma. The electric discharge through the plasma transforms energy of the electric field into heat Without plasma, only capacitive AC passes through the region between the power transmission line and the ice. The conductivity of the plasma results in conductivity (resistive) AC in the plasma In this manner, most of the energy of the electric field accumulated in the gas-filled layer is converted by resistive AC into heat. The thickness of the gas-filled layer is typically selected to correspond to an amount of heat desired to be generated in the gas-filled layer.

Preferably, the strength of the AEF in and near the gas-filled layer is increased by the presence of an electrically conductive layer that is electrically insulated from the electrical conductor. Preferably, the gas-filled layer containing plasma-forming gas is located between the electrical conductor and a conductive layer. Because the conductive layer is much more conductive than air (or other ambient gas), the voltage drop across the gas-filled layer between the electrical conductor and the conductive layer is much higher than in the surrounding air or other ambient gas. This increases the electric field strength between the electrical conductor and the conductive layer. Preferably, the conductive layer is an ice layer.

A gas-filled layer is "proximate" to an electrical conductor if an AEF formed by an AC voltage present in the conductor causes electric breakdown of gas in the gas-filled layer, thereby causing discharge of electrostatic energy through the resulting gas plasma in the gas-filled layer, in particular, when a conductive layer (such as an ice layer) is present Preferably, the AEF has a field strength in a range of about from one to 100 kV/cm at the gas-filled layer. As a practical matter, the electrical conductor is typically structurally integral with the object being protected from ice and snow. For example, the conductor is included in a high-voltage power transmission line or an airplane wing. Similarly, the gas-filled layer is typically contiguous with the surface of the object, or contained within it For example, the gas-filled layer typically covers a power transmission line, or is included within an airplane wing, adjacent to the wing surfaces. When a heat-generating gas-filled layer is included within the surface, or is in direct physical contact with the surface, heat transfer between the gas-filled layer and the surface is usually enhanced. The term "gas-filled layer" and related terms refer to a layer containing one or a plurality of enclosed volumes of a plasma-forming gas. Since each volume of plasma-forming gas is enclosed, so that plasma gas ions are substantially retained within the gas-filled layer, an AEF having sufficient field strength generates a concentration of electrically charged plasma ions to form a plasma having sufficient electrical conductivity to produce Joule heating. Typically, a gas-filled layer is included within a region formed by an outer shell.

A conductive layer proximate to the electrical conductor that increases the strength of the AEF in the gas-filled layer may be a permanent conductive layer made from conductive metal or metal oxide. A permanent conductive layer, such as a conductive outer shell, typically has thickness of about 0.1 to 4 several millimeters. Preferably, the conductive layer is ice, which is semiconductive. Ice is sufficiently conductive at low frequencies (e.g., 100 Hz) to increase electric field strength around a power transmission line or other electrical conductor. The conductivity of the ice increases as frequency increases.

Preferably, an outer shell in accordance with the invention is nonconductive, and the conductive layer is a layer of semi-conductive ice located on the nonconductive outer shell. Such embodiments are self-regulating because when the semiconductive ice is removed through melting, the AEF strength near the electrical conductor decreases, thereby effectively stopping electric breakdown and plasma formation.

An electrical conductor in accordance with the invention may include a variety of structures and material compositions. A power transmission line typically includes a bundle of aluminum main conductor cables. An airplane wing, the hull or superstructure of a ship, or a ground transportation bridge typically include conductive metals. In other embodiments, an electrical conductor may be formed on the surface of a nonconductive object being protected by various techniques, including painting and photolithography.

In certain embodiments in accordance with the invention, for example, in high-voltage power transmission lines, AC voltage for generating the AEF is generally already present. In other embodiments, a dedicated AC power source may be used to provide AC voltage; for example, in systems to de-ice airplane wings.

Figure 27:
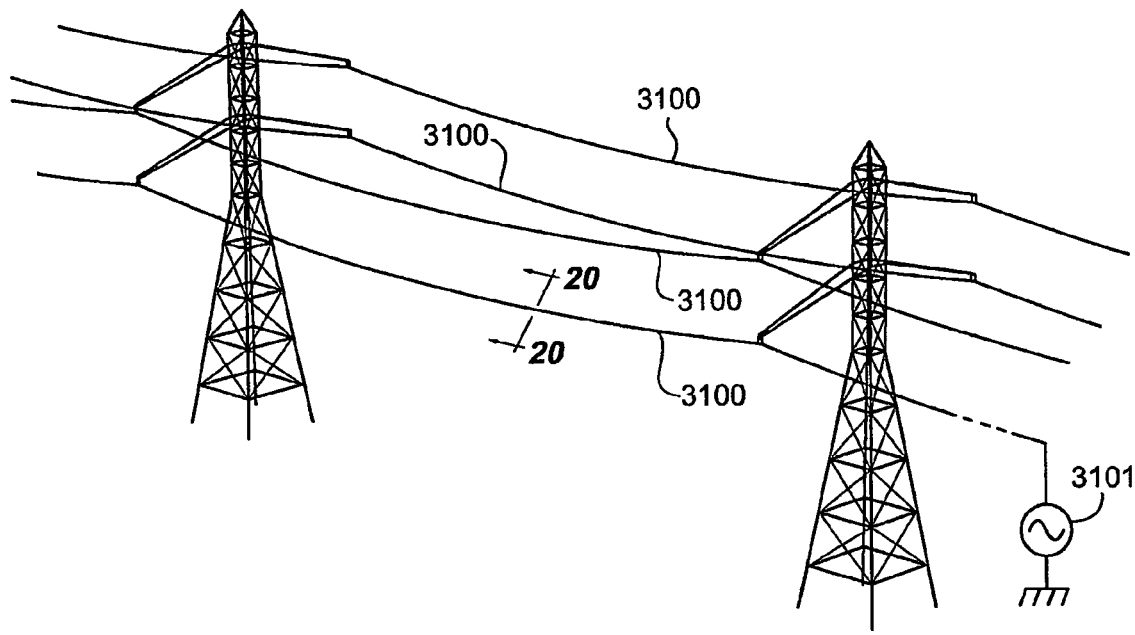
FIG. 27 shows a sketch of high-voltage power transmission lines for which an embodiment utilizing electric discharge through a plasma in accordance with the invention is used for removing ice.
Figure 28:
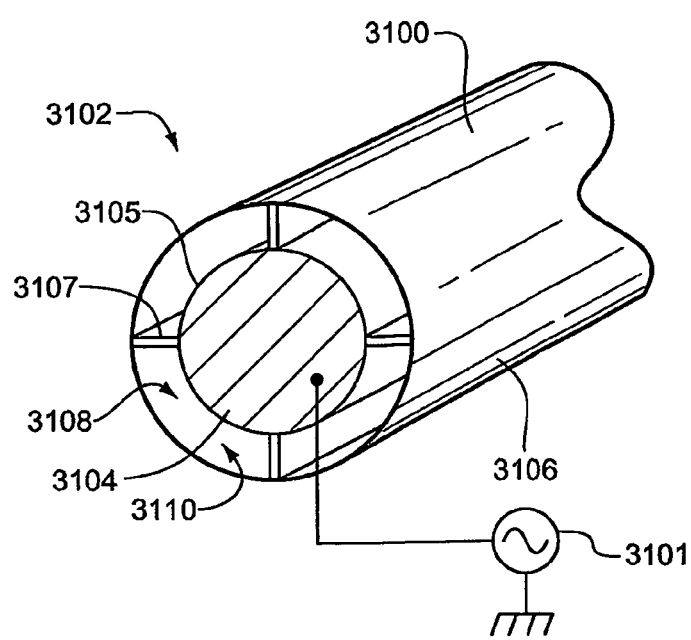
FIG. 28 shows a cross-sectional view of a power transmission line fabricated in accordance with the invention.

FIG. 27 shows a sketch of power transmission lines in which an embodiment in accordance with the invention is utilized to remove ice on power transmission lines 3100 connected to AC power source 3101. FIG. 28 shows a perspective view 3102 of a high-voltage power transmission line 3100 constructed in accordance with the invention. Power transmission line 3100 is connected to AC power source 3101. Power transmission line 3100 includes a main conductor 3104 with a surface 3105. Main electrical conductor 3104 typically carries high-voltage AC. The AC typically has a frequency in an approximate range of from 50 to 120 Hz. The AC voltages common in high-voltage power transmission lines typically generate a strong AEF. A typical electric field strength around a power transmission line is just below about 30 kV/cm, which is near the electric breakdown value of air. Electrical conductor 3104 is enclosed by outer shell 3106. Electrically insulating solid spacers 3107 separate electrical conductor 3104 and outer shell 3106, thereby forming space 3108 between conductor 3104 and outer shell 3106. A gas-filled layer 3110 is disposed in the space 3108 between outer shell 3106 and the surface 3105 of main conductor 3104. Preferably, outer shell 3106 is electrically nonconductive. When the field strength of the AEF reaches the electric breakdown threshold of the gas in the gas-filled layer 3110, electric discharge and plasma formation occur in the gas-filled layer 3110. The accumulated electrostatic energy discharges through the plasma in gas-filled layer 3110. Most of the energy of the electric field is thereby transformed into heat by means of conductivity (resistive) current. The heat then melts ice and snow. Thus, heat is generated from previously unused electromagnetic energy to melt or prevent ice on the power transmission line. This embodiment utilizes the AEFs that already exist due to the high AC voltages present in a power transmission line.

Figure 29:
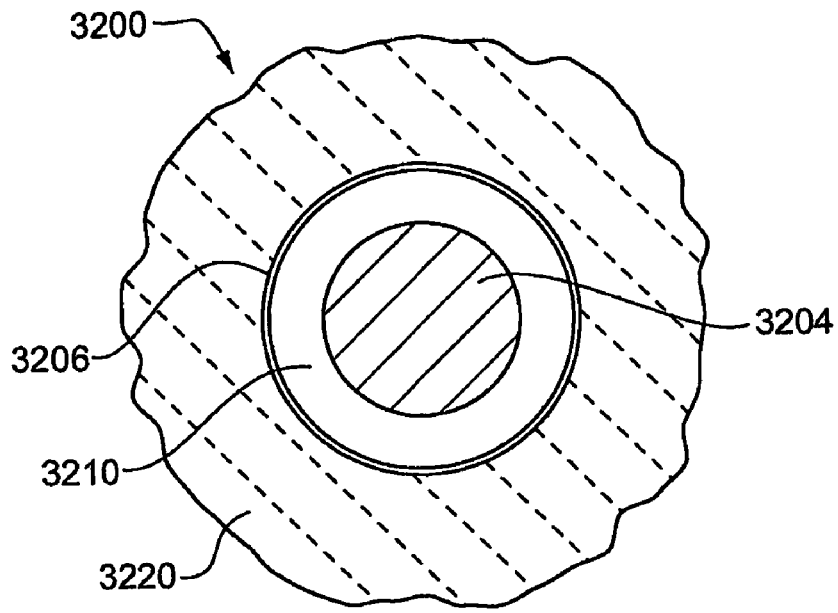
FIG. 29 depicts a conductor enclosed by an outer shell and by a gas-filled layer between the conductor and the outer shell, which are covered by an ice layer.
Figure 30:
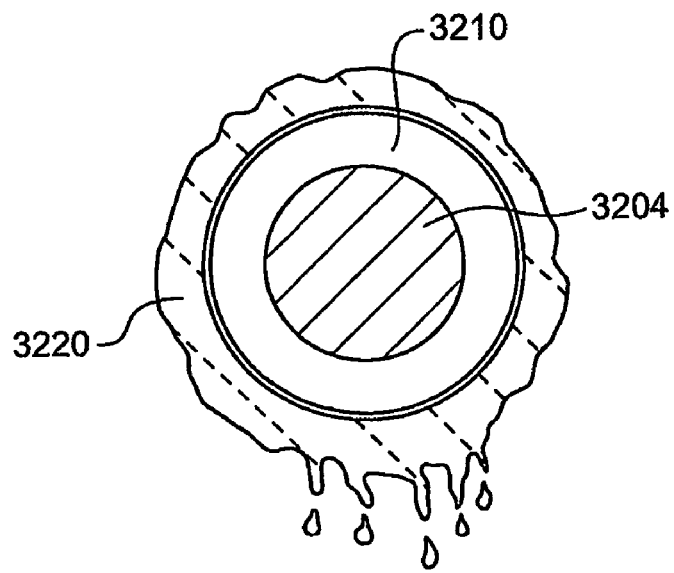
FIG. 30 depicts in schematic form the melting of ice caused by Joule heating in plasma in accordance with the invention.

FIG. 29 depicts a system 3200 in accordance with the invention that includes a conductor 3204 enclosed by electrically nonconductive outer shell 3206 and by a gas-filled layer 3210 between conductor 3204 and outer shell 3206. During operation, a layer of ice 3220 causes an increase in the strength of the AEF in the gas-filled layer 3210. The increased strength of the AEF causes electric breakdown and plasma formation in gas-filled layer 3210. The discharge of accumulated electrostatic energy through the plasma causes Joule heating in accordance with the invention. As depicted in FIG. 30, the heat generated in the plasma through the absorption of electrostatic energy melts ice 3220 in accordance with the invention. An advantage of such embodiments in accordance with the invention is that heating by electric discharge through the plasma does not require a "control" box to be turned "on" or "off". When ice is present and forms a conductive layer, the AEF in the gas-filled layer reaches an electric breakdown threshold. As the ice melts, the electric field strength decreases, effectively stopping electric breakdown and plasma formation, and thereby reducing energy consumption.

The thickness of the gas-filled layer in accordance with the invention is typically in a range of about from 0.5 mm to 10 mm, although other thicknesses can be applied depending upon desired heating power. Generally, the volume of the plasma-forming gas affects the amount of electric energy discharged in the gas-filled layer, and the heating power generated. The pressure of the gas in gas-filled layer 3110, 3210 may be above or below atmospheric pressure, depending on gas composition, power line frequency and voltage, and other selected operating variables. Depending on the composition and pressure of the plasma-forming gas, as well as on the other operating variables, the strength of the AEF utilized in a system and a method in accordance with the invention may vary. The voltage of a conventional power transmission line typically generates an AEF with a field strength at the power line just below about 30 kV/cm, which is near the electric breakdown value of air. Generally, an AEF with a field strength in a range of about from 1 kV/cm to 100 kV/cm is utilized in accordance with the invention, although field strength values above or below this range are useful. A system and a method in accordance with the invention are useful throughout the whole range of typical power transmission frequencies, that is, about from 50 Hz to 1 MHz. Similarly, they are useful throughout the typical voltage range of power transmission, that is, in a range of about from 10 kV to 1300 kV. Within these operating parameters, it is possible to achieve a practical heating power value in a range of about from 20 to 150 watts per meter length of power transmission line to melt ice. Preferably, electric breakdown occurs at peaks in AEF strength.

Figure 31:
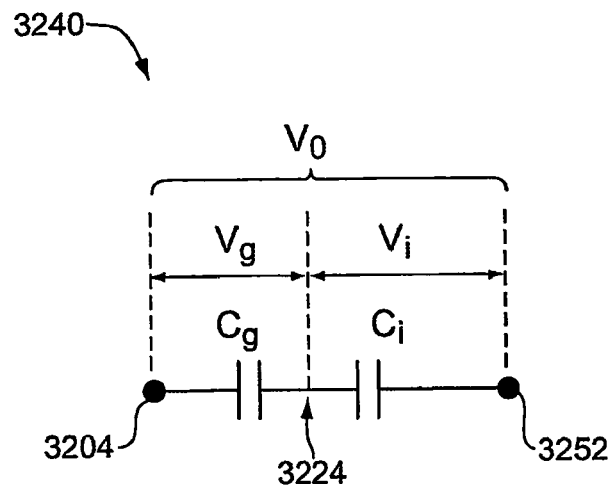
FIG. 31 shows an equivalent circuit diagram of a system operated in accordance with the invention.

FIG. 31 shows an equivalent circuit diagram 3240 of system 3200 operated in accordance with the invention. In FIG. 31, $V_0$ represents the voltage in electrical conductor 3204; for example, a power line voltage. The symbol $C_g$ represents a combined "gap capacitance" of electrical conductor 3204 and gas-filled layer 3210 between electrical conductor 3204 and conductive layer 3224. Conductive layer 3224 is typically a layer of semiconductive ice, such as ice layer 3220 in FIG. 29. In other embodiments, conductive layer 3224 may be a conductive outer shell. $C_i$ represents an "interwire" capacitance between conductive layer 3224 and another conductor (e.g., a power transmission line), electrical ground, or some other "sink" 3252. The symbol $V_g$ represents the voltage drop across gas-filled layer 3210 between electrical conductor 3204 and conductive layer 3224. The symbol $V_i$ represents the voltage drop between conductive layer 3224 and sink 3252. Practically, the sum of $V_g$ and $V_i$ is $V_0$.

Figure 32:
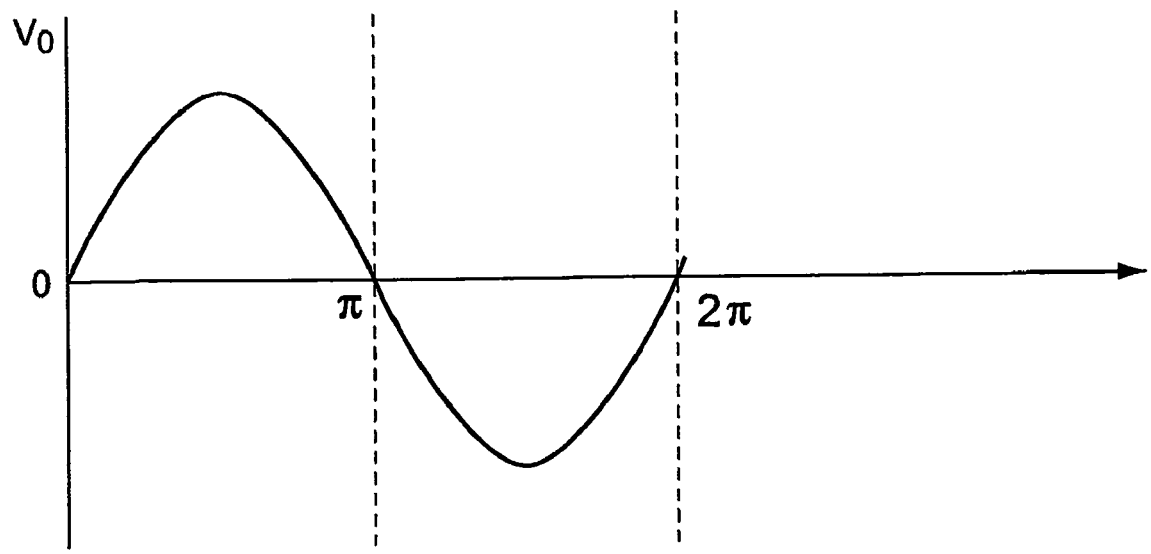
FIG. 32 depicts a representative graph of an alternating cycle of the AC voltage in an electrical conductor in accordance with the invention.
Figure 33:
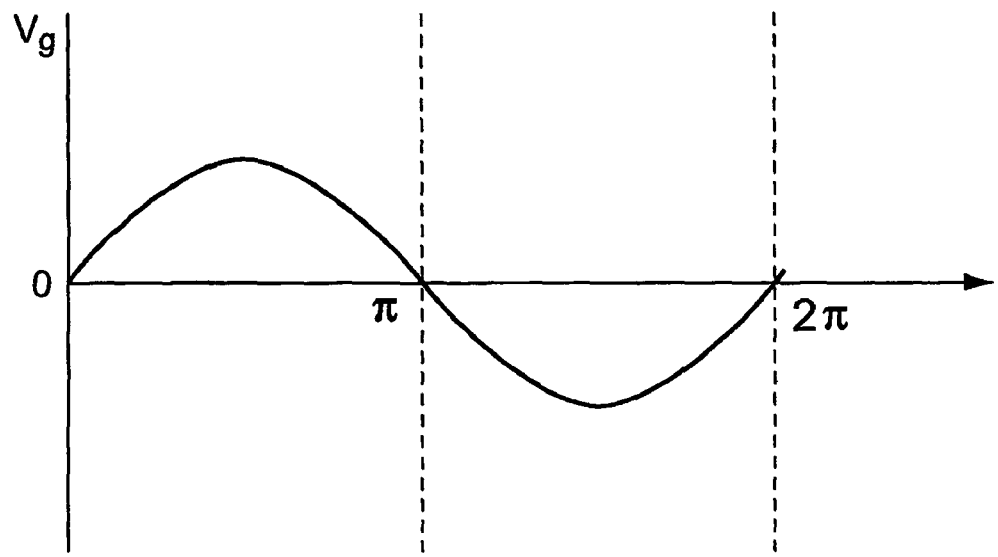
FIG. 33 depicts a representative graph of voltage as a function of cycle time across a gas-filled layer without electric breakdown.
Figure 34:
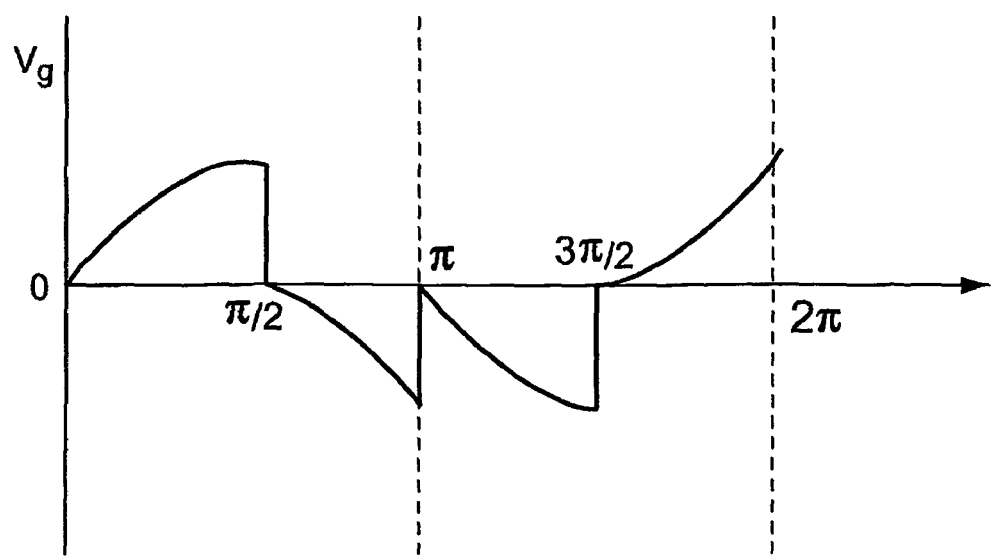
FIG. 34 depicts in schematic form a representative graph of voltage as a function of cycle time in a gas-filled layer with electric breakdown in accordance with the invention.

The operation of circuit 3240 is described with reference to FIGS. 24-28. FIG. 32 depicts a graph of an alternating cycle of the AC voltage, $V_0$, in electrical conductor 204. FIG. 33 depicts a corresponding graph of "gap voltage", $V_g$, across gas-filled layer 210 as a function of cycle time, without electric discharge through a plasma In contrast, FIG. 34 depicts in schematic form a graph of "gap voltage", $V_g$, in the gas-filled layer as a function of cycle time with electric breakdown and electric discharge through the plasma in gas-filled layer 210, in accordance with the invention. In a given system, the frequency of electric charge accumulation and electric breakdown and discharging depends on the operating voltage, AC frequency, plasma composition and pressure, physical dimensions, and other operating variables. Preferably, the composition and pressure of the plasma-forming gas in the gas-filled layer is selected so that four electric discharges occur per AC cycle. Electric breakdown and discharging occurring in such a pattern release power available for heating and melting ice. In the graph of FIG. 34, electric breakdown occurs at peak field strength.

Figure 35:
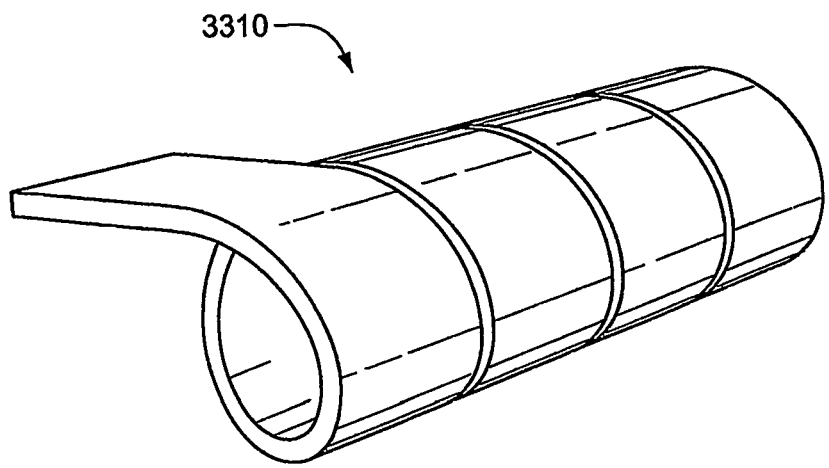
FIG. 35 shows a flexible gas-filled band that may be wrapped in a spiral-like fashion around a power transmission line, or around some other object being protected against ice in accordance with the invention.
Figure 36:
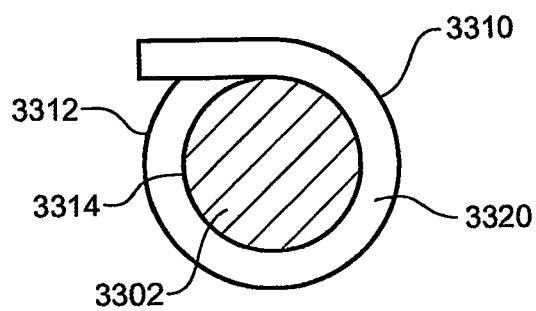
FIG. 36 shows an electrical conductor covered by a flexible band that includes a gas-filled layer in accordance with the invention.

The gas-filled layer may have different structures and be formed in various ways. In a typical embodiment, a gas-filled layer is disposed on an object being protected against ice. As depicted in FIG. 28, outer shell 106 may be a rigid outer shell surrounding a power transmission line, or other object being protected, thereby forming an enclosed space that can be filled with a selected plasma-forming gas at a selected pressure. Another example of a gas-filled layer in accordance with the invention is depicted in FIG. 35, which shows a flexible gas-filled band 3310 that may be wrapped in a spiral-like fashion around a power cable, or around some other object being protected. FIG. 36 shows electrical conductor 3302 covered by a flexible band 3310 in accordance with the invention. The flexible band has an outer wall 3312 and an inner wall 3314 that are joined and sealed together along their edges, but which are electrically insulated from each other. The volume between outer wall 3312 and inner wall 3314 is filled with gas at a desired pressure to form a gas-filled layer 3320 in accordance with the invention.

Figure 37:
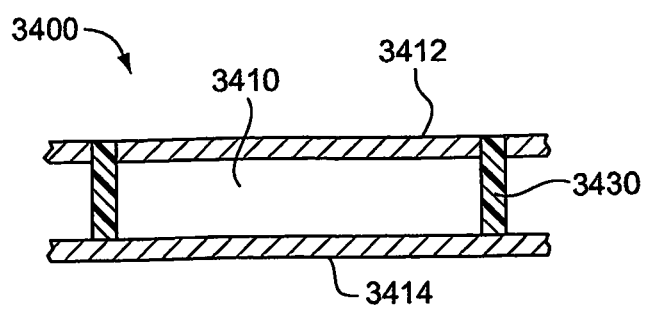
FIG. 37 depicts a section of a gas-filled layer enclosed by a conductive outer shell in accordance with the invention, wherein the section of conductive outer shell is electrically insulated from the rest of the outer shell to prevent discharge at one location of large amounts of charge accumulated on the outer shell.

An outer shell or an outer wall 3312 may be conductive or nonconductive. If an outer shell, outer wall or permanent conductive layer is conductive, then it is preferably divided by electrical insulation into short sections. For example, a conductive outer wall 3312 around a power line is preferably divided by electrical insulation into short sections not exceeding about 10 meters length. If an outer shell, outer wall or permanent conductive layer covers another structure, then it is preferably divided into similarly small electrically isolated areas. This is because all of the charge accumulated on a conductive outer shell or wall discharges at the single location at which electric breakdown occurs. If the area with accumulated charges is large, then the large electric discharge damages the outer shell or wall. FIG. 37 depicts a section 3400 of a gas-filled layer 3410 enclosed by conductive outer shell 3412 and the surface of electrical conductor 3414. Conductive outer shell 3412 of section 3400 is electrically isolated from the rest of the conductive outer shell by dielectric insulator spacers 3430, which also physically separate electrical conductor 3414 and outer shell 3412 to form the space occupied by gas-filled layer 3410. Preferably, an outer shell or outer wall that is conductive includes only a thin layer of metal or conductive metal oxide. A thin layer of metal, for example, with a thickness of about 0.1 mm, does not influence the electric field strength of an AEF. Thus, an embodiment having a thin conductive outer shell is self-regulating because plasma formation and electric discharge occur only when ice having a certain thickness covers the outer shell (or conductive wall), thereby increasing electric field strength.

Some embodiments of the invention with a thick conductive outer shell, outer wall, or permanent conductive layer also include a switch between the electrical conductor and the outer shell for turning the system "on" and "off". This system is turned "off" by closing the switch, which electrically shorts the electrical conductor and the outer shell, thereby reducing the electric field strength in the gas-filled layer to substantially zero and practically preventing electric breakdown and discharge. For example, a conductive outer shell with a metal layer of 1 mm thickness significantly increases the electric field strength between the electrical conductor in the outer shell. A switch for electrically shorting an electrical conductor to an outer layer is impractical, however, in embodiments in which an outer shell, an outer wall or permanent conductive layer is divided into many electrically isolated sections.

If an outer shell or outer wall of a flexible band is nonconductive, then the discharge current flows only across the gas-filled layer between the conductor and the outer shell or wall; it does not flow along a surface of the nonconductive outer shell or wall. As a result, large amounts of accumulated charge do not discharge at a single location. A nonconductive outer shell or outer wall may be fabricated using conventional dielectric materials, such as plastic, glass or ceramic.

Figure 38:
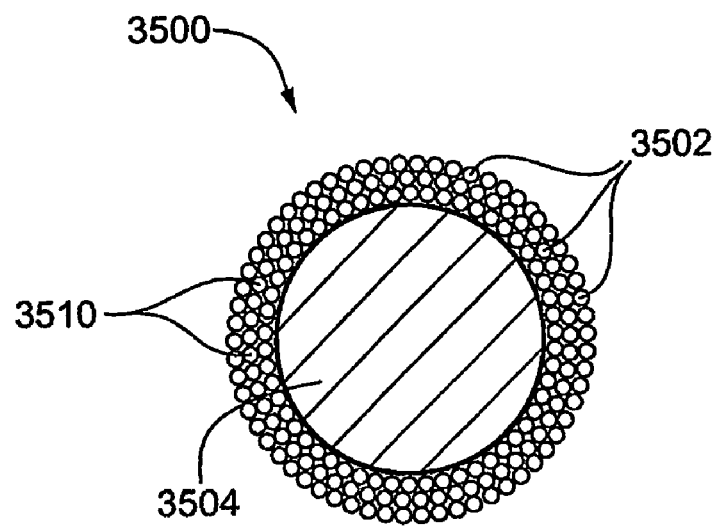
FIG. 38 depicts in schematic form a cross-sectional view of an embodiment in accordance with the invention in which a large number of small gas-containing balls are attached by adhesive or by some other means around an electrical conductor to form a gas-filled layer.
Figure 39:
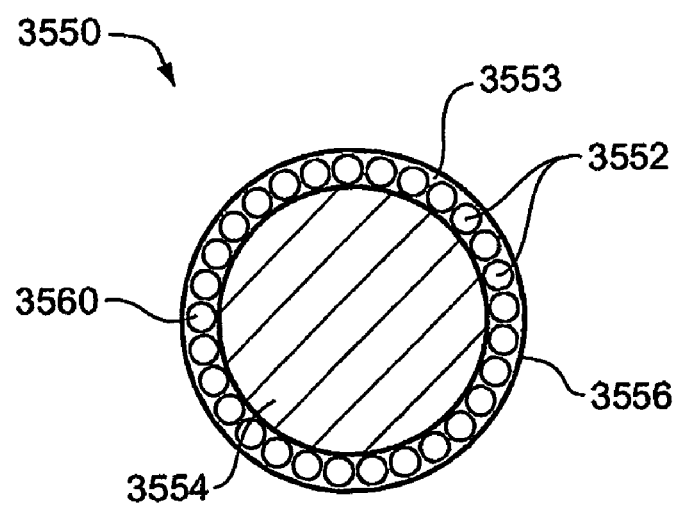
FIG. 39 depicts an embodiment in accordance with the invention of gas-filled balls enclosed in the space between an electrical conductor and an outer shell, thereby forming a gas-filled layer.

FIG. 38 depicts in schematic form a cross-sectional view of an embodiment 3500 in which a large number of small balls 3502 are attached by adhesive or by some other means around an electrical conductor 3504 to form a gas-filled layer 3510 in accordance with the invention. The balls 3502 are formed by walls of suitable dielectric material, and they are filled with suitable plasma-forming gas at a desired pressure. FIG. 39 depicts a similar embodiment 3550 with gas-filled balls 3552 enclosed in the space 3553 between conductor 3554 and outer shell 3556, thereby forming a gas-filled layer 3560 in accordance with the invention. In embodiments as in FIG. 39 in which the gas-filled layer is formed by gas-filled balls with dielectric walls, it does not matter whether outer shell 3556 is electrically conductive or nonconductive because the discharge current flows only across the gas filled layer 3560, not along the shell wall 3556.

Typically, the surface of an electrically conductive structure itself is being protected from ice or snow, in accordance with the invention. For example, similar to power line de-icing, the surface of a conductive airplane wing may be protected by disposing a gas-filled layer in accordance with the invention on the wing surface and flowing AC at a suitable voltage through the wing. In other instances, a gas-filled layer may be embedded in the object being protected, below the surface exposed to icing. For example, a gas-filled layer in accordance with the invention may be formed as a layer enclosed within an airplane wing.

The gas in the gas-filled layer may be selected from a large number of plasma-forming gases, including, but not exclusively, air, nitrogen and argon.

An advantage of a preferred de-icing system or method in accordance with the present invention is that it does not need a switch or "control" box to turn the heating "on" or "off". When ice grows on the power transmission line or other surface being protected, the AEF between the conductor and the ice increases, reaching an electric breakdown and plasma-formation level. This is because ice is a better conductor than air. When ice is present, the electric field strength in the gas-filled layer is higher than in the absence of ice. After the ice melts, the field strength within the gas-filled layer decreases, virtually stopping electric breakdown and discharge, with a corresponding reduction in energy consumption The pressure of the gas in the gas-filled layer can be adjusted to such a level that electric breakdown starts only when the ice thickness reaches a certain value, such as 0.5 cm or 2 cm or any other desired dimension.

A further advantage of a system or a method in accordance with the invention is that it provides more heating power for a given conductor voltage than dielectric loss heating. With reference to the circuit diagram in FIG. 31 and the graph of FIG. 34, the increase in heating power efficiency can be explained, as follows.

With desired control of operating variables, there are four discharges per AC cycle, as explained above with reference to FIG. 34. The electric energy, E, stored in gap capacitance, $C_g$, just before a discharge is:

$$\frac{C_g V_c^2}{2}, \text{ where } V_c^2 \text{ is a pick (not rms) value.} \quad (7)$$

With a rms value, $V_c'$, the energy is: $E=C_g(V_c')^2$

With a given frequency of f, there are 4f such discharges per cycle. Therefore, the total electric power dissipated is:

$$W_h^* = 4f C_g (V_c')^2 \frac{4f C_i^2 V_0^2}{C_i + C_g} \quad (8)$$

in which $V_0$ is the rms of the line voltage.

In a system in which a solid lossy dielectric coating absorbs electrostatic energy of an AEF through a dielectric capacitance, $C_d$, the maximum heating power of the coating is expressed by the equation $$W_h = \frac{\omega C_i^2 V_0^2}{2(C_i + C_d)}, \quad (9)$$

The value of the dielectric capacitance, $C_d$, is the product of its relative dielectric constant, $\in$, and the capacitance of a vacuum gap, which is approximated by the value of $C_g$. Thus, $$C_d \approx \in C_g \quad (10)$$

A lossy dielectric coating has a relative dielectric constant, $\in$, of at least 2.3. Thus, the capacitance, $C_d$, of the power transmission line and the lossy dielectric material can be represented as:

$$C_d \approx 2.3 \, C_g \quad (11)$$

Substituting this conservative value of $C_d$ into Equation (9), and then dividing Equation (8) by Equation (9) yields:

$$\frac{W_h^*}{W_h} \approx 3 \quad (12)$$

Thus, the heating power of plasma discharge, $W_h^*$, in accordance with the invention exceeds the heating power of dielectric loss heating.

An embodiment in accordance with the invention may include a transformer to transform AC having a low-voltage to a higher voltage sufficient to generate heat in a gas-filled layer. Such transformers, for example, may be located at appropriate distance intervals along power transmission lines.

Those skilled in the art should appreciate that the surface of objects other than described herein can also be protected with these gas-filled layers. For example, applying such a gas-filled layer to an airplane wing will also provide de-icing capability by subjecting the gas-filled layer to an AEF and, in particular, by increasing the AC voltage and frequency. Embodiments in accordance with the invention including a conductive outer shell or other permanent conductive layer are especially useful for generating heat in a gas-filled layer when no ice is present.

Operating variables typically considered in selecting gas composition and pressure may include: AC frequency and voltage in the electrical conductor, ice thickness at which heating is desired, gas layer thickness, distance between the voltage-carrying electrical conductor and the conductive layer, and heat transfer behavior between the gas-filled layer and ice on the surface.

In other aspects, further embodiments in accordance with the invention melt ice and snow on the surface of an object by providing high-frequency AC voltage to generate an alternating electric field ("AEF") at the surface. AC associated with the AEF is transferred by capacitance into the ice. A significant portion of the AC in the ice is conductivity (resistive) AC, which generates Joule heat in the ice. Although embodiments in accordance with the invention are described here with reference to FIGS. 32-40, principally with regard to de-icing of cableways, it is understood that the invention is useful in many types of applications.

The term "cableway system", "transport system" and related terms refer principally to cableways used for support or movement of chair ski lifts, surface lifts (e.g., skis remain on the ground and are pulled forward), gondolas, aerial tramways, ropeways, funicular railways, cable cars and other cableway systems; but the terms can also refer to other elongated structures, for example, bridges, towers, and cables supporting a bridge, tower, or tent. Generally, elongated structures de-iced in accordance with the invention are electrically conductive, such as electrically conductive, metal cableways. In some embodiments, a nonconductive structure is treated to be electrically conductive, such as through application of a conductive coating. In other embodiments, an electrical conductor is mounted inside or is integral with a cableway or other elongated object. In these embodiments, the cableway or other elongated object may be electrically nonconductive, but the electrical conductor is connectable to a power source in accordance with the invention.

When a lossy dielectric material, such as ice, is disposed in an AEF, AC associated with the AEF generates heat in the material through dielectric loss. The heating power, $W_h$, per cubic meter of dielectric material is:

$$W_h = \frac{\omega \varepsilon \varepsilon_0}{4\pi} \tan\delta (\overline{E^2}) \quad (13)$$

where $\in$ is a relative dielectric permittivity, $\in_0$ is a dielectric permittivity of a vacuum ($\in_0 = 8.85 \times 10^{-12}$ F/m), $\omega$ is an angular frequency of the AEF ($\omega = 2\pi f$, in which f is the AC frequency of the power line), $\tan \in$ is the tangent of dielectric loss, and $(\overline{E^2})$ is the average of electric field squared. The value of the electric field, E, increases with applied voltage. At a frequency of 60-100 kHz, the value of $\in$ in ice is about 3.2. For given values of $\in$ and $\tan \delta$, an increase of frequency, f, or of electric field strength, E, increases the dielectric loss heating in ice, resulting in increased heating power, $W_h$.

In accordance with the present invention, ice on lift cables, on lift towers or on some other cableway system component is melted in high-frequency alternating electric fields. The high frequency of the current flowing through the electrical conductor is generally greater than 0.5 kHz. Theoretically there is no upper limit on the frequency used. Preferably, frequencies in a range (e.g., 60 kHz to 100 kHz) similar to those used in de-icing of power transmission lines are used. But due to a smaller distance between the electrical conductor and the cableway (or other component functioning as electrical ground) compared to power line systems, de-icing of cableway system components is typically accomplished with a lower voltage than that used in power-line de-icing. As expressed in Equation (5), the field strength of the AEF (E in Equation (13)) depends on the voltage in the conductor and on the distance between the electrical conductor and electrical ground. In systems involving power transmission lines, the distance between the transmission line carrying high-frequency high-voltage current and an electrical sink functioning as electrical ground (e.g., another power transmission line, a tower, earth) is typically several meters or more. As a result, the alternating electric field strength dissipates over a large distance. In contrast, in preferred embodiments in accordance with the present invention, the distance between the electrical conductor at maximum voltage amplitude and electrical ground is smaller, so the AEF is correspondingly stronger for a given voltage. Preferably, the distance between an electrical conductor and an electrical sink (electrical ground) is as small as possible (but not in direct electrical contact) so that a strong AEF is generated. Also, the impedance to AC flow is typically lower in a typical system for de-icing a cableway system than in power line de-icing systems. In a power transmission line system, electrical ground for the capacitive AC associated with the AEF is typically several meters away, separated from the ice by air. In a cableway system, ice carrying capacitive current associated with an AEF typically rests on the cableway, ski tower or other component, which serves as electrical ground. As a result, the impedance encountered by the capacitive AC is relatively low. Thus, for a given electric field strength and AC frequency, the capacitive AC passing through the ice increases, making more energy available for heating. For these reasons, 3 to 15 kV is typically sufficient for cableway system de-icing, instead of 30 kV or more in power-line de-icing. It is clear that voltages exceeding 3-15 kV are useful in embodiments in accordance with the invention. Depending on structural dimensions and operating conditions, lower voltages, for example 500 volts, are also useful. The term "high-voltage" and related terms used here generally mean a voltage of 500 volts or higher.

Functionally, an electrical conductor is "proximate to" a surface if an AC voltage in the conductor generates an AEF that causes sufficient dielectric loss heating in the ice to melt the ice. The term "proximate to" also refers to an electrical conductor that is integral with the cableway system component being protected. For example, in certain embodiments in accordance with the invention, an integral part of a cableway serves as the electrical conductor. The term "proximate to" is also used to refer to distance between an electrical conductor and an electrical sink (or electrical ground). Practically, the term "proximate to" used here generally means within a distance of about 30 cm.

In embodiments in accordance with the invention, the electrical conductor is electrically insulated from electrical ground. The term "electrically insulated" and related terms are used in their general sense to mean that there is no direct electronic conduction between the electrical conductor and electrical ground, which is typically a cableway, a tower or other electrically conducting cableway system component. Of course, in embodiments in which the surface being protected against icing is electrically insulated from electrical ground (or some electrical sink), the electrical conductor may be in direct physical or electrical contact with the electrically insulated surface. Also, the electrical conductor is part of a circuit including an AC power source, which inevitably includes some connection to electrical ground, but which does not prevent generation of a strong AEF between the conductor and the surface.

Figure 40:
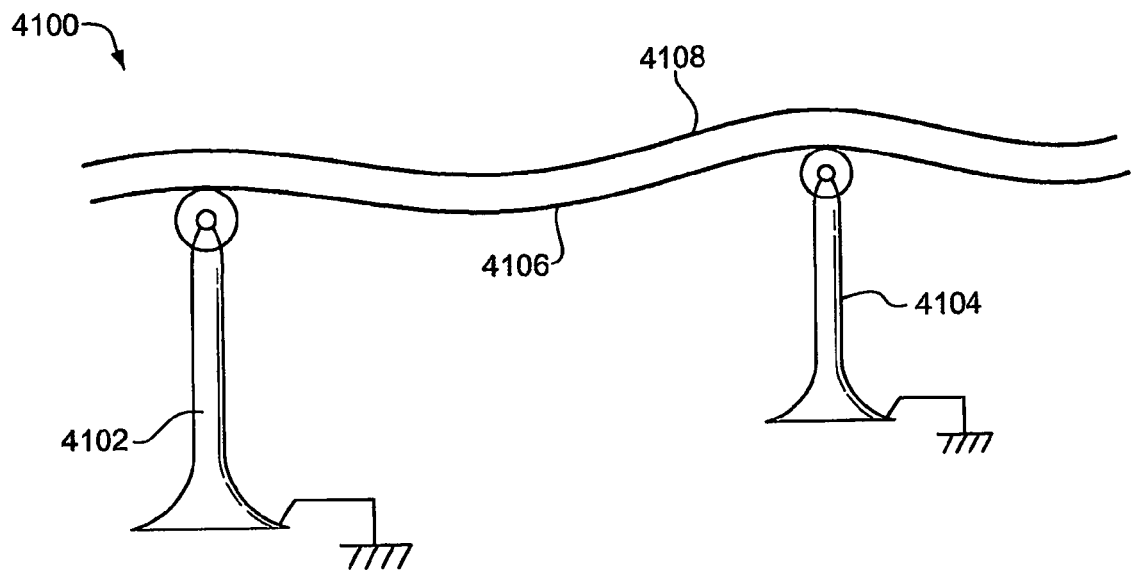
FIG. 40 depicts a system in accordance with the invention in which an electrical conductor carrying high-frequency AC voltage is disposed in close proximity to a ski lift cableway.

FIG. 40 depicts a system 4100 in accordance with the invention suitable for de-icing ski lift cableways. System 4100 includes conventional ski lift transport system towers 4102, 4104, which support ski lift cableway 4106 in a conventional manner. Ski lift cable 4106 carries conventional ski lift chairs (not shown). System 4100 further comprises electrical conductor 4108, which is located proximate to ski lift cable 4106. In accordance with the invention, a high-frequency high-voltage AC flows through electrical conductor 4108. In preferred embodiments in accordance with the invention, the AC in electrical conductor 4108 has a frequency in a range of from 60 kHz to 100 kHz. The high voltage generates an AEF. Preferably, ski lift cableway 4106 and electrical conductor 4108 are disposed at a distance in a range of from 0 to 30 cm. At this distance, a voltage in a range of from 3 to 15 kV in electrical conductor 4108 is typically sufficient for melting ice.

Figure 41:
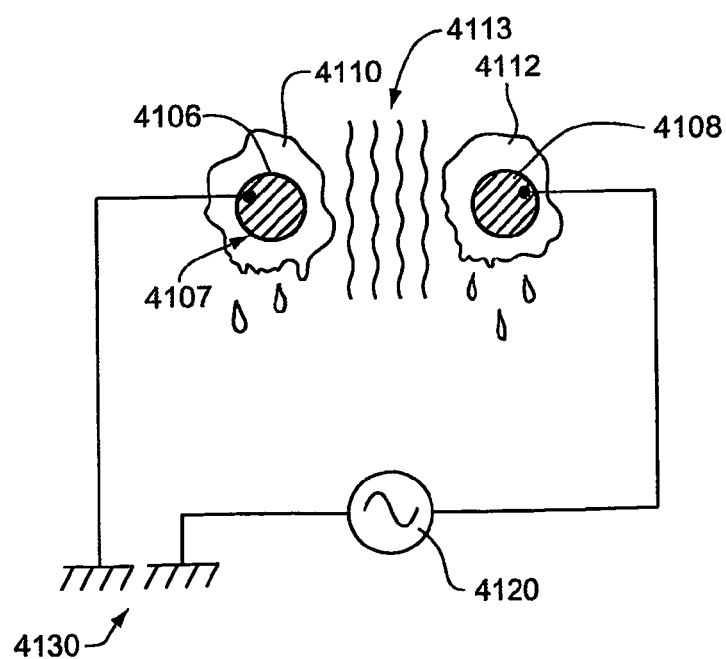
FIG. 41 depicts in schematic form the melting of ice on a cableway and electrical conductor in accordance with the invention, in which the electrical conductor is excited to a high potential relative to the cableway, which functions as ground.

FIG. 41 depicts in schematic form the operation of system 4100 in accordance with the invention. Ski lift cableway 4106, which has a surface 4107, and electrical conductor 4108 are covered by ice layers 4110, 4112, respectively, which have lossy dielectric properties. AC power source 4120 is connected to electrical conductor 4108 so that a high-frequency high-voltage AC flows through electrical conductor 4108, generating an AEF 4113. Ski lift cableway 4106 is proximate to electrical conductor 4108, preferably within a distance of 0 to 30 cm. Conventional AC power source 4120 is connected to electrical ground 4130. Preferably, as depicted in FIG. 41, ski lift cableway 4106 (or another object having a surface being protected against the ice) is connected to electrical ground 4130. This is preferred so that ski lift cableway system 4106 functions as electrical ground for AEF 4113 and for the ACs in ice layers 4110, 4112. As depicted in FIG. 41, ice layers 4110, 4112 carrier resistive (conductivity) component of AC generated by the high-frequency voltage in electrical conductor 4108, the resistive AC generating Joule heat and melting the ice.

Figure 42:
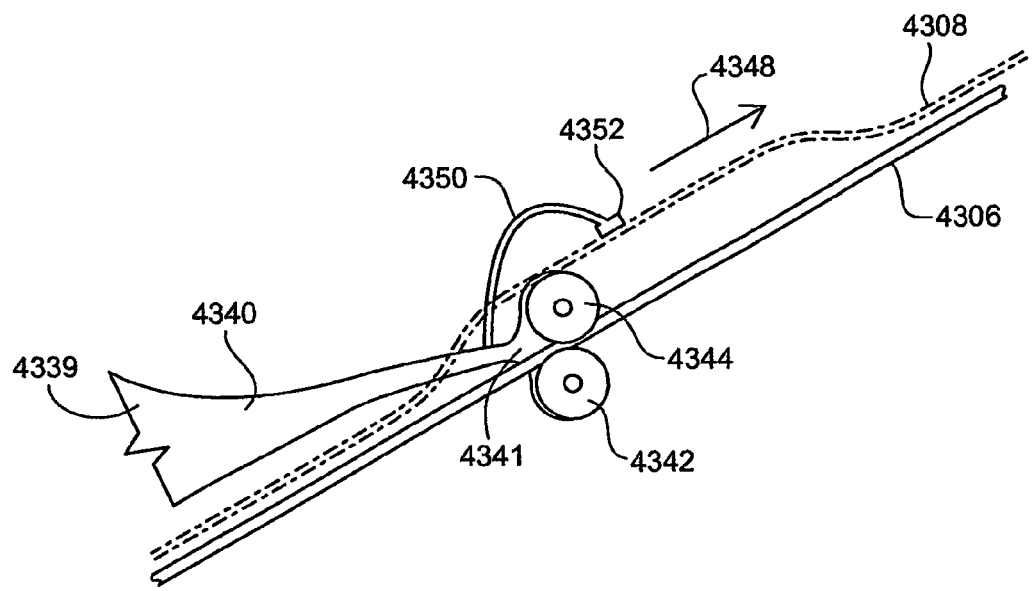
FIG. 42 depicts an embodiment in accordance with the invention in which the electrical conductor is stationary, being fixed at ski lift towers, and a ski lift cableway is movable.
Figure 43:
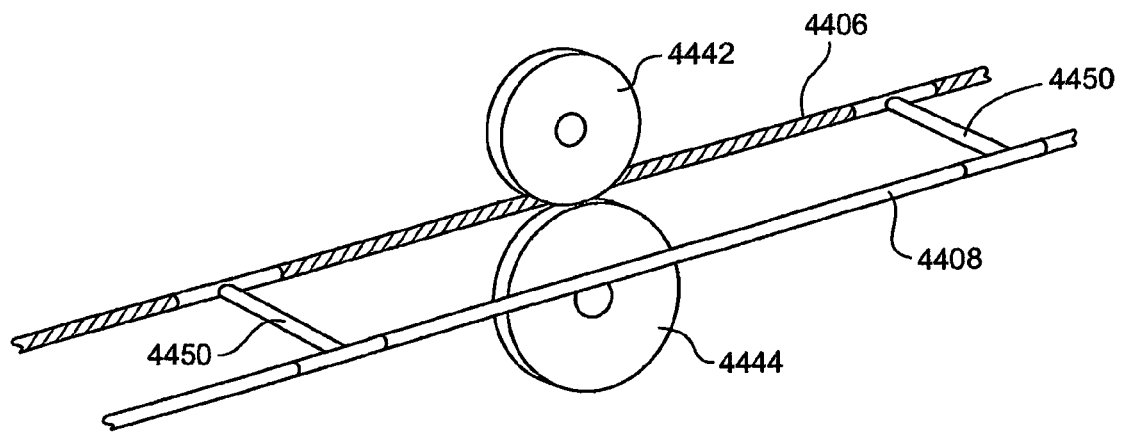
FIG. 43 depicts an embodiment in accordance with the invention in which the electrical conductor moves together with the cableway.

The electrical conductor for carrying high-frequency high-voltage AC may be made hollow, and thus may be light. The electrical conductor cable can be fixed at a distance from an electrically conducting surface being protected in a number of ways. For example, as depicted in FIG. 42, electrical conductor 4308 is stationary, being fixed at the ski lift towers, and ski lift cableway 4306 moves to carry a ski lift (not shown). Ski lift carrying arm 4340 at distal end 4339 is coupled to a ski lift chair, gondola or other person-carrying cableway system component (not shown). At proximate end 4341, ski lift carrying arm 4340 is attached using conventional means to electrically insulating cable hangers 4342, 4344. Cable hangers 4342, 4344 typically are manufactured with dielectric ceramic, polymer or composite material. Cable hangers 4342, 4344 attach ski lift arm 4340 to ski lift cable 4306. Connected to ski lift carrying arm 4340 is an electrically insulating guiding arm 4350, having a conductor clasp 4352. Guiding arm 4350 clasps electrical conductor 4308 and essentially pushes conductor 4308 away from proximate end 4341 and cable hangers 4342, 4344 as ski lift carrying arm 4340 moves in the direction of arrow 4348. The electrical conductor 4308 is optionally coated with an insulating material to prevent electrical contact between electrical conductor 4308 and non-insulated ski lift components. Another example is depicted in FIG. 43, in which electrical conductor 4408 moves together with ski lift carrying cable 4406. Ski lift carrying cable 4406 and electrical conductor 4408 are separated from each other at a fixed distance by electrically insulating spacers 4450. Cable hangers 4442, 4444 connect the ski lift at a fixed position on ski lift cableway 4406.

Figure 44:
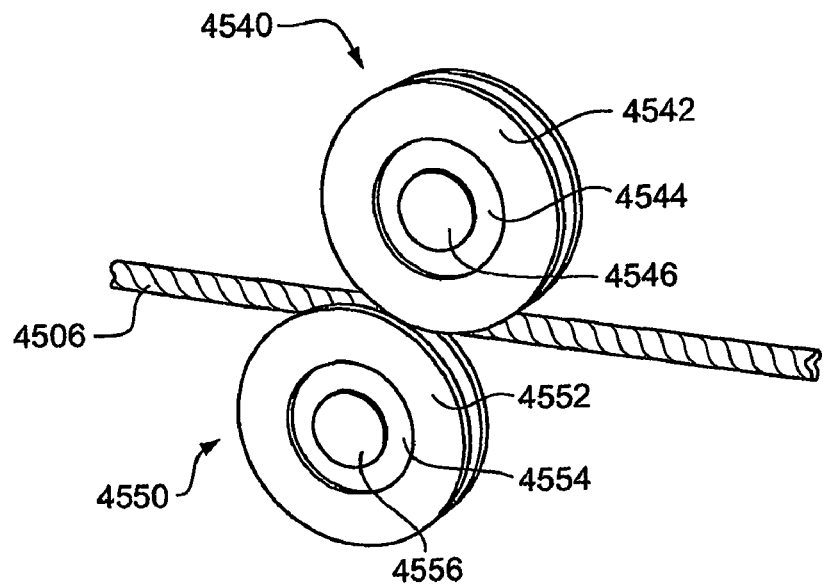
FIG. 44 depicts cable hangers attached to a ski lift cableway and containing an electrically insulating sandwich in accordance with the invention.

Various methods and structures and may be used to insulate electrically a carrying arm and the cableway from other, high-voltage elements of system, especially from an electrical conductor cable. For example, FIG. 44 depicts cable hangers 4540, 4550 attached to ski lift carrying cable 4506 and having an electrically insulating layer 4544, 4554 sandwiched between electrically conducting metal layers 4542, 4546 and 4552, 4556, respectively. The electrically insulating sandwich layers 4544, 4554 may contain any of a number of structurally strong electrically insulating materials, such as a ceramic insulator material.

Figure 45:
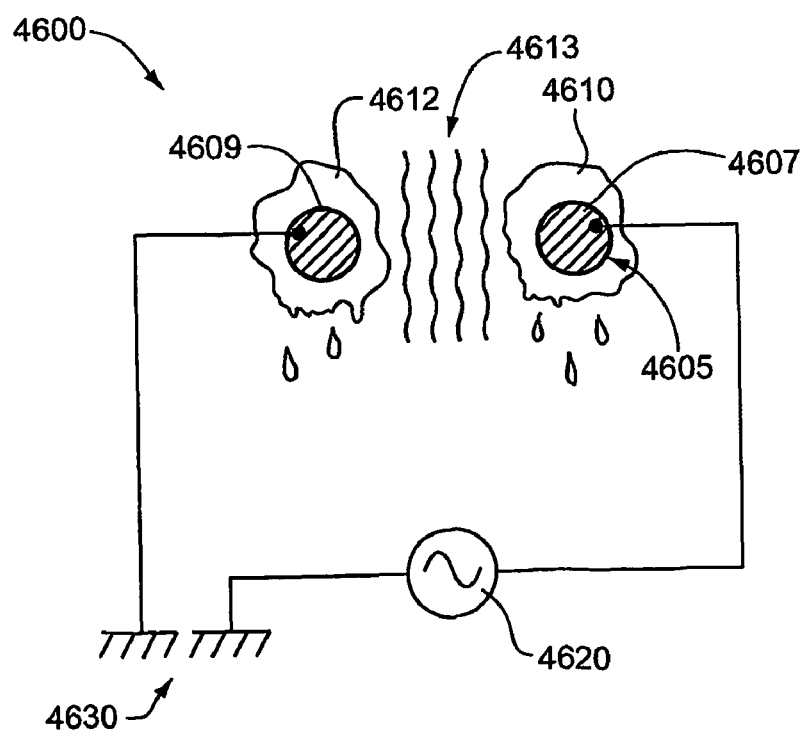
FIG. 45 depicts in schematic form the melting of ice on an electrical conductor/cableway and on a ground cable in accordance with the invention, in which the cableway is excited to a high potential relative to the ground cable.

In certain embodiments in accordance with the invention, a cableway includes an electrical conductor for generating an AEF in accordance with the invention. FIG. 45 depicts in schematic form the operation of a system 4600 in accordance with the invention. Electrical conductor/cableway 4607, which has a surface 4605, and ground cable 4609 are covered by ice layers 4610, 4612, respectively, which have lossy dielectric properties. High-frequency high-voltage AC power source 4620 is connected to electrical conductor/cableway 4607 so that the AC voltage generates AEF 4613. Conventional AC power source 4620 is connected to electrical ground 4630. Ground cable 4609 is connected to electrical ground 4630. Ground cable 4609 functions as electrical sink for AEF 4613 and for the ACs in ice layers 4610, 4612. Preferably, ground cable 4609 is proximate to electrical conductor/cableway 4607, that is, within a distance of 30 cm. Ice layers 4610, 4612 depicted in FIG. 45 carry resistive (conductivity) and capacitive AC generated by the high-frequency voltage in electrical conductor/cableway 4607. Through dielectric loss heating, the conductivity AC generates Joule heat and melts the ice. Electrical conductor/cableway 4607 is electrically insulated from other cableway system components and from ground cable 4609.

Figure 46:
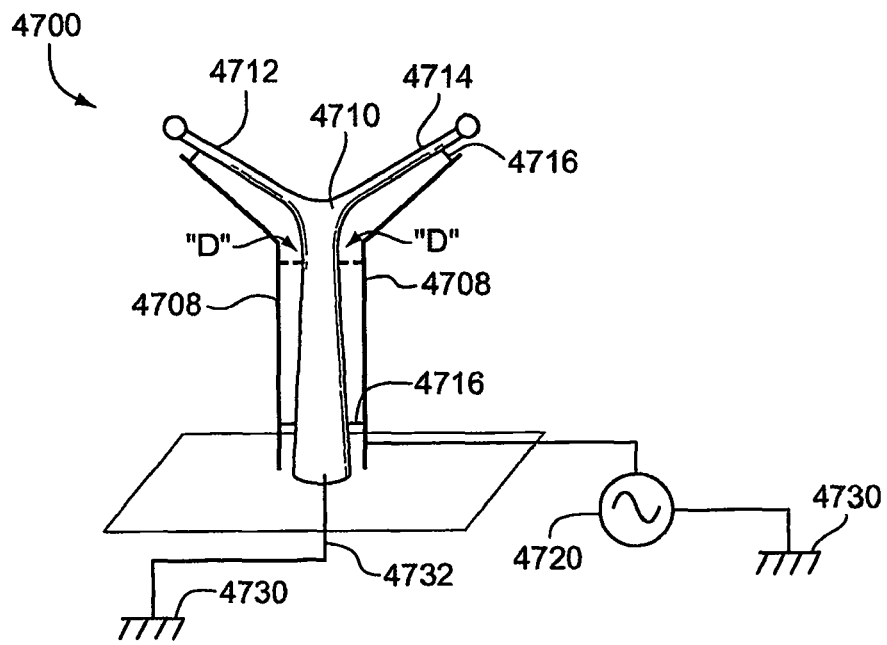
FIG. 46 depicts electrical conductors that are fixed proximate to a cableway system tower by electrically insulating spacers.

A system and a method in accordance with the invention are useful for de-icing other cableway system components, such as towers. In certain embodiments, one or more electrical conductors are disposed proximate to the component being protected against ice. For example, in system 4700 depicted in FIG. 46, electrical conductors 4708 are fixed within a proximate distance "D" of cableway system tower 4710. Electrical conductors 4708 are held in place and separated from cableway system tower 4710, including cableway system supporting arms 4712, 4714, by electrically insulating spacers 4716. Electrical conductors 4708 are connected to AC power source 4720. Generally, cableway system tower 4710 or other cableway system component having a surface being protected against ice may be either electrically conductive or nonconductive. Typically, cableway system tower 4710 is conductive and is connected to electrical ground 4730 via ground cable 4732, thereby functioning as an electrical sink for the AEF generated by a high-frequency voltage in electrical conductors 4708. In another embodiment in accordance with the invention, a cableway system tower or other cableway system component is nonconductive and is located between electrical conductor 4708 and ground cable 4732 or other electrically conductive body functioning as an electrical sink.

Figure 47:
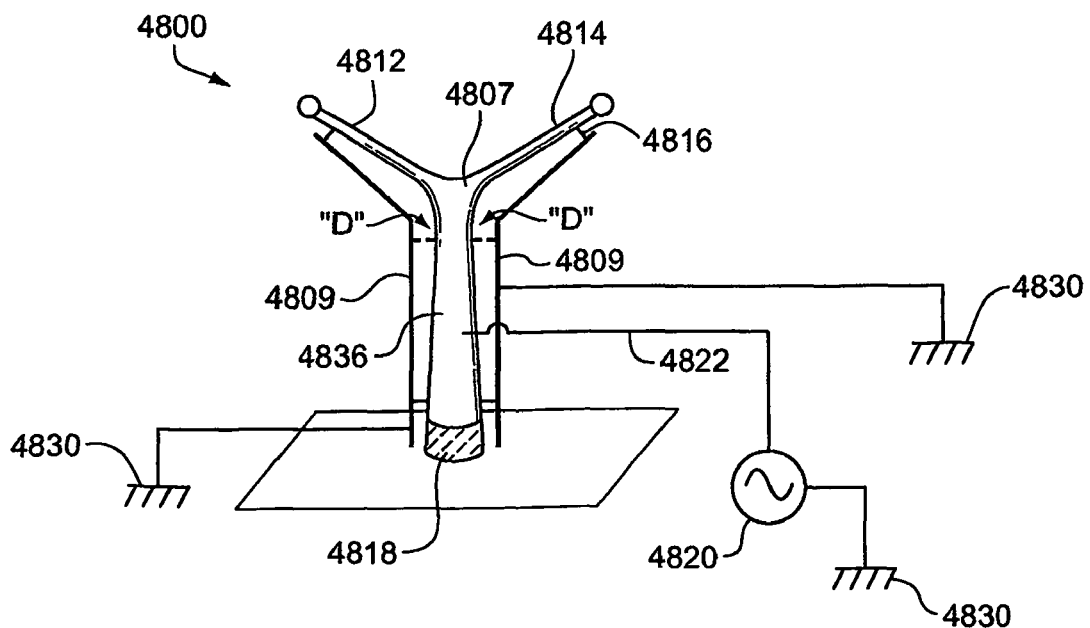
FIG. 47 depicts a system in accordance with the invention in which an electrical conductor is integral with a cableway system tower and ground cables are disposed proximate to the tower.

FIG. 47 depicts a system 4800 in accordance with the invention in which an electrical conductor is integral with cableway system tower 4807 so that the cableway system tower effectively functions as the electrical conductor. Preferably, one or a plurality of electrical sinks, such as ground cables 4809, are connected to electrical ground 4830 and disposed proximate to electrical conductor/cableway system tower 4807 and to cableway system supporting arms 4812, 4814. Ground cables 4809 are fixed within a proximate distance "D" of electrical conductor/cableway system tower 4807 and supporting arms 4812, 4814 by electrically insulating spacers 4816. Electrical conductor/cableway system tower 4807 with supporting arms 4812, 4814 is insulated from an electrical ground by insulator 4818 and is connected to AC power source 4820 via power bus 4822. In another embodiments in accordance with the invention, cableway system tower 4807 or other cableway system component is nonconductive or the outside surface 4836 of the cableway system tower 4807 or other cableway system component is nonconductive. Tower bus 4822 is connected to an electrical conductor integral with cableway system component 4807. A high-frequency AC voltage applied to the electrical conductor generates an alternating electromagnetic field in ice on surface 4836.

In a further embodiment in accordance with the invention, skin-effect (induction) heating is used to melt ice in systems in which the electrical conductor has a length of approximately one kilometer or more. Magnetic components of an alternating electromagnetic field tend to push electrical current lines towards the surface of a conductor. In a case of high-frequency AC flowing in 2.5 cm diameter aluminum conductor cable at 60 kHz, for example, approximately 63 percent of the current flows in the outer 0.35 mm of the conductor; approximately 95 percent flows within 1.05 mm of the outer surface of the conductor. For an electrical conductor with a diameter of 2.5 cm, this condensation of current flow into a relatively smaller cross-sectional surface area of flow increases the overall resistance by a factor of approximately 20. With 221 amps of current, this results in a maximum heating power of approximately 50 W/m. As also described in PCT/US 00/05665, skin-effect heating may also be combined with the lossy dielectric effect to achieve de-icing. Skin-effect heating is useful in embodiments in accordance with the present invention when the spans of cableways are longer than the wavelength of the AC. Unlike ice-dielectric heating, skin-effect heating occurs even when no ice is present Thus, skin-effect heating prevents formation of ice on a conductor. When the high frequency AC conductor is proximate to the surface of the cableway system component being protected, the heat produced by the skin effect prevents formation of ice on the conductor, and also melts snow and ice as it deposits on the surface.

Figure 48:
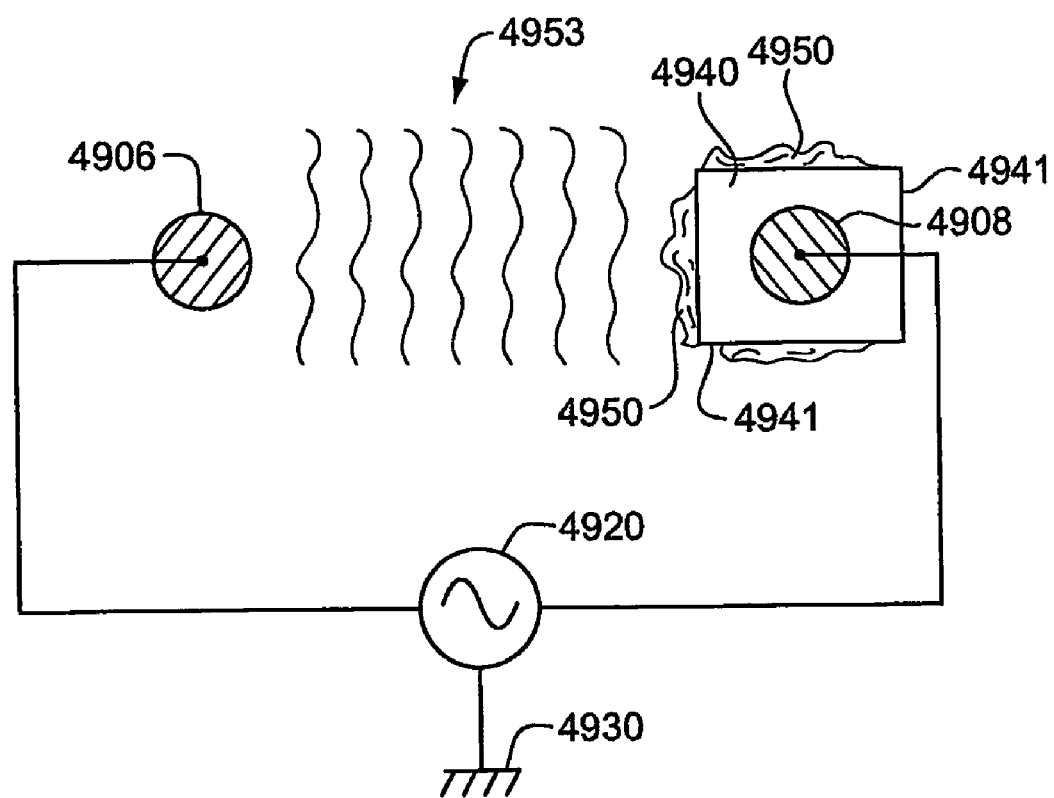
FIG. 48 depicts in schematic form a system in accordance with the invention in which a high-frequency AC voltage is applied to a first electrical conductor and a second electrical conductor at the same AC potential from ground, but 180 degrees out of phase.

In another embodiment in accordance with the invention, an AC voltage is applied to two electrical conductors 180 degrees out of phase with each other. Either one or both of the electrical conductors may include a surface being de-iced in accordance with the invention. Either one or both of the electrical conductors may be a cableway, or may be some other object being de-iced. FIG. 48 depicts in schematic form a system 4900 in accordance with the invention. First electrical conductor 4908 and second electrical conductor 4999 are each connected to a power terminal of AC power source 4920. A ground terminal of power source 4920 is connected to electrical ground 4930. High-frequency AC voltage is applied to first electrical conductor 4908 and second electrical conductor 4906 at the same AC potential from ground, but 180 degrees out of phase with each other, corresponding to conventional sinusoidal AC voltage or to some other waveform. Preferably, first electrical conductor 4908 is proximate to second electrical conductor 4906, that is, within a distance of 30 cm. One or both of electrical conductors 4908, 4906 may be integral with an object, such as a cableway, a cableway system component, a bridge, a ship superstructure or other conductive or nonconductive object. As depicted in schematic diagram of FIG. 48, second electrical conductor 4906 is integral with an object 4940 having a surface 4941. Ice 4950 covers a portion of surface 4941. The high-frequency voltage in first electrical conductor 4908 and second electrical conductor 4906 generate AEF 4953. Capacitive current associated with the AEF 4953 flows through ice 4950. Through dielectric loss heating, the portion of the AC that flows through the ice resistively (by conduction) generates Joule heat, melting the ice.

Systems and methods in accordance with the invention typically provide heating and de-icing of cableways and and other components while the cableway system is not in operation, for example, during the night. Embodiments of the invention are also useful while the cables and cableway system chairs are moving during normal operation. The various embodiments in accordance with the invention provide relatively simple, reliable and inexpensive systems and methods for preventing and removing ice on the surface of an object. Although the embodiments have been described principally with regard to de-icing of cableway systems, in particular, ski lifts, the structures and methods herein described are applicable to many other types of objects. For example, methods and systems in accordance with the invention are useful for de-icing surfaces of bridges, ships, and steel towers. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above apparatus and methods without departing from the scope of the invention, it is intended that all subject matter contained in the above description or shown in the accompanying drawing be interpreted as illustrative and not in a limiting sense. Consequently, the invention is to be construed as embracing each and every novel feature and novel combination of features present in and/or possessed by the systems, methods and compositions described.

Other embodiments of methods, systems and structures in accordance with the invention remove or prevent ice and snow on the surface of an elongated object by providing power to an electrical conductor to melt ice by Joule heating. Although embodiments described with reference to FIGS. 49-54 relate principally to de-icing of cableways, it is understood that the invention is useful in many types of applications.

In one aspect, electric power generates Joule heating of a cableway and the Joule heat melts ice or prevents ice formation. In another aspect, DC power is used. In still another aspect, AC power is used. Preferably, low-frequency AC power with a conventional commercial frequency, typically in a range of about 50 to 200 Hz, is used. It is understood that AC power having a frequency higher than the frequencies described herein with reference to FIGS. 49-54 may also be utilized in accordance with the invention. An advantage of preferred embodiments discussed herein is that conventional, readily available industrial frequencies are used. Depending on local weather variables, such as wind, temperature and humidity, a heating power in a range of about from 5 to 100 watts per meter of cable ("W/m") heats a cableway above the ice melting point and melts the ice. Typically, heating power of about 25 W/m is suitable. As discussed below, various criteria, such as operating efficiency, equipment costs and personal safety, may be considered in combining voltage and current amplitudes to achieve desired heating power.

Distances and length discussed herein may refer to the nominal length of a cableway. For example, a nominal one-kilometer ski lift is one kilometer long from start to finish, from bottom of the lift to the top. Of course, a ski lift cable of a nominal one kilometer ski lift actually has a total stretched-out length of about 2 kilometers, one kilometer moving up, looping around an end station, and then moving down. Therefore, heating calculations usually consider the total stretched-out length. The meaning of the term "cable length" and similar terms is clear from the context in which they are used.

The terms "connected", "electrically connected" and related terms are used here to indicate that a component of a system is electrically connected, either directly or indirectly through one or more electrical conductors, to another component. The term "electrically connectable" and similar terms indicate that the components are not necessarily electrically connected actually, but that a switch or some other means is present to close the conduction path between the components and, thereby, effect electrical connection. Thus, the term "switchably connected" and related terms generally indicate that the components are in electrical connection, but that a switch is present in a conduction path, which can be opened to break the connection. Components that are "connected" or "electrically connected" may also be "switchably connected". Thus, the terms "electrically connected", "electrically connectable", "switchably connected" and other related terms are used somewhat interchangeably in the description of embodiments with reference to FIGS. 49-54, and their meaning is clear from the context in which they are used.

The term "span" refers here to a separate portion of a cableway or other elongated conductor. A span includes an electrical connection at each of its two ends. Each end of a span is electrically connected either to a power source or to electrical ground. In one aspect, a span in accordance with the invention is "separate" in the sense that it is generally either a separate branch of a parallel circuit, or it is part of a completely separate circuit with its own power source. Thus, the terms "separate", "separately connected" and related terms used with reference to a span indicate that a portion of electric current (and power) can flow through the span without flowing through at least one other portion of the cableway or elongated conductor. A different portion of current, however, may flow through another portion (e.g., another span) of the cableway or elongated conductor. In certain embodiments, an electrical connection can be switched "on" or "off", or an electrical connection can be switched alternatively between a power source and electrical ground. A "segment" of a cableway or other elongated conductor contains one or more spans. A segment is separate in that it is generally either a separate branch of a parallel circuit, or it is part of a completely separate circuit with its own power source. Thus, the terms "separate", "separately connected" and related terms used with reference to a segment indicate that a portion of electric current (and power) can flow through the segment without flowing through at least one other part of the cableway or elongated conductor. A different portion of current, however, may flow through another part (e.g., another segment) of the cableway or elongated conductor. Typically, each span of a plurality of spans included within a segment is an electrically parallel branch of the segment The term "connected span" and related terms refer to a cable span that is electrically connected to a power source, and differentiates the "connected span" from other cable spans that may or may not be simultaneously connected to a power source. Similarly, the term "connected segment" refers to a segment that is electrically connected to a power source, and differentiates the connected segment from other segments that may or may not be simultaneously connected to a power source.

Figure 49:
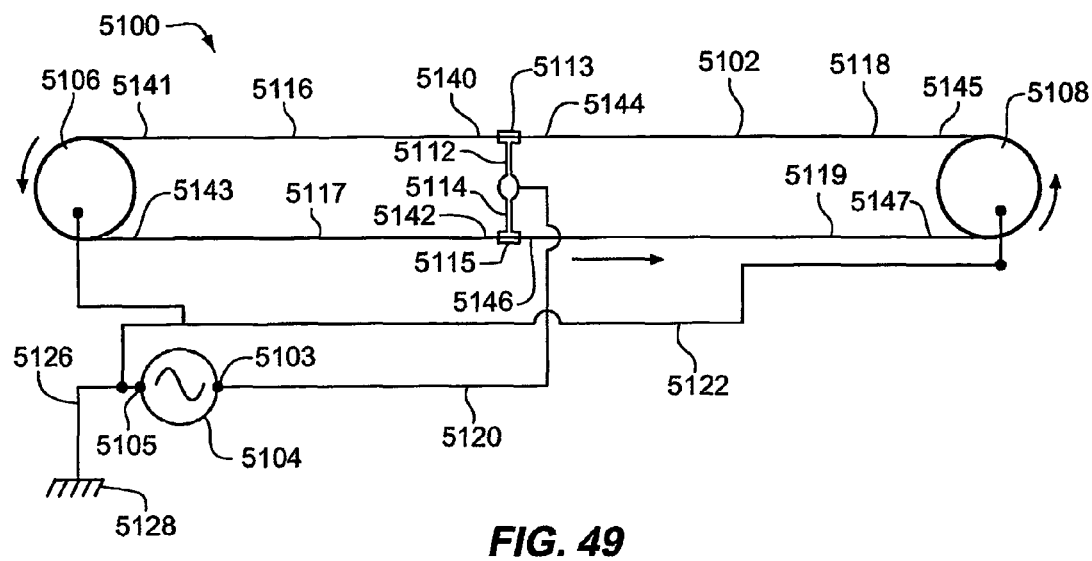
FIG. 49 depicts a low-frequency AC system in accordance with the invention in which a ski lift cable is electrically connected to a low-frequency AC power supply.

A low-frequency AC system 5100 in accordance with the invention is depicted in FIG. 49. System 5100 includes ski lift cableway 5102 in electrical connection with AC power source 5104. Ski lift cable 5102 typically has a diameter of about 2 cm and typically is manufactured with stainless steel. In a conventional manner, ski lift cable 5102 forms a closed loop around a first end station 5106 and a second end station 5108. Ski lift cableway 5102 has a cable length defined by the distance between first end station 5106 and second end station 5108. Ski lift cableway 5102 is supported between end stations 5106 and 5108 by ski lift tower 5110, which has supporting arms 5112, 5114 with electrical circuit connections 5113, 5115, respectively. Circuit connections 5113, 5115 serve to electrically divide ski lift cableway 5102 into a plurality of ski lift cable spans 5116, 5117, 5118, 5119, each cable span typically having a span length less than the cable length. Cable span 5116 has a first end 5140 at circuit connection 5113 and a second end 5141 at first cable station 5106; similarly, cable span 5117 has a first end 5142 at circuit connection 5115 and a second end 5143 at first end station 5106. Cable span 5118 has a first end 5144 at circuit connection 5113 of ski lift tower 5110 and a second end 5145 at second end station 5108; cable span 5119 has a first end 5146 at circuit connection 5115 of ski lift tower 5110 and a second end 5147 at second end station 5108. A first power bus 5120 electrically connects a first terminal 5103 of AC power source 5104 to ski lift cable 5102 via circuit connections 5113, 5115 on ski lift tower 5110 and supporting arms 5112, 5114. A second bus 5122 electrically connects a second terminal 5105 of AC power source 5104 to second end station 5108 via conductor 5124. First terminal 5103 is a power terminal of AC power source 5104. Preferably, for safety reasons, second terminal 5105 is a ground terminal (but, alternatively, it is a power terminal). First end station 5106 and second end station 5108 are connected to electrical ground 5128 via ground cables second bus 5122. Alternatively, second bus 5122 is connected to a second power terminal of power source 5104. In accordance with one aspect of the invention, AC power source 5104 provides low-frequency AC power, preferably having conventional industrial frequency, for example, 50 to 200 Hz.

When system 5100 is in operation to de-ice ski lift cableway 5102, AC current supplied by power source 5104 first passes through first power bus 5120, preferably an aluminum or copper cable, through central supporting tower 5110 and supporting arms 5112, 5114 to circuit connections 5113, 5115, into cableway 5102, and then goes to electrical ground 5128 via bus 5122 and conductor 5126. Second bus 5122 is connected to second terminal 5105 of power source 5104. Preferably, first power bus 5120 and second bus 5122 contain aluminum. Because aluminum has much higher conductivity than alloy steel, an aluminum conductor consumes less energy than a steel cable. For example, an aluminum conductor having a typical conductivity value ($\sigma \approx 3.82 \cdot 10^7$ S·m$^{-1}$) and a 2 cm diameter dissipates only about 5% of the heat generated in an iron-nickel stainless steel conductor having the same 2 cm diameter and a conductivity of about $2 \cdot 10^6$ S·m$^{-1}$). Through placement of the power source at the center of the cableway, power loss is further reduced by about 33%.

Figure 50:
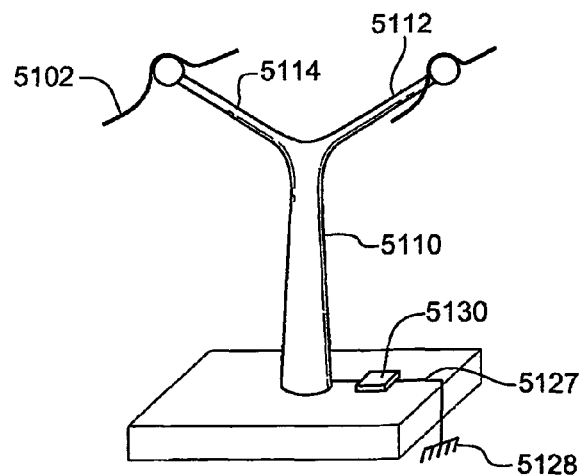
FIG. 50 depicts a tower connected to ground by a ground conductor that is switched "on" and "off" in accordance with the invention by a remotely-controlled switch.

A feature of a preferred embodiment as depicted in FIG. 49 is that end stations 5106, 5108 are both connected to electrical ground. This feature provides safety advantages because the elements of the de-icing system have zero potential at all times at the end stations, where personnel are likely to come in contact with the system and where the presence of other electrical equipment may require a low-impedance ground connection for safety. Voltage amplitude is highest at circuit connections 5113, 5115 and at corresponding first ends 5140, 5142, 5144, 5146 of cable spans 5116, 5117, 5118, 5119, respectively. The voltage decreases toward zero at second ends 5141, 5143, 5145, 5147 at end stations 5106, 5108. In FIG. 49, circuit connections 5113, 5115 are associated with the ski lift tower 5110 and supporting arms 5112, 5114, which structurally support cableway 5102. In other embodiments in accordance with the invention, circuit connections through which a cableway is electrically connected to a power source or ground are associated with other structurally supporting components of a cableway system. In still other embodiments, circuit connections are not associated with any supporting components of a cableway system. In certain embodiments, a structural component serves as part of the electrical connection between a cableway and power source. In still other embodiments, a structural component supporting a cableway or serving some other function is unrelated to electrical connections between a power source and a cableway or other elongated conductor. Ski lift tower 5110 in system 5100 of FIG. 49 is typically electrically conductive. Notice that even though supporting tower 5110 (or other electrically conductive cable-supporting structure) is embedded in earth, this earth connection would unlikely interfere with the de-icing operations because the frozen soil's electrical resistance is many orders of magnitude higher than that of the stainless steel cable. Nevertheless, if desirable for added safety reasons, circuit connections 5113, 5115 and ski lift tower 5110 are switchably connectable to electrical ground 5128 by ground conductor 5127 through switch 5130, as depicted in FIG. 50. Preferably, switch 5130 is remotely controlled. When de-icing operation is shut down, switch 5130 is switched to ground so that circuit connections 5113, 5115 and the rest of system 5100 are at zero electrical potential. It is contemplated that a de-icing system in accordance with the invention is typically used when ski lift operations are shut down; for example, during the night or early morning before passengers arrive. Nevertheless, a de-icing system and a method in accordance with the invention are also useful during ski lift operations when the use of low voltages or of electric insulation reduces the hazard of a cableway carrying electric current Example 3

Exemplary calculations were performed for a nominal one-kilometer ski lift cableway 5102, as depicted in FIG. 49. The voltage supplied by the AC power source during de-icing operations was calculated as follows:

In a 500-meter span of stainless steel ski lift cable having a 2 cm diameter and an electrical conductance, $\sigma$, of $1.1 \cdot 10^6$ S·m$^{-1}$, a current of 90 amps with a voltage drop of approximately 0.27 V per one meter length of cable corresponds to 25 W/m of heating power. This corresponds to a voltage drop of 135 V along the 500-meter span. Since there are four spans having a span length of 500 meters, a total current of 360 amps at 135 V, or approximately 50 kW of electric power, is delivered to the ski lift cable. This is usually readily available because such a ski lift usually uses an electric motor having at least 200 kW a power. Similar calculations for a cable that is not divided into spans in accordance with the invention show that a voltage drop of approximately 270 V occurs along the 1000-meter length of cable.

Figure 51:
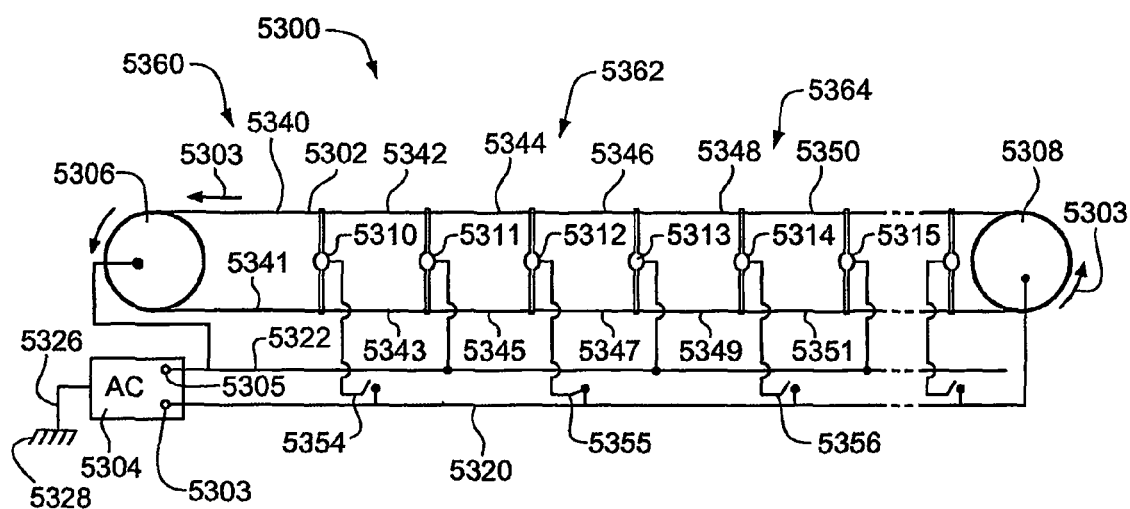
FIG. 51 depicts a low-frequency de-icing system in accordance with the invention having a plurality of ski lift towers in which the ski lift cable is de-iced segment-by-segment using low voltage.
Figure 52:
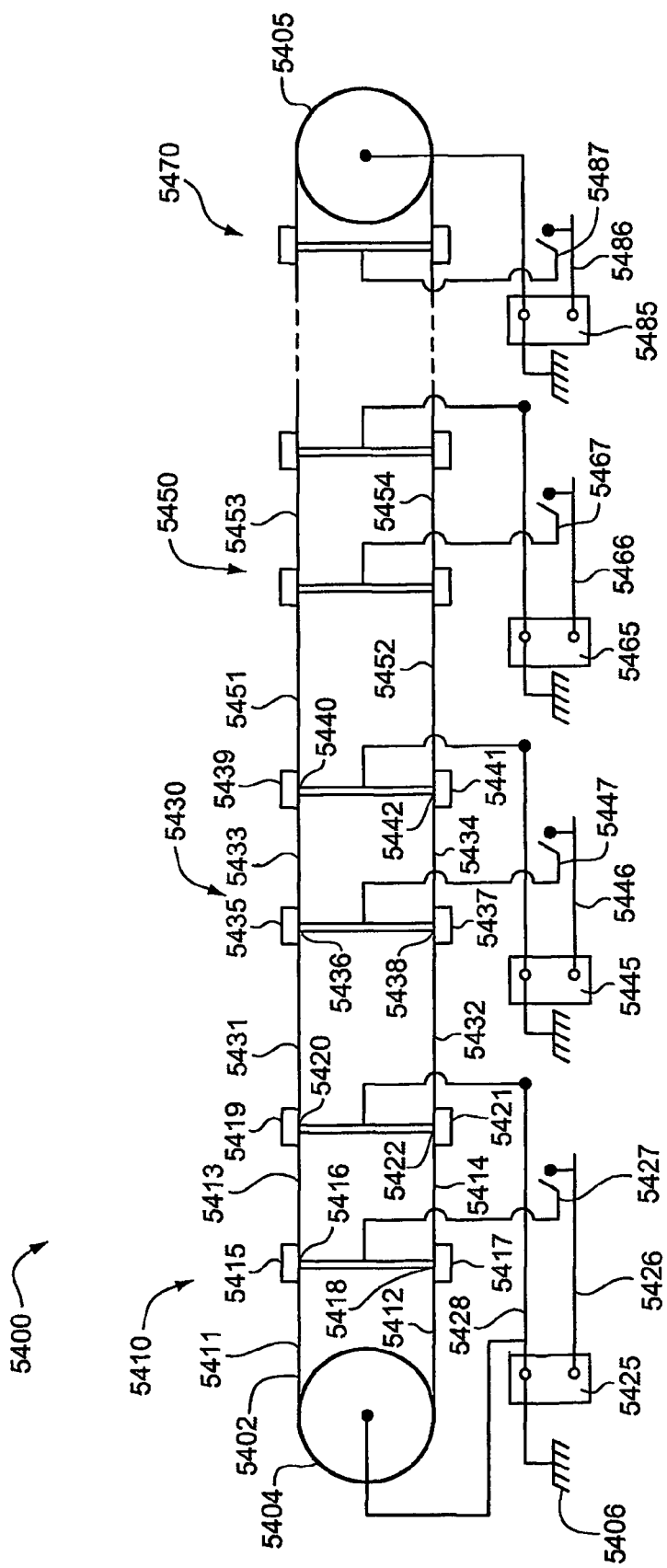
FIG. 52 depicts a system in accordance with the invention including a plurality of power sources, in which individual segments of a cableway are connected to separate power sources.

Typically, a system in accordance with the invention contains a plurality of circuit connections electrically dividing a cableway or other elongated conductor into a plurality of conductor spans. In FIG. 51, an equivalent circuit of a ski lift cableway system 5300 in accordance with the invention includes a plurality of electrical connection points. Through delivery of power at a plurality of electrical connection points along the cable, a cableway is de-iced at a lower voltage than when power is delivered at one circuit connection, or at one pair of circuit connections as in FIG. 49. System 5300 includes ski lift cableway 5302 and AC power source 5304. Ski lift cableway 5302 typically has a diameter of about 2 cm and typically is fabricated with stainless steel. Ski lift cable 5302 forms a closed loop around a first end station 5306 and a second end station 5308, moving in the direction of arrows 5303 when operating as a lift. Ski lift cable 5302 has a nominal cable length defined by the distance between first end station 5306 and second end station 5308. First end station 5306 and second end station 5308 are preferably connected to electrical ground 5328. Ski lift cable 5302 is supported between electrically-grounded end stations 5306 and 5308 by a plurality of ski lift towers, including ski lift towers 5310, 5311, 5312, 5313, 5314, 5315. Each tower corresponds to a pair of circuit connections in electrical connection with cableway 5302 at respective connection points. A first power bus 5320 switchably connects a first terminal 5303 of AC power source 5304 to circuit connections of ski lift towers 5310, 5312, 5314 through switches 5354, 5355, 5356, respectively. First terminal 5303 is a power terminal of AC power source 5304. A second bus 5322 electrically connects a second terminal 5305 of AC power source 5304 to circuit connections of ski lift towers 5311, 5313, 5315 and to first and second end stations 5306, 5308. AC power source 5304 is connected to electrical ground via ground cable 5326. Ski lift cable 5302 includes a plurality of ski lift cable spans disposed between first end station 5306 and second end station 5308, including among others, cable spans 5340, 5341, 5342, 5343, 5344, 5345, 5346, 5347, 5348, 5349, 5350, 5351. Cable spans 5340, 5341 are located between first end station 5306 and ski lift tower 5310 in FIG. 51. Similarly, cable spans 5342, 5343 are disposed between ski lift towers 5310 and 5311; cable spans 5344, 5345 between ski lift towers 5311 and 5312; cable spans 5346, 5347 between ski lift towers 5312 and 5313; cable spans 5348, 5349 between ski lift towers 5313 and 5314; cable spans 5350, 5351 between ski lift towers 5314 and 5315. Cable span 5346 has a first end at ski lift tower 5312, and a second end at grounded ski lift tower 5313. Cable span 5343 has a first end at ski lift tower 5310, and a second end at grounded ski lift tower 5311. The other cable spans similarly have first and second ends disposed at adjacent ski lift towers (or end stations 5306 or 5308). The first end of a cable span is generally located at a circuit connection, for example, at ski lift tower 5312, that is switchably connected to first power bus 5320. The second end of a cable span is generally located at a grounded circuit connection, for example, either at a grounded tower, such as tower 5313, or at a grounded end station 5306, 5308. As depicted in FIG. 51, in system 5300, the ski lift towers have two supporting arms, each supporting a span of cable 5302 on each side of the towers between first end station 5306 and second end station 5308. It is understood, however, that ski lift cable 5302 can be supported by various arrangements of ski lift towers or other supporting means, without departing from the scope of the invention. It is a feature of certain preferred embodiments in accordance with the invention that electric power is supplied separately to one or a plurality of cable segments, each cable segment including at least one span. At least one segment includes a cable span having a span length less than the cable length. Practically, a cable segment has a segment length less than the cable length, and includes less than the total number of spans included in the ski lift cable. For example, in FIG. 51, cable spans 5340, 5341, 5342, 5343 are included in cable segment 5360. Segment 5360 has a segment length approximately equal to the sum of span lengths of spans 5340 and 5342. Cable spans 5344, 5345, 5346, 5347 are included in cable segment 5362. Segment 5362 has a segment length approximately equal to the sum of span lengths of spans 5345 and 5347. Cable spans 5348, 5349, 5350, 5351 are included in cable segment 5364. As electric power is supplied to system 5300 in accordance with the invention, ski lift towers 5310, 5312, 5314 (when simultaneously connected to power source and 5304) have a potential corresponding to the voltage of the power source, while grounded ski lift towers 5311, 5313, 5315 and grounded end stations 5306, 5308 have a potential of zero. As a result, electric power is supplied "separately" to cable segments 5360, 5362, 5364. Thus, cable segments 5360, 5362, 5364 are electrically connected in parallel to power source 5304, each segment forming a separate branch of a parallel circuit. Here, "separate" indicates that a portion of electric power and current flows through one cable segment without flowing through another cable segment. It is clear, however, that in certain embodiments, electric current flows through a power bus connected to a plurality of cable segments before the electric current splits off into the individual segments.

A feature of preferred embodiments in accordance with the invention is that electric power (preferably AC power) is applied separately to a plurality of segments at a corresponding plurality of connection points along the cableway (for example, at the circuit connections associated with ski lift towers 5310, 5312, 5314), rather than to the whole lift cable in series. Since segment lengths are shorter than the cable length, heating and de-icing in a cable by segments is conducted at lower voltage than de-icing in longer lengths of cable. This reduces the overall voltage used to de-ice a ski lift cable, even when all of the segments of a cable are de-iced simultaneously. For example, six separate 100-meter spans of a cable are simultaneously de-iced at ⅙ the voltage (albeit at the same power) as one 600-meter length of cable. Thus, in certain preferred embodiments, electric power is supplied simultaneously to all spans of the ski lift cable, but it is supplied separately to segments of the cable including one or more spans, less than the total number of spans. The power used for de-icing all spans of a cableway simultaneously in embodiments as depicted in FIG. 51 is virtually the same as the power consumed in embodiments in which lengths of cable spans are longer, as in FIG. 49.

Nevertheless, a low-voltage mode of operation provides safer conditions for people on or near the cableway system.

Through the use of switches, such as switches 5354, 5355, 5356, one or several segments of the ski lift cable are de-iced, while other segments are not de-iced. Thus, power is applied to a single connected span or a to plurality of connected spans, while no electric power is being applied to other spans of the cable. Such separate and "non-simultaneous" de-icing of segments and spans of the cable reduces both voltage and power consumption at a given time. For example, segment 5362 containing cable spans 5344, 5345, 5346, 5347 in FIG. 51 is de-iced when switch 5355 is closed, while segments 5360 and 5364 are not de-iced and do not consume power because switches 5354, 5356 are open. Thus, in certain preferred embodiments in accordance with the invention, power is supplied at any given time to less than the total number of segments in the system. Reducing the total number of cable segments and spans to which electric power is applied at a given time, or simultaneously, reduces total power levels. Also, limiting heating and de-icing to only ice-covered segments of the ski lift cable, for example, at the top of a mountain, reduces total energy consumption.

It is understood that AC power source 5304 may alternatively be followed by a rectifier, which rectifies AC power to DC power. Alternatively, AC power source 5304 may be replaced by a DC power source having a similar capacity.

Example 4

With reference to FIG. 51, the total distance between cableway stations 5306 and 5308 is 1000 meters, and cableway 5302 is electrically divided into spans having a span length of approximately 50 meters, such that there are 10 segments having a segment length of approximately 100 meters. To provide 25 W/m of heating power to each cable span at a current of 90 amps, AC power having a voltage of 13.5 V is supplied at the first end of each connected span in a segment. Since there are four connected spans per segment, this corresponds to a heating power consumption for one segment of 13.5 V×360 A, or about 5 kW, corresponding to the power of a small gas-powered backup power source. All 10 of the segments can be de-iced simultaneously at 13.5 V with 3700 A, that is, with 50 kW power. This low-voltage mode of operation provides safe conditions for people on or near the ski lift.

Some embodiments, as depicted in FIG. 51, include a single power source for a plurality of separate segments, typically for all of the segments in parallel. Other embodiments in accordance with the invention include a plurality of power sources, each separate power source connected to only one segment or to several segments less than the total number of segments. For example, in system 5400 depicted in FIG. 52, some individual segments of cableway 5402 are connected to a separate power source. System 5400 includes cableway 5402, first end station 5404 and second end station 5405. Cable segment 5410 is electrically divided into cable spans 5411, 5412, 5413, 5414 by first end station 5404 and by circuit connections 5415, 5417, 5419, 5421 at connection points 5416, 5418, 5420, 5422, respectively. A power terminal of power source 5425 is connected via power bus 5426 through switch 5427 to circuit connections 5415, 5417. First end station 5404 is connected via bus 5428 to electrical ground. Typically, bus 5428 is a ground cable connected to electrical ground 5406 through a ground terminal of power source 5425. Circuit connections 5419, 5421 are electrically connected to electrical ground via bus 5428. Paired cable spans 5411, 5412 each have a first end at connection points 5416, 5418, respectively, and a second end at electrically grounded first end station 5404. Similarly, paired cable spans 5413, 5414 have a first end at connection points 5416, 5418, respectively, and a second end at grounded connection points 5420, 5422, respectively. Connection points 5420, 5422 are connected to electrical ground through bus 5428. Cable segment 5430 includes cable spans 5431, 5432, 5433, 5434, which are defined by circuit connections 5419, 5421, 5435, 5437, 5439, 5441 at connection points 5420, 5422, 5436, 5438, 5440, 5442, respectively. A power terminal of power source 5445 is connected via power bus 5446 through switch 5447 to circuit connections 5435, 5437. A second, ground terminal of power source 5445 is electrically connected via bus 5448 to circuit connections 5439, 5441. Paired cable spans 5431, 5432 each have a first end at connection points 5436, 5438, respectively, and a second end at grounded connection points 5420, 5422. Similarly, paired cable spans 5433, 5434 have a first end at connection points 5436, 5438, respectively, and a second end at grounded connection points 5440, 5442, respectively. Similarly, segment 5450 includes cable spans 5451, 5452, 5453, 5454. A power terminal of power source 5465 is connected to circuit connections at the first ends of the cable spans through power bus 5466 and switch 5467. A segment 5470 is similarly connected to a power source 5485 through power bus 5486 and switch 5487. Typically, a power source, such as power source 5425, 5445, 5465, 5485, is an AC power source providing AC power at conventional industrial frequencies.

AC power is useful at virtually any frequency. Alternatively, one or several of power sources 5425, 5445, 5465, 5485, is a DC power source. Alternatively, a power source, such as power source 5425, 5445, 5465, 5485 includes a rectifier, which rectifies AC power to DC power.

Figure 53:
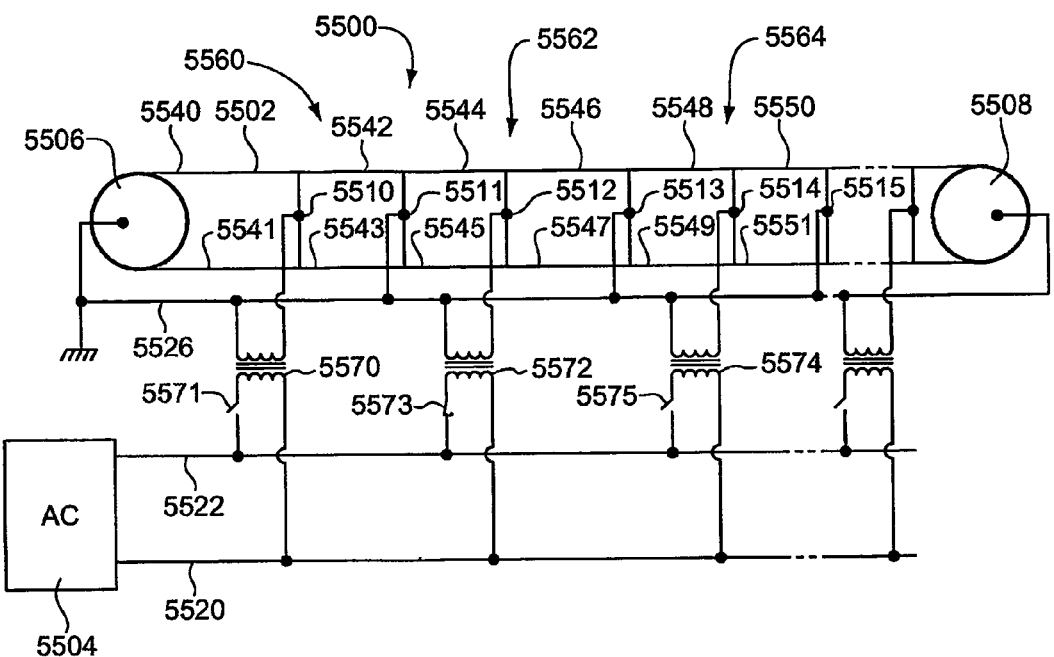
FIG. 53 depicts a system in which a transformer is connected to each segment of a ski lift cable for transforming high-voltage low-current power to low-voltage high-current power in accordance with the invention.

In Example 4, the total current for simultaneous de-icing of all segments at 50 kW and 13.5 V is 3700 A. Relatively large and expensive aluminum or copper bus wires are used to distribute the power. An alternative system 5500 is shown in FIG. 53, in which each segment is connected to its own transformer. A transformer transforms higher-voltage lower-current power at the point of use to lower-voltage higher-current power. System 5500 includes ski lift cableway 5502, and higher-voltage AC power source 5504. It also includes first end station 5506 and second end station 5508 and a plurality of ski lift towers, including ski lift towers 5510, 5511, 5512, 5513, 5514, 5515. A first power bus 5520 is connected to one terminal of AC power source 5504; a second bus 5522 is connected to a second terminal of AC power source 5504. First end station 5506, second end station 5508, and grounded ski lift towers 5511, 5513, 5515 are connected to ground via ground conductor 5526. Each of all plurality of ski lift cable spans is defined by circuit connections, which circuit connections are typically located at adjacent ski lift towers (or at a tower and an end station). For example, paired cable spans 5544 and 5545 each have a first end at ski lift tower 5512, and a second end at grounded ski lift tower 5511. Similarly, paired cable spans 5546 and 5547 have a first end at ski lift tower 5512 and a second end at ski lift tower 5513. Cable spans 5544, 5545, 5546, 5547 are included in cable segment 5562. Similarly, cable segment 5560 includes cable spans 5540, 5541, 5542, 5543, and cable segment 5564 includes cable spans 5548, 5549, 5550, 5551. System 5500 includes a power transformer associated with each cable segment. Power transformer 5570 connects power bus 5520 to cable segment 5560 through ski lift tower 5510. Similarly, transformers 5572, 5574 are connected to cable segments 5562, 5564, respectively. AC power source 5504 distributes electric power at a high voltage and low current Placed electrically between power source 5504 and ski lift cable 5502, transformers 5570, 5572, 5574 convert the higher voltage power to low-voltage high-current power close to where it is actually used (for example, at each ski lift tower). For example, power source 5504 supplies AC power at 480 volts and 100 A to system 5500. System 5500 has 10 segments in parallel, each segment having a segment length of 100 meters and containing four separate 50-meter cable spans. AC power of 10 amps at 480 volts is distributed to transformer 5572, which transforms the higher-voltage power to desired lower-voltage, higher-amperage power near ski lift tower 5512 in segment 5562; for example, 360 A at 13.5 V. This allows much smaller wire to be used for power distribution, while still using safe, low voltages above ground applied to the ski lift cableway. As depicted in FIG. 53, switches 5571, 5573, 5575 are disposed in the separate electrical circuits corresponding to cable segments 5560, 5562, 5564, respectively. Such switches enable selective "non-simultaneous" heating and de-icing of one or more cable segments, instead of heating all segments of the cable simultaneously. In an alternative embodiments, a system as depicted in FIG. 53 includes a rectifier between each transformer and each circuit connection at towers 5510, 5512, 5514.

Figure 54:
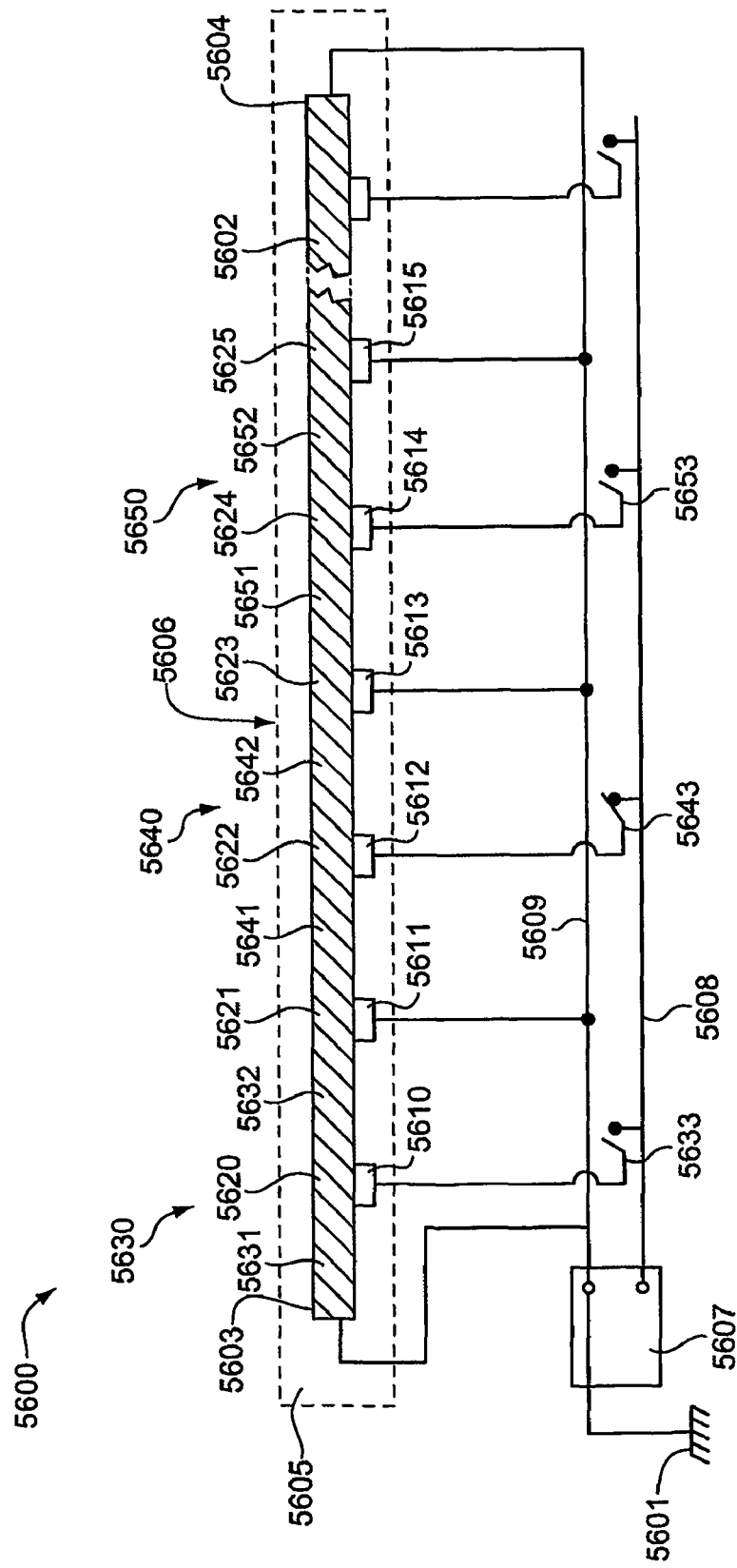
FIG. 54 depicts a generalized system in accordance with the invention in which circuit connections divide an elongated electrical conductor into a plurality of spans and segments for separate heating.

FIG. 54 depicts a generalized system 5600 in accordance with the invention. System 5600 includes an elongated electrical conductor 5602 having a head 5603 and a tail 5604, which define the conductor length. In certain embodiments, electrical conductor 5602 is integral with or mounted in an elongated object 5605, indicated by the dashed lines in FIG. 54. In practice, it is important that elongated object 5605 (if present) not interfere with the transfer of the Joule heat generated in conductor 5602 to the surface 5606 being de-iced. The term "elongated object" is, therefore, used here interchangeably with the term "elongated conductor". System 5600 further includes power source 5607, which may be an AC power source, an AC power source having a rectifier, or a DC power source. Power bus 5608 serves to deliver power from a first terminal of power source 5607 to elongated conductor 5602. Bus 5609 is connected to a second terminal of power source 5607. System 5600 further includes circuit connections along its length at connection points between head 5603 and tail 5604. These include circuit connections 5610, 5611, 5612, 5613, 5614, 5615, disposed at connection points 5620, 5621, 5622, 5623, 5624, 5625. Circuit connections electrically divide elongated conductor 5602 into a plurality of spans, at least one span having a length less than the conductor length. Elongated conductor 5602 is also electrically divided into one or more segments, each segment containing at least one span. At least one segment includes a conductor span having a span length less than the conductor length. As depicted in FIG. 54, system 5600 includes segment 5630, which includes cable spans 5631, 5632. A power terminal of power source 5607 is switchably connected through power bus 5608 and switch 5633 to circuit connection 5610 at connection point 5620. First end 5603 and circuit connections 5611 are connected through bus 5609 either to electrical ground 5601 or to a second power terminal of power source 5607. Preferably, bus 5609 is a ground conductor. Span 5631 has a first end at connection location 5620 and a second end at head 5603. Span 5632 has a first end connection location 5620 and a second end at connection location 5621. Segment 5640 includes spans 5641, 5642. Segment 5640 of elongated conductor 5602 is switchably connected to power source 5607 at connection location 5622 through circuit connections 5612, switch 5643 and power bus 5608. Connection location 5623 of elongated conductor 5602 is connected through circuit connection 5613 to bus 5609 (preferably to electrical ground). Span 5641 has a first end at connection location 5622 and a second end at connection location 5621. Span 5642 has a first end at connection location 5622 and a second end at connection location 5623, which is electrically connected to bus 5609 (preferably to ground). Similarly, segment 5650 includes spans 5651, 5652. Segment 5650 of elongated conductor 5602 is switchably connected to power source 5607 at connection location 5624 through circuit connections 5614, switch 5653 and power bus 5608. Connection location 5625 of elongated conductor 5602 is connected through circuit connection 5615 to bus 5609 (preferably to electrical ground 5601). Span 5651 has a first end at connection location 5624 and a second end at location 5623, which is connected to bus 5609 (preferably to ground). Span 5652 has a first end at connection location 5624 and a second end at connection location 5625, which is connected to bus 5609 (preferably to electrical ground 5601). In accordance with the invention, power is applied to heat elongated conductor 5602.

As AC electric power is supplied to system 5600 in accordance with the invention, circuit connections 5610, 5612, 5614 and corresponding connection locations 5620, 5622, 5624 (when simultaneously connected to power bus 5608 through switches 5633, 5643, 5653, respectively) have a potential corresponding to the voltage of the power source, while connection locations 5621, 5623, 5625, head 5603 and tail 5604 have either ground potential or a potential 180 degrees out of phase with potential at connection locations 5620, 5622, 5624. As a result, electric power is supplied "separately" to cable segments 5630, 5640, 5650. Thus, cable segments 5630, 5640, 5650 are electrically connected in parallel, each forming a separate branch of a parallel circuit. Here, "separate" indicates that a portion of electric power and current flows through one cable segment without flowing through another cable segment. It is clear, however, that in certain embodiments, electric current flows through a power bus connected to a plurality of cable segments before the electric current splits off into the individual segments.

A feature of preferred embodiments in accordance with the invention is that AC power is applied to a plurality of segments separately at a corresponding plurality of connection points along the elongated conductor, rather than to the whole elongated conductor in a single circuit. Since segment lengths are shorter than the elongated conductor length, heating and de-icing in a system by segments is conducted at lower voltage than de-icing in longer lengths of an elongated conductor. As explained above, with reference to FIG. 49 and Example 4, this reduces the overall voltage used to de-ice and elongated conductor, even when all of the segments are de-iced simultaneously. Thus, in certain preferred embodiments, electric power is supplied simultaneously to all spans of the elongated conductor, but it is supplied separately to segments of the conductor, each of which segments includes one or more spans, less than the total number of spans. The power used for de-icing all spans of a system 5600 simultaneously in an embodiments as depicted in FIG. 54 is virtually the same as the power consumed in embodiments in which lengths of cable spans are longer. Nevertheless, a lower-voltage mode of operation provides safer conditions for people on or near the cableway system.

Through the use of switches, such as switches 5633, 5643, 5653, one or several segments of system 5600 are de-iced, while other segments are not de-iced. As a result, power is applied to two a single connected span or a plurality of connected, while no power is being applied to other spans. Such separate and "non-simultaneous" heating of segments and spans of the elongated conductor reduces both voltage and power consumption at a given time. For example, segment 5640 containing spans 5641, 5642 in FIG. 54 is de-iced when switch 5643 is closed, while segments 5630 end 5650 are not de-iced and do not consume power because switches 5633, 5653 are open. Thus, in certain preferred embodiments in accordance with the invention, power is supplied at any given time to less than the total number of segments in the system. Reducing the total number of segments to which electric power is applied at a given time reduces total power levels. Also, limiting heating and de-icing to only ice-covered segments of elongated conductor 5602 or surface 5606 reduces total energy consumption. Instead of having a single power source 5607 as depicted in FIG. 54, an alternative system similar to 5600 includes a plurality of power sources, each power source providing power to one or more segments.

Systems and methods in accordance with the invention typically are used for heating and de-icing of cableways when the cableway system is not in operation, for example, during the night. Of course, embodiments of the invention are also useful while the cableway system is being used in normal operation. Preferred embodiments include power sources providing power to a cableway or other elongated conductor at low voltages, for example, in a range of about from 10 to 20 volts. Instead of distributing power to segments either through thick, expensive high-amperage cables or through thin cables connected to a power source at high voltage, a preferred embodiment includes distributing low-current power at high voltage in power buses that may be underground or otherwise hidden, and then transforming the high-voltage power to low-voltage high-current power for use above ground. The low voltage (e.g., 10-20 volts) reduces the risk of injury to persons.

The various embodiments in accordance with the invention provide relatively simple, reliable and inexpensive systems and methods for preventing and removing ice on the surface of an elongated object, in particular, a cableway. Although the embodiments have been described principally with regard to de-icing of ski lifts, the structures and methods herein described are applicable to many types of cableways and other elongated conductors and objects containing conductors. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above apparatus and methods without departing from the scope of the invention, it is intended that all subject matter contained in the above description or shown in the accompanying drawing be interpreted as illustrative and not in a limiting sense. For example, although first power bus 5120 in FIG. 49 makes electrical connection to ski lift cable 5102 through ski lift tower 5110, it is clear that electrical connection to ski lift cable 102 can be achieved by other techniques.

In other embodiments in accordance with the invention, electrical power is utilized to cause electrolysis of water molecules, which decreases ice adhesion Such embodiments are useful are useful for preventing and removing ice on large-area surfaces, for example, on land-based surfaces of transportation systems, such as, roads and highways, bridges, parking lots, sidewalks, airport runways, train tracks. Embodiments related to electrolysis are described herein with reference to FIGS. 55-62.

In one aspect, a system includes a first electrode, a second electrode, an interelectrode space between the electrodes, and a power source connected to the first electrode and a second electrode. Usually, the power source is a DC power source. The power source provides a voltage differential across the electrodes. When the interelectrode space between the first and second electrodes is occupied by ice or water having electrical conductivity, the ice or water provides an electrical connection between the electrodes. As a result, the voltage across the electrodes generates an electric current between the electrodes through the interelectrode space. The DC voltage and the DC electric current cause electrolysis of the water molecules at the first and second electrodes. Electrolysis at the "negative" electrode, or cathode, produces atomic hydrogen radicals. The hydrogen atoms combine to form gaseous molecular hydrogen, $H_2$. The hydrogen gas molecules nucleate to form hydrogen gas bubbles. Similarly, electrolysis at the "positive" electrode, or anode, produces atomic oxygen radicals. The oxygen atoms combine to form gaseous molecular oxygen, $O_2$. The oxygen gas molecules nucleate to form oxygen gas bubbles. The hydrogen and oxygen gas bubbles reduce the adhesion of ice contiguous to the electrodes. A low-frequency AC power source may also be utilized in accordance with the invention. The term "low-frequency AC" here means AC having a frequency not greater than about 5-10 Hz. At frequencies greater than about 5-10 Hz, there is not sufficient time for molecular hydrogen and oxygen molecules to nucleate and form gas bubbles because $H_2$ and $O_2$ molecules are generated at a different electrode from one alternating cycle to another.

In alternative embodiments in accordance with the invention, the mixing hydrogen and oxygen gases are ignited. The small explosions and shock waves resulting from ignition of the hydrogen-oxygen gas mixture break the ice at the ice-solid interface and remove ice fragments from the surface being protected. The ignition is conducted using various techniques. For example, ignition is achieved by applying short high-voltage pulses between the first and second electrodes of the deicing system, thereby providing electric sparks. In another example, ignition is conducted by inserting one or several small spark plugs at the electrodes. With reference to sparks for igniting hydrogen and oxygen gases, the term "at the electrodes" is used broadly to mean between the electrodes or close enough to them to ignite the mixture of hydrogen and oxygen.

The rate of the electrolysis reactions, and thereby the rate of hydrogen and oxygen gas production, at the first and second electrodes is dependent on the electric current density between the electrodes, among other factors. For example, DC current or low-frequency AC in the ice or liquid water in the interelectrode space between the first electrode and the second electrode typically has a current density in a range of from 0.1 to 10 mA/cm$^2$. The electric current density is dependent on the conductivity of the ice or water in the interelectrode space, as well as on the interelectrode distance, among another factors. The "interelectrode distance" is the distance between adjacent, oppositely-polarized electrodes. The interelectrode distance in a system for deicing of land-based surfaces may be relatively large because ice, liquid water and snow on roads and other land-based surfaces usually contain contaminants, resulting in high electrical conductivity. Because of the high conductivity of the contaminated ice, snow and water in the interelectrode space, the interelectrode distance between electrodes typically has a value in a range of from 0.5 to 10 mm.

To prevent electrical shorting of the first and second electrodes, an electrical insulator is disposed between the first and second electrodes. The electrical insulator may take many forms. It is only necessary that the electrical insulator allow water or ice to connect electrically the first and second electrodes and, thereby, to conduct electrical current between the electrodes.

Figure 55:
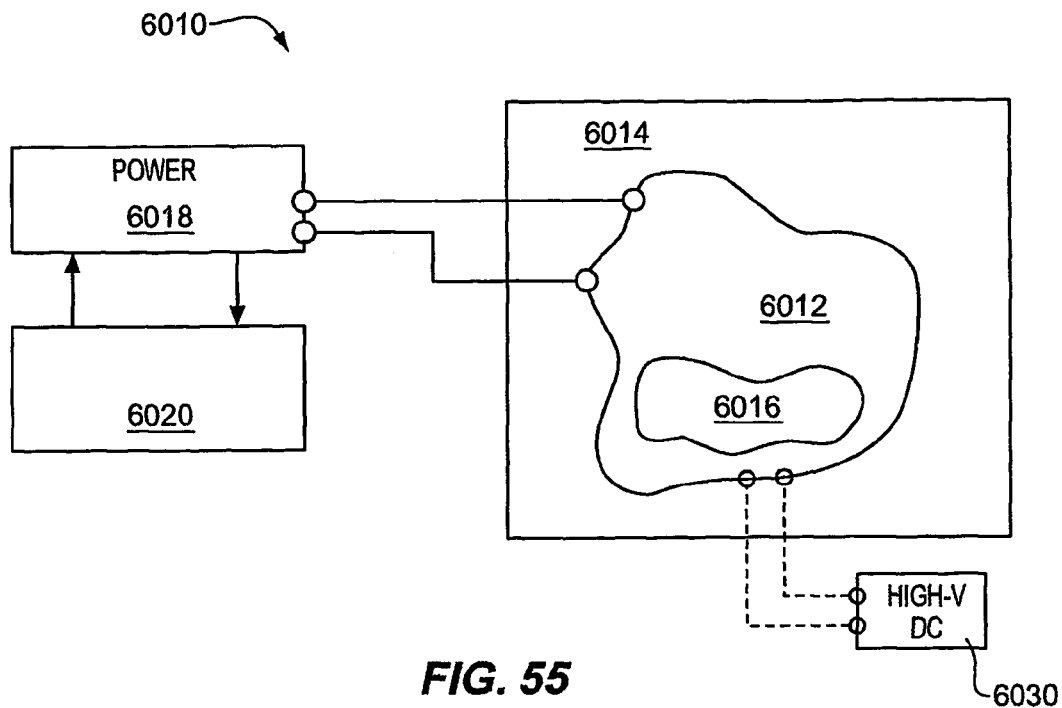
FIG. 55 shows in schematic form a system in accordance with the invention, containing an electrical deicing coating disposed on a surface to reduce the adhesion of ice.

FIG. 55 shows in schematic form a system 6010 in accordance with the invention, containing an electrical deicing coating 6012 disposed on surface 6014 to reduce the adhesion of ice 6016. Surface 6014 may be the surface of, for example, a road or highway, a bridge, a parking lot, sidewalks, an airport runway, or train tracks. Generally, surface 6014 may be any large-area surface subjected to cold, wet and ice conditions; for example, a road sign or a ship superstructure. Coating 6012 is preferably flexible so as to physically conform to the shape of surface 6014. In one basic embodiment, coating 6012 includes a first electrode and a second electrode separated by an interelectrode distance. When ice or water is present, its fills the interelectrode space between the first and second electrodes, thereby electrically connecting the first and second electrodes. In operation, a DC or a low-frequency AC voltage is applied to coating 6012 by power source 6018. Typically, this voltage is in a range of from about 2 to 100 volts, with higher voltages being applied for lower temperatures.

When voltage is applied, some of the $H_2O$ molecules of ice or liquid water present in the interelectrode space decompose into gaseous oxygen and hydrogen through electrolysis. Further, gases form within ice 6016, generating high-pressure bubbles that exfoliate ice 6016 from coating 6012 and from surface 6014. Typically, the current through the ice or water in the interelectrode space generated by the voltage applied across the electrodes has a current density in a range of from about 0.1 to 10 mA/cm$^2$. By way of example, for a temperature of −10° C. and an anode-to-cathode distance (i.e., "interelectrode distance") of 1 mm in coating 12, approximately 20 volts is applied to coating 6012 to provide 10 mA/cm$^2$ current density through impure ice, such as found on roads. If desired, a voltage regulator subsystem 6020 is connected in feedback with power source 6018, and hence with the circuit formed by coating 6012 and ice 6016. The applied voltage is thereby increased or decreased to optimize operation according to prevailing conditions.

In alternative embodiments in accordance with the invention, the mixing hydrogen and oxygen gases are ignited. FIG. 55 depicts an optional high-voltage DC power supply 6030 connected to coating 6012 to provide a voltage for generating ignition sparks. The dashed lines connecting power supply 6030 to coating 6012 indicate that high-voltage power supply 6030 and the ignition of the hydrogen and oxygen gas mixture are optional features of the invention. In one exemplary embodiment, high-voltage power supply 6030 provides short high-voltage pulses between the first electrode and second electrode, causing electric sparks. High-voltage pulses of 1000 volts or more having a duration of about one millisecond or less are usually sufficient to generate sparks. The small explosions and shock waves resulting from ignition of the hydrogen-oxygen gas mixture breaks the ice at the ice-solid interface and removes ice fragments from the surface being protected.

Figure 56:
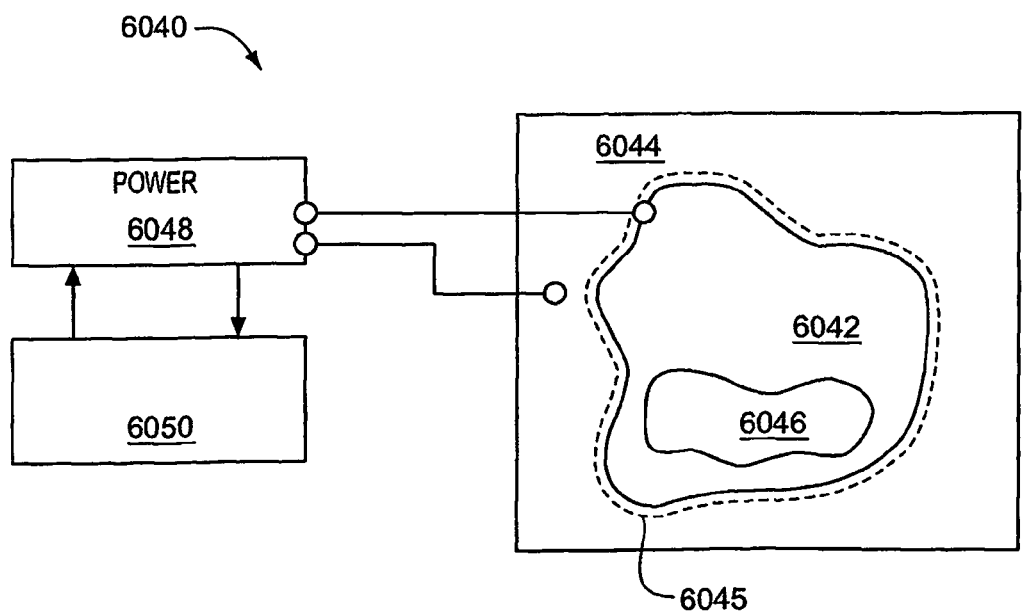
FIG. 56 shows a system containing an electrical deicing coating disposed over a conductive surface.

In one of several basic embodiments, the land-based surface is conductive and serves as the first electrode. FIG. 56 shows a system 6040 containing an electrical deicing coating 6042 disposed over conductive surface 6044. Conductive surface 6044 may be, for example, a road covered by conductive paint, a road surface containing electrically conductive material, or a metal bridge. Generally, surface 6044 may be any electrically-conductive large-area surface subjected to cold, wet and ice conditions; for example, a road sign or a ship superstructure. Coating 6042 is preferably flexible so as to physically conform to the shape of surface 6044. Coating 6042 is porous to water so that it allows water or ice to occupy at least a portion of the interelectrode space and, thereby, electrically connect the first and second electrodes. Conductive surface 6044 serves as the first electrode, and coating 6042 includes the second electrode. In operation, a voltage is applied between coating 6042 and surface 6044 by power source 6048. The voltage applied to coating 6042 is typically equal and opposite to the voltage applied to surface 6044. If desired, a porous insulator 6045 may be disposed in the interelectrode space between coating 6042 and surface 6044. As described below, coating 6042 preferably includes both the second electrode and insulator 6045. Insulator 6045 is also porous so that it allows water or ice to occupy at least a portion of the interelectrode space. In operation, a DC or a low-frequency AC voltage is applied to deicing coating 6042 and conductive surface 6044 by a power source 6048. Typically, this voltage is in a range of from about 2 to 100 volts, with higher voltages being applied for lower temperatures.

When voltage is applied, some of the $H_2O$ molecules of ice or liquid water present in the interelectrode space decompose into gaseous oxygen and hydrogen through electrolysis. Further, gases form within ice 6046, generating high-pressure bubbles that exfoliate ice 6046 from coating 6042 and from surface 6044. Typically, the current through the ice or water in the interelectrode space generated by the voltage applied across the electrodes has a current density in a range of from about 0.1 to 10 $mA/cm^2$. If desired, a voltage regulator subsystem 6050 is connected in feedback with power source 6048 to optimize operation.

Figure 57:
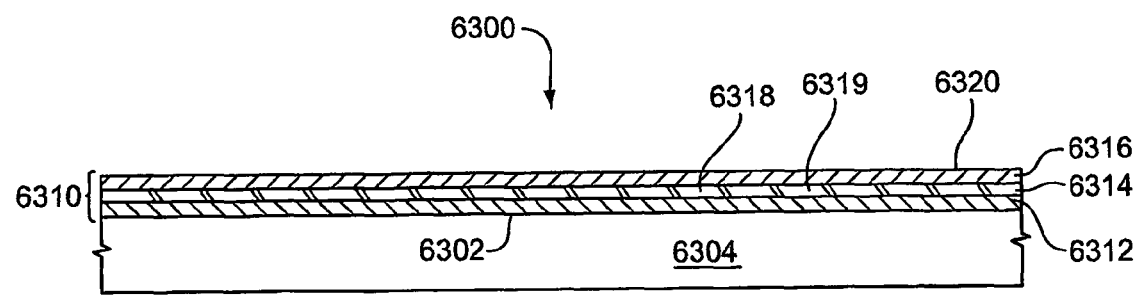
FIG. 57 depicts in schematic form a cross-section of a system containing a laminate coating having a bottom, first electrode, a porous insulator layer, and a top, second electrode layer.

FIG. 57 depicts in schematic form a cross-section of a portion 6300 of a system in accordance with the invention. Portion 6300 includes a surface 6302 of a solid object 6304. Typically, surface 6302 is a land-based surface of a road, bridge, sidewalk, airport runway or other land-based transportation surface. As explained above, however, object 6304 may be any object having a large surface area exposed to ice, such as a ship superstructure. Portion 6300 further includes a stacked coating 6310. Coating 6310 includes a bottom, first electrode 6312, a porous insulator 6314, and a top, porous second electrode 6316. First electrode 6312 and second electrode 6316 define an interelectrode space 6318 between them. Porous insulator 6314 is located in interelectrode space 6318. Interelectrode space 6318 contains void space 6319 that is filled by ice or liquid water, electrically connecting first electrode 6312 and second electrode 6316. Porous insulator 6314 may comprise relatively nonporous material having holes, thereby forming the necessary void space. Alternatively, porous insulator 6314 may consist of porous material having an internal void space that is filled and occupied by liquid water or ice. Top, second electrode 6316 is also necessarily pervious to water so that water or ice deposited on the outer surface 6320 of second electrode 6316 can fill interelectrode space 6318, thereby providing electrical contact between first electrode 6312 and second electrode 6316. First electrode 6312 and second electrode 6316 may be fabricated from a variety of conductive materials. For example, the two electrodes may be made of metal-sheets, conductive metal oxide, conductive asphalt, conductive polymer, carbon, conductive paint or any other nonexpensive durable and conductive material. Stacked coating 6310 may be a laminate coating containing three layers, namely, a bottom electrode layer 6312, a porous insulator layer 6314, and a porous top electrode layer 6316. The laminate may be applied as a separate element onto a surface of an object being protected against the ice. Or, stacked coating 6310 may be incorporated into the structure of the object itself during fabrication of the object.

Terms of orientation, such as "top", "bottom", "above" and others, are used here with relation to the surface being protected by deicing. For example, with reference to FIG. 57, bottom electrode layer 6312 is closer to surface 6302 than top electrode layer 6316. Therefore, top electrode layer 6316 is "above" bottom electrode layer 6312. In FIG. 57, surface 6302 is substantially horizontal. It is understood that a surface being protected in accordance with the invention may be spatially oriented in many positions different from horizontal.

The term "contiguous with the surface" and related terms is used broadly in one sense to mean that an electrode or electrode layer is embedded in or part of or adjacent to the surface being protected by deicing in accordance with the invention. With regard to ice, the term "contiguous" indicates that ice is on or close to or adjacent to the surface being protected.

The term "cover the surface" and similar terms are used in the normal sense to indicate that an electrode or an insulator covers all or apart of the surface being protected in accordance with the invention. In certain instances, the term may also refer to an electrode that is part of or embedded in a surface. The term alone does not indicate actual direct physical contact, although a structural element of an embodiment covering another element may be in actual physical contact with it For example, in some embodiment, a second electrode covers a first electrode, but the first and second electrodes do not directly contact each other.

The term "insulator fiber" is used in a broad sense to refer to any dielectric or electrically insulating material that has an elongated shape.

Figure 58:
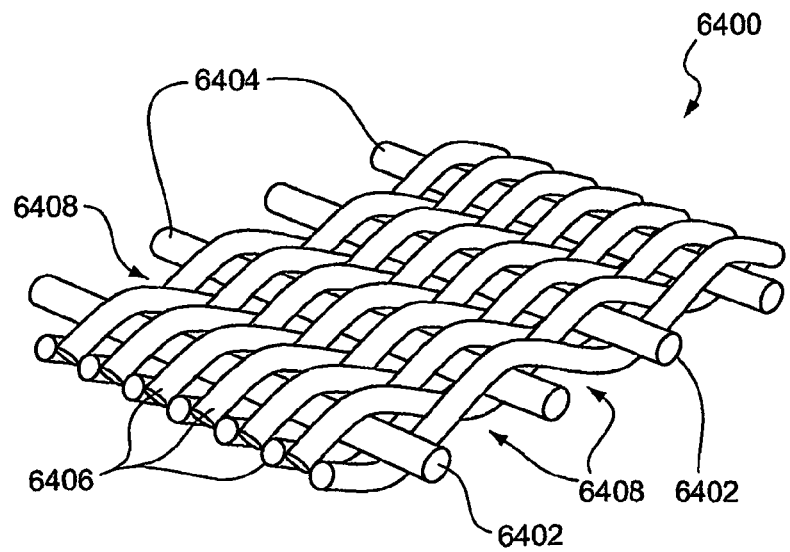
FIG. 58 shows a sketch of a composite mesh coating suitable for use in a system in accordance with the invention, in which the mesh includes first electrode wires, second electrode wires, and insulator fibers.

FIG. 58 shows a sketch of a mesh coating 6400 suitable for use in a system in accordance with the invention; for example, in a variation of a system as described with reference to FIG. 57. Mesh 6400 includes first electrode wires 6402 and second electrode wires 6404, in accordance with the invention. If DC current is used, then one set of electrode wires (e.g., electrode wires 6402) functions as anodes, and the other set of electrode wires functions as cathodes. In any case, electrode wires 6402 and electrode wires 6404 are oppositely polarized during operation Dielectric insulator fibers 6406 form an insulating weave about wires 6402, 6404 to prevent shorting. Wires 6402, 6404 are connected to a power source (for example, power source 6018 or 6048) such that appropriate current density causes electrolysis of $H_2O$ molecules at the electrode surfaces. Typical interelectrode distances between adjacent wires 6402, 6404 are about 0.5 to 10 mm, although smaller or larger distances are also suitable. Wires 6402, 6404 comprise any electrically conductive material, such as conductive metal or conductive polymer. For example, wires 6402, 6404 typically comprise titanium or niobium or other metal with high resistance to electro-corrosion. Generally, anode wires have a very high resistance to anodic corrosion. For that, they may be coated with thin layers of platinum or gold or amorphous carbon. Other alloys may also be applied. Cathode wires are preferably impervious to hydrogen. Examples of good cathode material include gold, copper, brass, bronze, and silver. In contrast to a system as depicted in FIG. 57, first electrode 6402 and second electrode 6404 are not disposed one on top of the other, rather they are essentially side-by-side. The interelectrode distance and the interelectrode space 6408 between the electrodes are determined partially by the thickness of wires 6402, 6404 and fibers 6406. Mesh coating 6400 is preferably flexible so that it physically conforms to the shape of a surface, such as surface 6302. Mesh coating 6400 may be applied and held firm on the surface using a variety of techniques. For example, a mesh 6400 may be embedded near the top surface of a concrete or asphalt road. Or, a mesh 6400 may be pressed into the top surface of soft asphalt.

Figure 59:
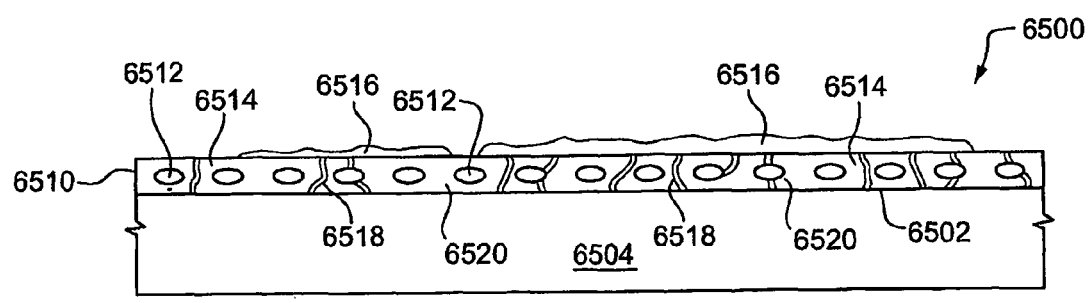
FIG. 59 depicts in schematic form a cross-section of a system containing a conductive surface of a solid object and a porous composite coating that includes electrically conductive material and insulator material.
Figure 60:
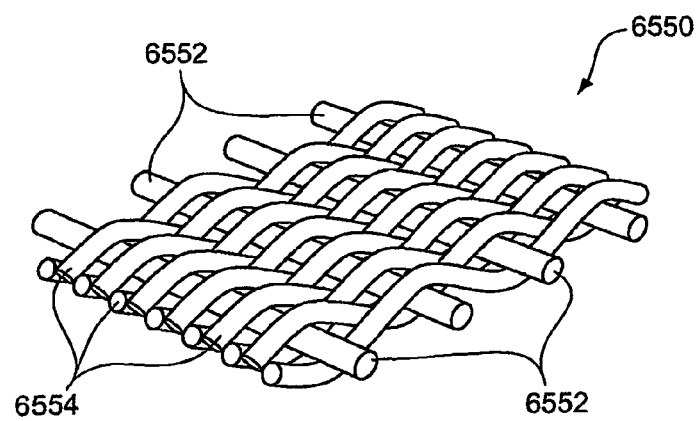
FIG. 60 depicts in sketch form a composite mesh coating containing electrode wires having the same polarity and insulator fibers that separate the electrode wires from a conductive surface.

FIG. 59 depicts in schematic form a cross-section of a portion 6500 of a system in accordance with the invention. Portion 6500 includes a conductive surface 6502 of a solid object 6504. Solid object 6504 is an asphalt road or a concrete runway or other object fabricated to make it or its surface 6502 electrically conductive. For example, asphalt doped with carbon black to make it electrically conductive is commercially available and economically viable. Solid object 6504 functions, therefore, as the first electrode. Portion 6500 further includes a composite coating 6510 that includes electrically conductive material 6512 and insulator m but the issue aterial 6514. The electrically conductive material 6512 in composite coating 6510 functions as the second electrode, which is separated by the insulator material 6514 from the first electrode to prevent shorting. Composite coating 6510 is porous so that ice or liquid water 6516 is able to fill void space 6518 of the interelectrode space 6520 between electrodes 6504 and 6512. FIG. 60 depicts in sketch form a composite mesh coating 6550 in accordance with the invention. Coating 6550 contains electrode wires 6552, connected to a power source so that they have the same polarity. The electrode wires 6552 may comprise any conductive material. Typically, electrode wires 6552 comprise conductive metal. Coating 6550 also contains insulator fibers 6554. Coating 6550 may be applied, for example, to surface 6502 of FIG. 59, where surface 6502 is conductive and functions as the first electrode surface. When DC or low-frequency AC power is applied to surface 6502 and electrode wires 6552, a potential exists between surface 6502 and wires 6552. Insulator fibers 6554 prevent wires 6552 from shorting, and further prevent shorting between wires 6552 and surface 6502. Ice or liquid water in the interelectrode space between electrode wires 6552 and electrode surface 6502 completes the circuit between electrode wires 6552 and electrode surface 6502. When power having sufficient voltage is applied to the electrodes, electrolysis occurs at the electrodes, resulting in a reduction of ice adhesion strength in accordance with the invention. Composite mesh coatings 6510 and 6550 may be applied to conductive surfaces 6502 using a variety of techniques. For example, a mesh 6510, 6550 may be embedded near the top surface of a concrete or asphalt road. Or, a mesh 6510, 6550 may be pressed into the top surface of soft asphalt.

Figure 61:
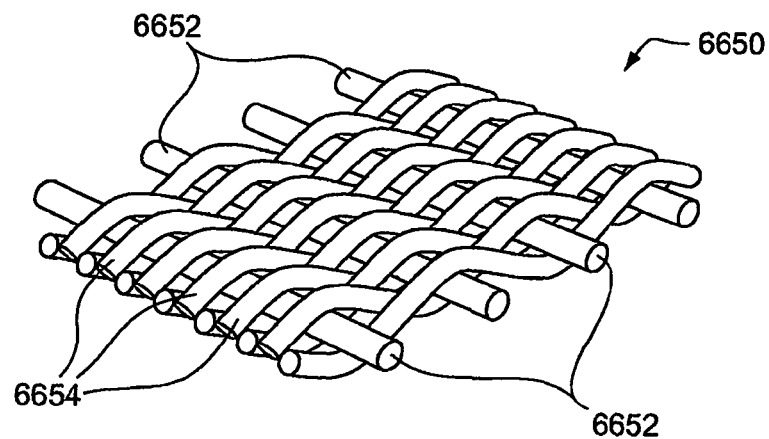
FIG. 61 shows a conductive metal mesh coating in accordance with the invention, in which the coating is applied to cover a conductive surface, and the bottom of the mesh is coated with a coating of an electrical insulator.

FIG. 61 shows a conductive mesh coating 6650 in accordance with the invention. Mesh coating 6650 comprises conductive wires 6652 and conductive wires 6654, which have the same polarity during operation. Conductive mesh coating 6650 is applied to cover a conductive surface 6502. Conductive surface 6502 functions as the first electrode, and conductive mesh 6650 functions as the second electrode. An insulator occupies at least a portion of the interelectrode space between conductive mesh 6650 and conductive surface 6502. In a typical embodiment, mesh 6650 is a flat, flexible mesh comprising conductive wires, having a top and bottom. The bottom of the flat mesh is coated with a coating of an electrical insulator. This flat mesh is pressed onto the land-based surface such that the conductive bottom of the flat mesh is not in electrical contact with the land-based surface. Rather, the electrical insulator coating on the bottom of the mesh electrically insulates the flat wire mesh of the second electrode from the underlying first electrode surface. When water or ice fills the interwire openings in the mesh and the interelectrode space, then the ice or water in the mesh openings and interelectrode space electrically connects the first and second electrodes.

Figure 62:
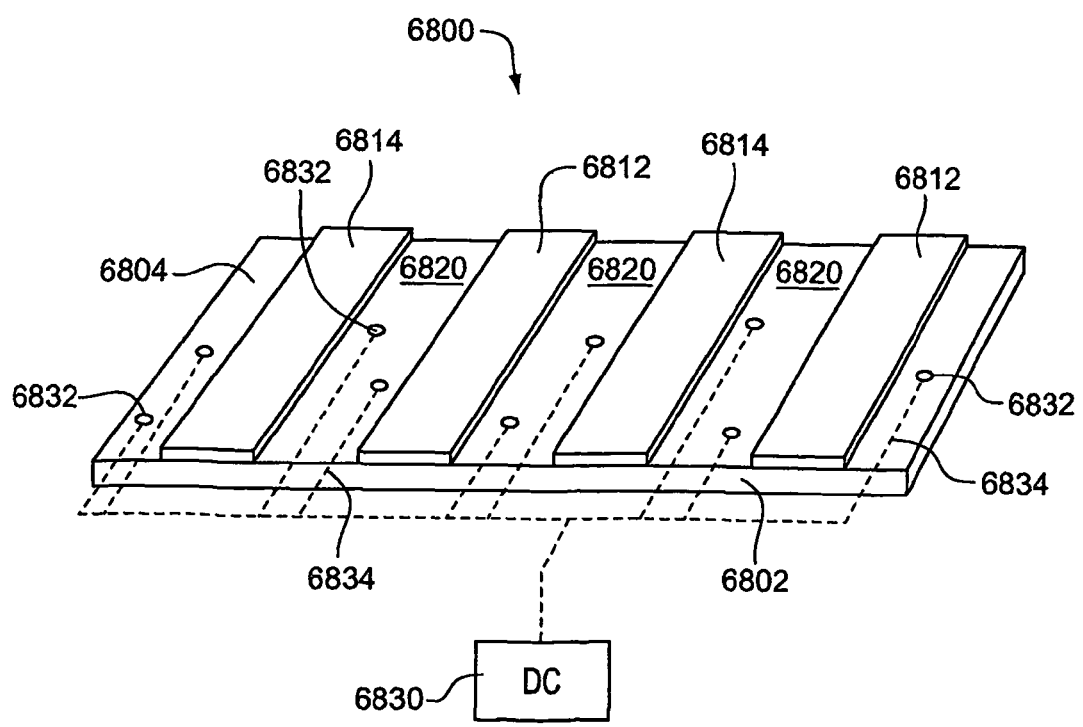
FIG. 62 depicts in schematic form a perspective view of a section of a system in accordance with the invention, in which a continuous first electrode layer of conductive material covers a first portion of the land-base sure, a continuous second electrode layer of conductive material covers a second portion of the land-base surface, and a nonconductive third portion of the surface separates the first and second electrode portions.

In still another embodiment, the first electrode is a continuous layer of conductive material covering a first portion of the land-based surface, the second electrode is a continuous layer of conductive material covering a second portion of the land-base surface, and the interelectrode space covers a third portion of the land-based surface between the first and second electrode portions. The conductive material may be selected from many types, shapes and compositions, including metal sheets, conductive asphalt or concrete, conductive polymers, and conductive paints. FIG. 62 depicts in schematic form a perspective view of a section 6800 of a system in accordance with the invention. Section 6800 includes an object 6802 having a surface 6804 to be protected against ice by a deicing method in accordance with the invention. Section 6800 includes interdigitated electrodes 6812, 6814, each connected to terminals of a power source (not shown) that provides electrolysis voltage. The term "interdigitated" means that "fingers" of oppositely charged electrode material are arranged alternatingly. At any moment during operation, electrodes 6812 have a polarity opposite to that of electrodes 6814. Thus, during operation, each of electrodes 6812, 6814 is adjacent to an oppositely polarized electrode. If DC voltage is applied, then first electrodes 6812 may be the anodes, while second electrodes 6814 are the cathodes, or vice versa The interelectrode distance between adjacent electrodes is typically in a range of from 0.5 to 10 mm, although smaller or larger distances are also suitable, depending on available applied voltage, expected temperature, thickness of the ice (not shown), and ice purity. Adjacent electrodes 6812, 6814 define interelectrode spaces 6820. Ice or liquid water that fills interelectrode space 6820 functions to connect electrically the adjacent electrodes 6812, 6814. When electrolysis voltage is applied, some of the $H_2O$ molecules of ice or water present in interelectrode space 6820 decompose into gaseous oxygen and hydrogen through electrolysis. Further, gases form within ice, generating high-pressure bubbles that exfoliate the ice from surface 6804. The electrodes 6812, 6814 may be fabricated using various techniques. For example, electrodes 6812, 6814 may be strips or sheets of metal that are embedded in concrete or asphalt. The electrodes 6812, 6814 may be conductive portions of a composite object containing conductive and not conductive portions. For example, electrodes 6812, 6814 may be strips or sections of conductive asphalt, while the interelectrode space 6820 between the electrodes comprises nonconductive asphalt. Electrodes 6812, 6814 may be strips of conductive paint applied to a nonconductive surface. A typical nonconductive surface includes nonconductive asphalt or concrete or a nonconductive paint applied to a conductive object, such as a metal bridge.

In alternative embodiments in accordance with the invention, the mixing hydrogen and oxygen gases are ignited. FIG. 62 depicts an optional DC power supply 6830 connected to optional spark plugs 6832 located between first electrodes 6812 and second electrodes 6814. Each of spark plugs 6832 comprise essentially two point electrodes separated by a small sparking distance. In an exemplary embodiment, spark plugs 6832 are distributed over the surface area of surface 6804 at a density of about $0.2/cm^2$. The point electrodes of spark plugs 6832 are separated by a sparking distance of about 0.1 mm, and power supply 6830 provides a DC voltage of about 50 to 100 volts. Each dashed line 6834 in FIG. 62 represents a pair of oppositely polarized leads from power supply 6830 to a spark plug 6832. Lines 6834 connecting power supply 6830 and spark plugs 6834 are dashed to indicate that these features are optional.

As discussed above, the DC or low-frequency AC power source 6018, 6048 in embodiments in accordance with the invention typically provides a potential difference in a range of from 2 to 100 volts between electrodes. In operation, the DC or low-frequency AC has a current density in a range of from 0.1 to 10 $mA/cm^2$ at the electrodes.

Embodiments for preventing freezing of a liquid water layer are described with reference to FIGS. 63-68.

Figure 63:
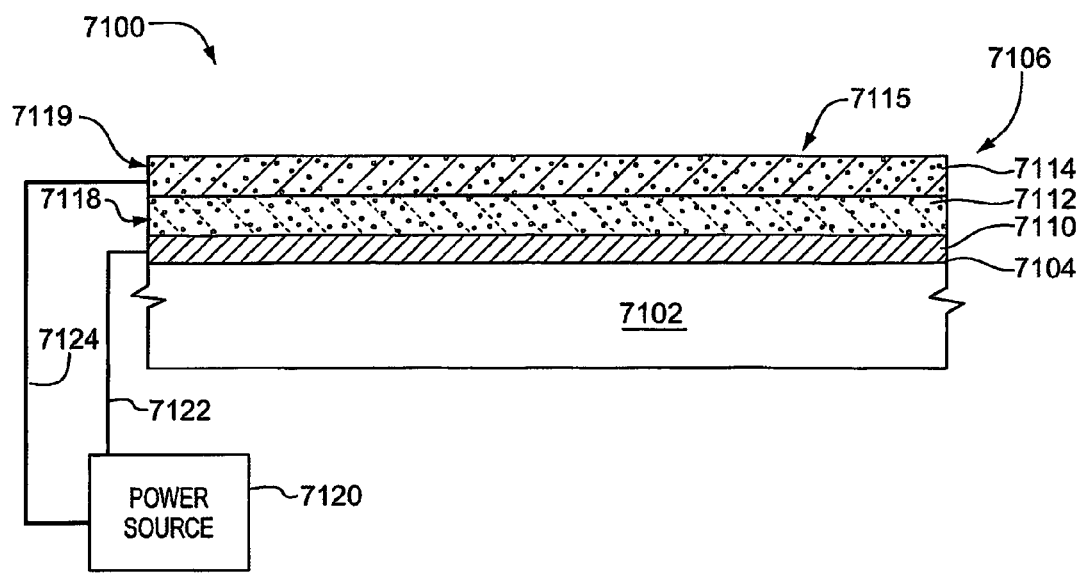
FIG. 63 depicts an embodiment in accordance with the invention suitable for preventing formation of ice on a surface by preventing freezing of a liquid water layer.

The diagram of FIG. 63 depicts a preferred embodiment of a system 7100 in accordance with the invention. In system 7100, solid object 7102 has an exterior surface 7104 on which ice formation is prevented by preventing freezing of a liquid water layer. A laminate structure 7106 comprising a plurality of layers 7110, 7112 and 7114 is disposed on surface 7104. A first electrode layer 7110 is located at surface 7104. A porous insulator layer 7112 is disposed on first electrode layer 7110, and a second electrode layer 7114 is located on insulator layer 7112, covering insulator layer 7112, first electrode layer 7110 and surface 7104. Second electrode layer 7114 has an outside surface 7115, exposed to water, such as precipitation or condensation water. Continuously porous insulator layer 7112 creates an interelectrode space 7118 and is porous to water. System 7100 further comprises an AC power source 7120 electrically connected to first electrode layer 7110 and second electrode layer 7114 by connecter 7122 and connector 7124, respectively. In system 7100, second, top electrode layer 7114 and insulator layer 7112 are porous to water. As a result, when water deposits on outside surface 7115, it fills the pores throughout second electrode layer 7114 and the interelectrode space 7118 of insulator layer 7112, thereby creating a liquid water layer 7119 (designated by the solid circles interspersed in interelectrode space 7118 and second electrode layer 7114 of FIG. 63) that electrically connects first electrode layer 7110 and second electrode layer 7114.

It is a feature of a system and a method in accordance with the invention that the interelectrode distance between the first electrode and the second electrode is small. Generally, the larger the interelectrode distance, the greater the applied voltage (whether AC or DC) must be to provide sufficient power for preventing freezing of water in the liquid water layer. Based on empirical data contained in the examples described below, one skilled in the art may calculate a voltage corresponding to any thickness of interelectrode distance. Nevertheless, practical considerations generally limit the interelectrode distance to a value less than 3 mm, more typically to a distance not exceeding 500 µm, preferably not exceeding 100 µm, and most preferably not exceeding 10 µm. There is no theoretical lower limit to the size of the interelectrode distance. Generally, the interelectrode distance corresponds to the thickness of the interelectrode space between the first electrode and the second electrode. In FIG. 63, the size of the interelectrode distance is defined by the thickness of porous insulator layer 7112, located between first electrode layer 7110 and second electrode layer 7114. With currently utilized conventional deposition techniques, electrodes and porous insulator layers may be formed routinely to achieve interelectrode distances as small as 5 nm ("nanometer").

As discussed above, the power required in a system in accordance with the invention is highly dependent on the interelectrode distance, with the required voltage decreasing as interelectrode distance decreases. When the interelectrode space does not exceed 100 µm, power source 7120 is suitable when it provides a voltage in the range of from 1 to 100 volts, preferably in a range of from 5 to 25 volts. In embodiments having an interelectrode space not exceeding 100 µm, a voltage generating a current density in water in the interelectrode space 7118 in a range of from 1 to 100 $mA/cm^2$, or greater, typically prevents formation of ice down to about $-10°$ C.

In a method in accordance with the invention, when water has deposited on outside surface 7115 of laminate 7106, it permeates porous second electrode 7114 and insulator layer 7112, forming a liquid water layer 7119. Liquid water layer 7119 in interelectrode space 7118 electrically connects first electrode layer 7110 and second electrode layer 7114. When a voltage is applied to electrodes 7110 and 7114, it inhibits ice formation in liquid water layer 7119 in the interelectrode space 118, especially near electrodes 7110, 7114. Presence of even a thin layer of liquid water covering surface 7104 of solid object 7102 prevents any significant formation of ice on surface 7115, even at cold temperatures well below the freezing point of water. Consumption of electrical power to prevent ice formation in a liquid water layer in accordance with the invention is typically in a range of from 0.75 to 10 $kW/m^2$. The greater the interelectrode distance is, the greater the applied voltage (whether AC or DC) must be to generate electric power sufficient to prevent ice formation.

A system 7100 and a corresponding method are useful in many types of circumstances and for protecting many types of solid objects against ice formation. For example, solid object 7102 includes: an airplane wing; a helicopter blade; a heat exchanger coil; roads and sidewalks; windshields and windows; and many others.

A nonexclusive list of materials which may be contained in the first electrode or second electrode layers includes: aluminum, copper, titanium, platinum, nickel, gold, mercury, palladium and mixtures thereof Other suitable conductive electrode materials include carbon and conductive metal oxides, such as $SnO_2$, $InSnO_2$, $RuO_2$ and $IrO_2$. A specific advantage of embodiments in accordance with the invention in which AC power is applied to the electrodes is that the electrodes may comprise substantially corrosion-resistant titanium. Titanium is virtually useless as electrode material when used with DC voltage. In contrast, titanium functions well as an electrode when the AC voltage has a frequency of 50 Hz or greater.

Figure 64:
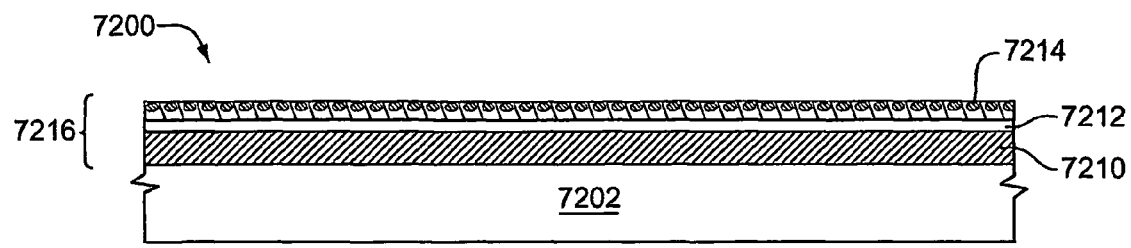
FIG. 64 depicts an exemplary multi-layer laminate in accordance with the invention disposed on an aerofoil.

As depicted in FIG. 64, and described below in Example 5, the second electrode may be a second electrode layer in the form of a mesh having electrically conductive mesh fibers. Typically, mesh fibers comprise a conductive metal. Preferably, the mesh fibers have a thickness in a range of from 1 to 50 µm. Alternatively, the second electrode layer, as well as the first electrode layer, may be formed using standard techniques, such as sputtering, chemical vapor deposition, spraying, painting, photolithography, electroplating and others.

In embodiments in which a porous insulator layer is disposed between the first electrode layer and the second electrode layer, forming the interelectrode space, the porous insulator layer has a total volume and a pore space, and the pore space may occupy between 0 and 100 percent of the total volume. Typically, the pore space occupies about 50 percent or more of the total volume, and preferably about 70 percent.

Frequently, the first electrode layer comprises aluminum and the porous insulator layer comprises aluminum oxide. In such embodiments, the porous insulator layer typically comprises anodized aluminum. A first electrode layer comprising aluminum is formed on the surface of the object being protected using any of a variety of standard methods. Then, the upper surface of the first electrode layer is anodized using standard techniques. The anodized aluminum can be made to be porous.

Frequently, the surface of the solid object is conductive or includes the first electrode layer. For example, the conductive outer surface of an airplane wing may function as a first electrode layer in a system in accordance with the invention.

Figure 66:
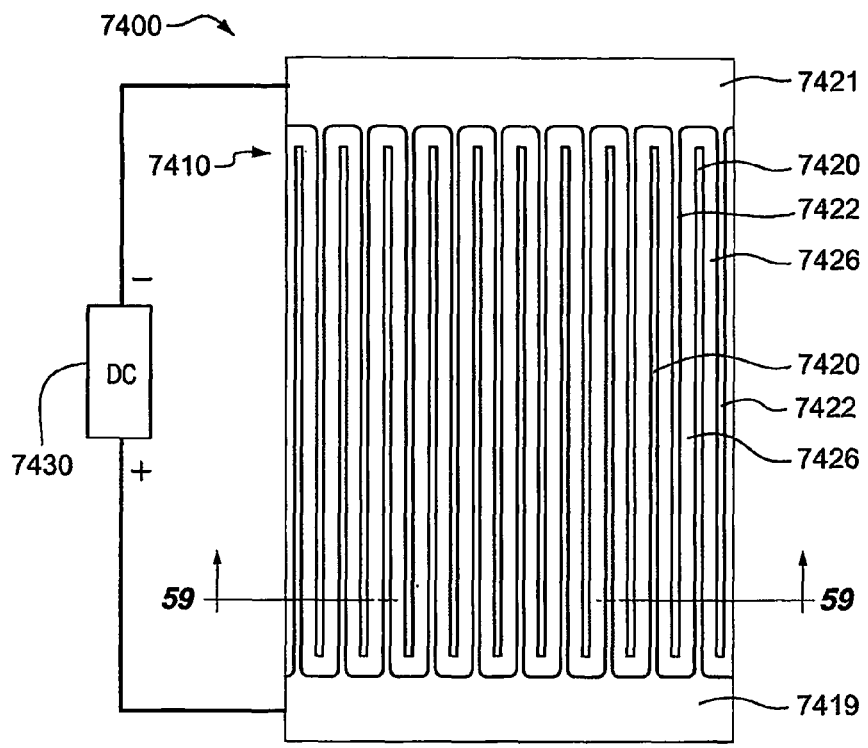
FIG. 66 depicts an exemplary system having interdigitated electrodes.

In some embodiments in accordance with the invention, as depicted in FIG. 66 and described below in Example 5, both the first and the second electrode layers are disposed side-by-side on the surface of the object being protected, separated by an interelectrode distance corresponding to the interelectrode space. In such embodiments, the first and second electrodes are typically interdigitated.

Terms of orientation, such as "top", "bottom", "above" and others, are used with relation to the surface being protected against ice formation. For example, with reference to FIG. 63, bottom electrode layer 7110 is closer to surface 7104 of object 7102 than top electrode layer 7114. Therefore, top electrode layer 7114 is "above" bottom electrode layer 7110. In FIG. 63, surface 7104 is substantially horizontal. The term "cover" indicates that a first element that covers a second element is above the second element. For example, in FIG. 63, top, second electrode 7114 and covers both bottom, first electrode 7110 and surface 7104. It is understood that a surface being protected in accordance with the invention may be spatially oriented in many positions different from horizontal.

In a second basic embodiment of systems and methods in accordance with the invention, a DC power supply is used to provide a DC voltage across the first and second electrodes. Otherwise, a DC system and method are virtually the same as described above with reference to FIG. 63, or below with reference to FIGS. 58 and 59. For example, a DC voltage was utilized in Examples 5-8, described below. Although the first, bottom electrode layer 7110 of FIG. 63 may serve either as cathode or anode in the DC system, typically, first electrode layer 7110 of laminate 7106 functions as cathode.

Example 5

A system 7200 in accordance with the invention is depicted in FIG. 64. An aluminum foil 7210 was stretched over a massive cylindrical aluminum aerofoil 7202. A porous insulating film 7212 of aluminum oxide, $Al_2O_3$, having a thickness of approximately 10 μm was formed by anodizing aluminum foil 7210. Then, a stainless steel mesh 7214 electroplated with nickel and platinum was disposed on the aluminum oxide, forming a three-layer laminate 7216. Mesh 7214 was a 400-gauge mesh woven of 22.4 μm wire. Two thin thermocouples were inserted in the aluminum cylinder at 2 mm and 25 mm from the mesh. Cold air having a temperature of −12° C. and a water content of zero and then 0.25 g/m³ was flowed at a speed of 200 miles/hour across aerofoil 7202 covered by laminate 7216. A DC power supply having a voltage of 50 volts was connected to electrodes 7210, 7214 during the whole time that measurements were taken. Aluminum foil (first electrode) 7210 functioned as the cathode and mesh (second electrode) 7214 functioned as the anode.

Figure 65:
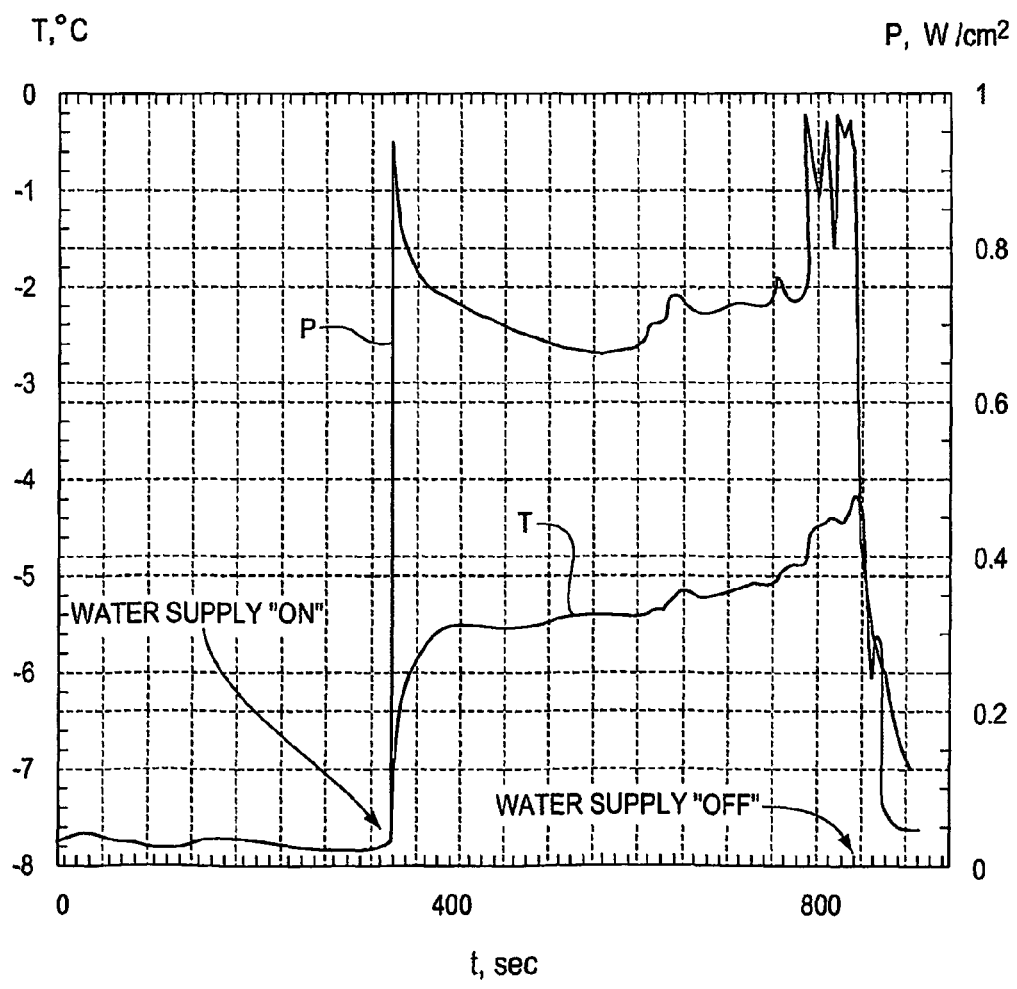
FIG. 65 contains a graph in which leading-edge temperature, T, in ° C., and electric power dissipation, P, in units of W/cm$^2$, are plotted as a function of time, t, in seconds, in the exemplary system depicted in FIG. 56.

In the graph of FIG. 65, leading-edge temperature, T, in ° C., and electric power dissipation, P, in the mesh electrodes, in units of W/cm², are plotted as a function of time, t, in seconds, during which water supply in the cold air was turned "on". The data show that before the water supply was turned on, the temperature measured in the mesh was approximately −8° C., and the power consumption was approximately zero. Even while the power consumption was zero, the mesh temperature exceeded the ambient air temperature due to adiabatic compression of the air at the leading-edge of the aerofoil. At a time of approximately 350 seconds, the water supply through a misting apparatus was turned "on". A stream of micron-size liquid water particles was thereby injected at a rate of 0.25 g/m³ into the cold air stream flowing across the aerofoil. Because the misted water particles were so small, they quickly reached temperature equilibrium of −12° C. with the cold air. On the other hand, the water particles remained liquid at −12° C. because of the large increase in surface energy that would be required to change the particles from the liquid state to a frozen solid state. As the air-borne particles deposited on the surface of the aerofoil, liquid water filled the pores in mesh electrode 7214 and the interelectrode space of aluminum oxide layer 7212, thereby forming a liquid water layer, which electrically connected aluminum foil electrode 7210 and wire mesh electrode 7214. As a result, the power consumption suddenly rose to about 0.7-0.9 W/cm². Also, the measured temperature rose from about −8° C. to about −5° C. The increase in temperature was probably a result of the release of energy as water vapor in the air condensed on the aerofoil. Nevertheless, at no time did liquid water freeze on the surface of the aerofoil even though its measured temperature was −5° C. At a time, t, of approximately 830 seconds, the water supply to the air was turned "off". Thereafter, the water in the mesh and the interelectrode space of the aluminum oxide layer quickly drained off from the leading-edge where the thermocouples were located or evaporated into the dry air. As a result, the electrical connection between the aluminum electrode and the upper mesh electrode was interrupted, causing the power consumption to decrease rapidly from the value of about 1 W/cm² to almost zero, even though the voltage of the power source was not decreased. Simultaneously, the measured temperature dropped from about −4° C. to about −8° C. The power and temperature curves in FIG. 65 show that while water was supplied to the cold air stream, the liquid water in the liquid water layer on the aerofoil did not freeze and form ice, even though the water was supercooled to a temperature value of at least less than −5° C., during which time power was consumed at a rate of about 0.7-0.8 W/cm². As explained below in Example 7, the measured electric power consumption would have been insufficient to raise the temperature of the bulk water through resistive heating by even 0.1° C.

Similar prevention of ice formation was observed in exemplary systems in accordance with the invention when the mesh was covered with a thin liquid water layer and the system was cooled by circulating coolant.

Example 6

A system as described in Example 5 was assembled, but the porous insulating film of aluminum oxide had a higher pore density, that is, the pore space occupied approximately 70 percent of the total volume of the insulating film. As a result, the water-filled channels of the liquid water layer in the porous insulating film provided higher conductivity (that is, less electrical resistance) between the electrodes, thereby allowing higher current density for a given voltage. Measurements similar to those in Example 5 were made. The same degree of ice prevention as in Example 4 was achieved by using only 20-25 volts, instead of 50 volts. The lower voltage corresponded to an electric power of just 0.3 W/cm², instead of approximately 0.8 W/cm² of Example 5.

Example 7

Figure 67:
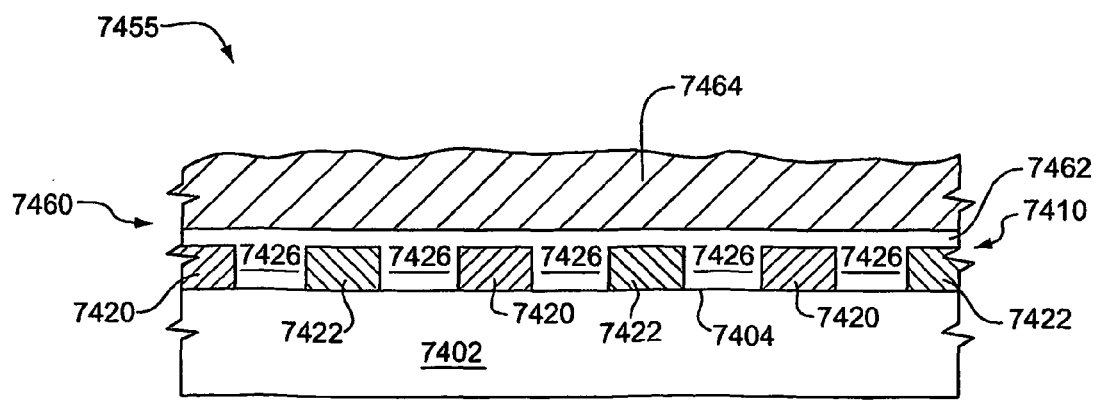
FIG. 67 depicts a schematical cross-sectional view of a portion of a system containing interdigitated electrodes.

Interdigitated copper-grid electrodes were electroplated with gold on the surface of a 125 μm thick kapton film. FIG. 66 shows a top view in schematic form of a system 7400 in accordance with the invention having interdigitated electrodes 7410. FIG. 67 shows a cross-section section 7455 of system 7400, indicated by lines 5 in FIG. 66. As depicted in FIGS. 66-67, a first portion of kapton film surface 7404 of kapton film 7402 was covered with first electrode stem 7419 and corresponding first electrodes 7420. A second portion of kapton film surface 7404 was covered with second electrode stem 7421 and corresponding second electrodes 7422. A third portion 7426 of the electrically nonconductive kapton film surface 7404 was not covered with electrode material. Adjacent "fingers" of interdigitated electrodes 7410, functioning alternately as anodes 7420 and cathodes 7422, were separated by interelectrode spaces 7426. Interdigitated electrodes 7410 each had a width of about 50 μm; a thickness of the metal electrodes was approximately 2 μm. Interelectrode spaces 7426 each had a width of about 50 μm. The resulting grid of interdigitated electrodes 7410 and interelectrode spaces 7426 covered an area on surface 7404 of approximately 5 cm×5 cm. A DC power source providing a voltage of 5 volts was attached to the anodes and cathodes. Kapton film 7402, containing electrodes 7410 and interelectrode spaces 7426, was covered with about 1 mm of water. As depicted in FIG. 67, water film 7460 covered kapton film 7402 and interdigitated electrodes 7410 and filled interelectrode spaces 7426. A voltage of 5 volts was applied, and then the system was cooled to −10° C. A current density of about 1 mA/cm² was measured in the water between selected anodes and cathodes. As long as the voltage was continuously applied, a liquid water layer 7462 directly adjacent to the electrodes 7410 did not freeze, while an upper ice layer 7464 of water film 7460 (designated by the hatching in FIG. 67) formed as a result of the freezing temperature. The unfrozen liquid water layer 7462 had a thickness estimated optically as 5 to 25 μm. The temperature of the substrate film 7402 and the ice 7464 above the electrodes 7410, as measured with the thin thermocouples, was maintained at −10° C. A simple calculation showed that the low electric power density of ≦0.5 mW/cm² could have warmed the liquid bulk of liquid water layer 7462 by only about 0.05° C. above ambient temperature by resistive heating. Power was turned "off", resulting in complete freezing of liquid water layer 7462. After freezing occurred, a voltage was applied to the electrodes again, but at a higher voltage in order to provide the same electric power as before freezing (the electrical conductivity of the ice is less than liquid water, so a higher voltage is required in the ice to provide the same power as in water). The application of the same electric power to the ice that had prevented freezing of water in liquid water layer 7462, however, did not cause melting of the layer of ice. This indicated that the voltage applied to the electrodes in the liquid water system prevented ice formation in accordance with the invention, but the same electric power was unable to melt ice through heating after the ice had formed. It should be noted that the thickness of 2 μm of the metal electrodes in Example 6 was larger than necessary to provide sufficient electric current through the liquid water layer.

Physical Mechanisms

It is believed that one or both of two different physical mechanisms explain the results of Examples 5-7, specifically, and the function of embodiments in accordance with the invention, generally.

According to the first prospective physical mechanism, an embodiment in accordance with the invention prevents formation of ice through localized resistive heating and melting of ice crystals during initial ice nucleation in supercooled water. Accordingly, in supercooled water between electrodes, a very thin layer of ice starts to grow in the bulk water of liquid water layer between electrodes, or as is more common, at the electrode, where water has a greater tendency to nucleate into ice crystals at the solid surface of the electrode. A current passing through the liquid water layer between electrodes also passes through the ice layer. Ice has an electrical resistivity that is from 2 to 4 orders of magnitude greater than the resistivity of water. See *Physics of Ice*, V. Petrenko and are R. Whitworth, Oxford University Press (1999). As a result, when even a thin layer of ice appears, most of the electrical power dissipates in the ice, rather than in the liquid water. When a layer of ice appears, the heat produced by electric current passing through the highly resistive ice melts the ice in its nucleation stage, even in a supercooled liquid water. Thus, electric current actually prevents ice nucleation. Calculations show, for example, that if liquid water is supercooled to −10° C., and if a layer of ice having a thickness of 10 μm forms, then a current having a current density of approximately 13 mA/cm² melts the ice. This is similar to the current density that prevented freezing and ice formation in Example 5. This mechanism succeeds in maintaining the liquid state of even supercooled water because it prevents development of ice seeds during nucleation. Ice cannot form without ice seeds. On the other hand, once ice has formed beyond the nucleation stage, it is not possible to melt the ice using the same level of power described here to prevent the ice. Also, to keep the water above its melting temperature by heating it requires much more power, that is, from 10 to 100 times more power than it does to prevent formation of ice by melting ice seeds in their nucleation stage.

Therefore, the term "prevention of ice" and similar related terms when used with reference to embodiments described using FIGS. 63-68 have a qualified meaning. In view of the foregoing discussion concerning heating and melting of ice seeds during ice nucleation, it is clear that relatively small amounts of ice crystals may form in a system and a method in accordance with the invention, before being heated and melting. Thus, the term "prevention of ice" means that the bulk of the liquid water in a liquid water layer in and around the interelectrode space does not freeze, and that a thin liquid water layer in the interelectrode space and in the regions immediately adjacent to the electrodes remains liquid. The term "prevention of ice" and related terms also include a broader meaning. They also refer to inhibiting the formation of significant ice deposits on a liquid water layer. Because it is very difficult for ice to collect and remain on a liquid water surface, a liquid water layer in accordance with the invention disposed on a solid surface, such as an airplane wing or a windshield, effectively prevents the growing and adhesion of solid ice on the surface. Similarly, the term "prevent freezing of liquid water" and related terms means that the liquid water layer remains substantially unfrozen, although minute volumes of water may freeze during initial nucleation before melting in accordance with the invention. In a system and method in accordance with the invention, ice may form in regions not included in the liquid water layer in and around the interelectrode space. For example, ice may form or be deposited on upper surface 7115 of second electrode 7114 of FIG. 63. Development of significant deposits of ice contiguous with the liquid water layer does not occur, however, because of insufficient adhesion strength between ice and the liquid water layer. The term "supercooled water" has its usual technical meaning of liquid water having a temperature lower than its freezing temperature. The term "liquid water layer" is used in a broad sense here. Its meaning includes a continuous volume of liquid water capable of electrically connecting two electrodes, in electrical contact with the electrode, and capable of carrying an electrical current. A "liquid water layer" may be any uninterrupted volume of water, that is, uninterrupted by non-water materials. Or, for example, a "liquid water layer" may comprise a plurality of water channels interspersed in a non-water material, for example, in a porous insulator layer, as described above. The liquid water layer is not necessarily confined to the boundaries of an interelectrode space. For example, in FIG. 63 a liquid water layer occupies the pore space of porous insulator 7112 and the pore space of porous second electrode 7114. In system 7400 depicted in FIG. 66, a liquid water layer covered the whole surface area containing interdigitated electrodes 7410 and interelectrode space 7426. The term "interelectrode distance" refers to the shortest distance between the first electrode and the second electrode of a system in accordance with the invention. Embodiments in accordance with the invention are described herein with reference mainly to electrode layers. In other embodiments in accordance with the invention, however, functional electrodes have non-layer shapes, such as, sphere-shaped or wire electrodes. Thus, the term "interelectrode space" refers generally to a region located between the first and second electrodes. For example, interelectrode space 7118 shown in the cross-sectional view of system 7100 in FIG. 63 is a layer-like region between electrode layers 7110 and 7114.

In a given system under given conditions, the extent of the liquid water layer, that is, the region of liquid water that is prevented from forming ice, is dependent on the amount of electric power applied. By increasing electric power, the volume of liquid water that does not freeze increases. In the first proposed mechanism, the flow of electrical current through the liquid water layer results in heating and melting of ice seeds in their nucleation phase before they grow appreciably. Operation according to this mechanism occurs when the current density reaches or exceeds a minimum level, as discussed above. Theoretically, the current may be generated from any source. For example, a capacitive AC generated in a high-frequency alternating electromagnetic field can provide sufficient current to prevent ice formation in accordance with the invention. Practically, however, in preferred embodiments, as described in detail in this specification, a liquid water layer provides electrical connection between two electrodes, and the electrical power source provides a voltage across the electrodes, which generates the electrical current. Either AC or DC current melts ice seeds in their nucleation stage in accordance with the invention. AC having a frequency greater than about 10-15 Hz is usually preferred in order to avoid electrolytic corrosion of electrodes.

According to the second prospective mechanism, applying a voltage to an electrode in the liquid water layer generates intrinsic water ions that depress the freezing point of water, thereby preventing ice formation.

When a low-frequency ("LF") AC voltage or a DC voltage is applied across two electrodes immersed in water, an increase in electrical conductivity of the water occurs and supercooled water remains liquid. These phenomena are fully reversible, and water regains its physical properties within about ten seconds after the voltage is shut "off". The maximum effects occur very close to the electrodes. It is believed that these phenomena are the result of the generation of intrinsic water ions in the bulk water resulting from migration of chemical reaction products formed at the electrode surfaces.

The generation of $H^+$ and $OH^-$ ions at the electrode interfaces may be represented according to the following reaction equations:

$$2H_2O + 2e^- \Leftrightarrow 2H. + 2OH^-, \qquad (14)$$

(at the cathode, or "negative" electrode) and $$2H_2O - 2e^- \Leftrightarrow O. + 2H^+, \qquad (15)$$

(at the anode, or "positive" electrode)

where O. and H. are atomic oxygen and hydrogen radicals. These reactions occurring at the electrodes are typical water electrolysis reactions. During electrolysis, atomic hydrogen atoms recombine at the cathode, forming bubbles of molecular $H_2$ gas. Similarly, atomic oxygen atoms recombine at the anode, forming bubbles of molecular $O_2$ gas during electrolysis. Another phenomenon occurs, however, which was not previously recognized in the art. Atomic oxygen and hydrogen radicals, O. and H., migrate naturally from regions of high concentration at the electrodes into the bulk of the water between electrodes. There, in the bulk water between electrodes, those atoms similarly recombine into molecules of oxygen and hydrogen. Each recombination event releases about five electron volts of energy, and that energy is sufficient to break several neighboring water molecules into $H^+$ and $OH^-$ ions. It is estimated that as many as 10 percent of the water molecules near the electrodes may dissociate into ions; this is equivalent to an $H^+$ or a $OH^-$ concentration of 3.08 moles per liter. When the electrodes are relatively far apart, as in typical electrolysis systems, the concentration of intrinsic water ions, $H^+$ and $OH^-$, remains insignificant. When the electrodes are close together, however, in accordance with the present invention, it is believed that the intrinsic water ion concentration is sufficient to depress the freezing point of the bulk water in a liquid water layer in the interelectrode space between electrodes.

A thermodynamic reason for the freezing point depression is that dissolution of the ions in such a highly polar liquid as water lowers the free energy of the water. These ions affect the free energy of ice to a much less degree, due to the fact that the microscopic dielectric constant of ice is just 3.2, while in water it equals about 87 (at 0° C.). Also, impurity ions are much less soluble in ice than in water. Thus, ions decrease the free energy of water, but leave that of ice almost unchanged. Because of this, the free energy of water remains less than that of ice down to lower temperatures, thus delaying the phase transition. It is believed that systems and methods in accordance with the invention could achieve freezing point depressions in water in a range of from 1° C. to a theoretical upper limit of 80° C. The extent of the freezing point depression is dependent on numerous factors, including among others: the initial, pre-voltage ion-content and conductivity of the water; the interelectrode distance; the magnitude of the applied voltage; the frequency of the applied voltage; and the composition of the electrodes. The term "electrode" is used in a broad sense in this specification. The term "electrode" refers to an electrical conductor at the surface of which a change occurs from conduction by electrons to conduction by ions or colloidal ions. The term "voltage" is used in a broad sense. The term voltage may refer to the voltage of a circuit not effectively grounded, so that it means the highest nominal voltage available between any two conductors of an electrical circuit. It may also refer to the voltage of a constant current circuit, for which it means the highest normal full-load voltage of the current. It may refer to the voltage of an effectively grounded circuit, that is, the highest nominal voltage available between any conductor of the circuit and ground, unless otherwise indicated. The term "voltage" may also mean the effective (rms) potential difference between any two conductors or between a conductor and ground.

Example 8

Figure 68:
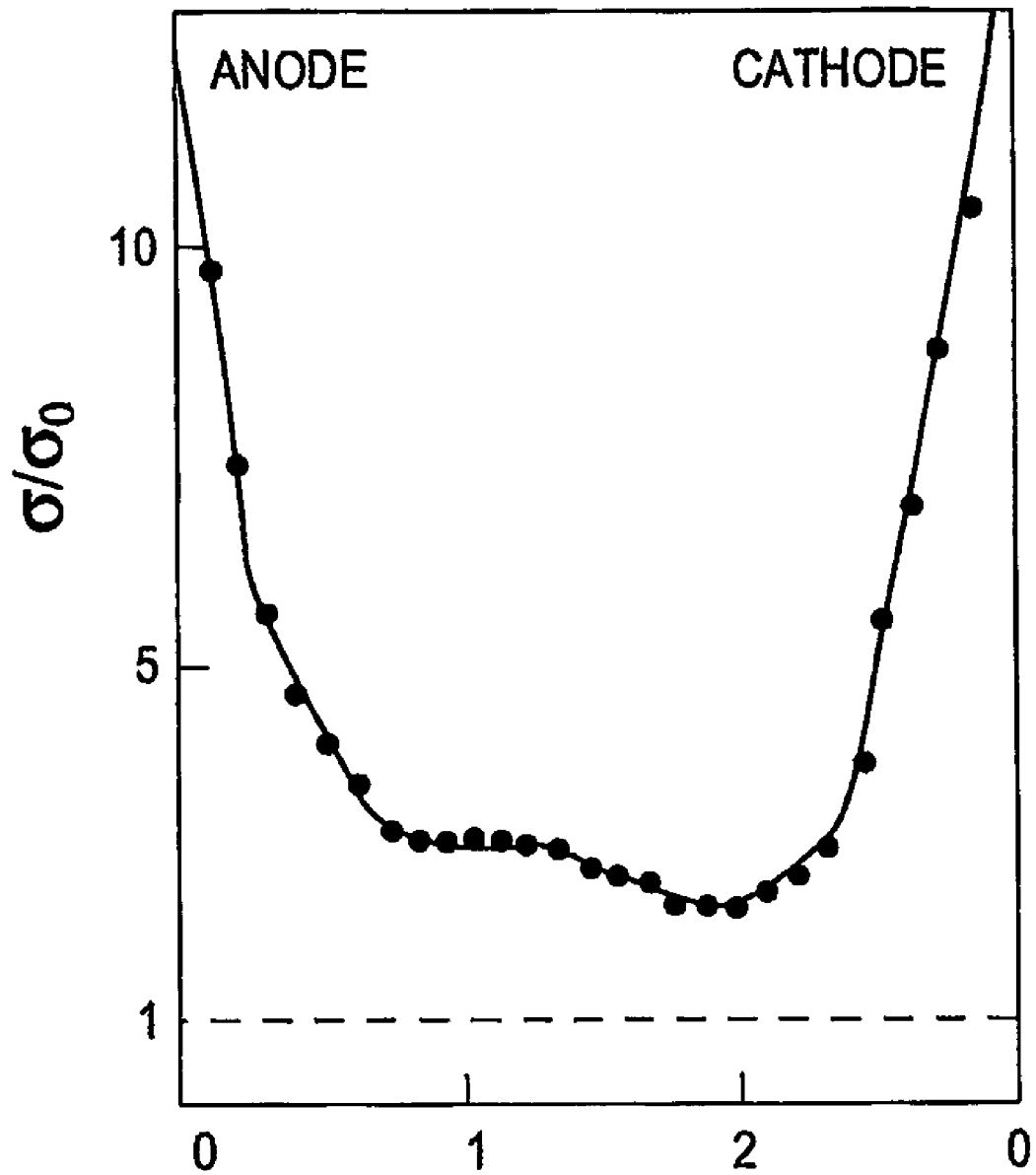
FIG. 68 is a graph in which relative electrical conductivity is plotted as a function of location between electrodes, spaced approximately 3 mm apart.

The relative conductivity was measured in distilled water disposed between two platinum electrodes. A DC potential of 5V was applied across the electrodes. The temperature of the system was 20° C. AC conductivity, a, of the water between the electrodes was measured at a frequency of 1 kHz. The initial conductivity of the distilled water before application of the DC voltage was $\sigma_0=10^{-3}$ S/m. In the graph of FIG. 68, relative conductivity, $\sigma/\sigma_0$, is plotted as a function of location between the electrodes, which were spaced approximately 3 mm apart. The data points plotted in FIG. 68 show that at a distance of about 400 μm from either the cathode or the anode, the relative conductivity had a value of about 5. At a distance of about 100 μm from either the anode or cathode, the relative conductivity was about 10. This increase in conductivity is a result of the increase in intrinsic ion concentration of $H^+$ and $OH^-$ ions generated in the interelectrode space between the electrodes.

Theoretically, even a single electrode having a voltage and being in contact with a liquid water layer can generate either atomic oxygen or hydrogen radicals, which can recombine in the bulk water to form intrinsic water ions. Practically, however, in preferred embodiments in accordance with the invention, a liquid water layer provides electrical connection between two electrodes, and an electrical power source provides a voltage across the electrodes, so that atomic radicals are generated at both electrodes. Furthermore, the voltage across the electrodes generates an electric current that passes through the liquid water layer, preventing ice formation according to the first proposed mechanism. Therefore, the terms "voltage" and "current" are used somewhat interchangeably here. An advantage of certain systems and methods in accordance with the invention is the ability to use relatively low amounts of electric power to prevent freezing in a liquid water layer and thereby prevent ice formation. Another advantage is the ability to use AC voltage. In contrast, electrolysis only works with DC voltage or AC voltage having a very low frequency not exceeding 10-15 Hz to produce hydrogen and oxygen gas bubbles that decrease ice adhesion. In systems utilizing electrolysis to form gas bubbles, DC voltage or very low frequency AC voltage is utilized to provide a high concentration of hydrogen radicals, at the cathode, and oxygen radicals, at the anode, that recombine to form bubbles of molecular gas. At frequencies greater than 10-15 Hz, there may be insufficient accumulation of molecular hydrogen and molecular oxygen at the electrodes to initiate nucleation of gas bubbles on the electrodes. In systems and methods in accordance with the invention, the polarity of each of the two electrodes alternates between plus and minus with the frequency of the AC power source. At frequencies in excess of 10-15 Hz, the continuous switching between production of atomic hydrogen radicals and atomic oxygen radicals, therefore, may not allow accumulation of either hydrogen or oxygen sufficient for nucleation of gaseous $H_2$ or $O_2$ bubbles. The atomic oxygen and hydrogen radicals, O. and H., that are produced alternately at the electrodes do, however, migrate from the electrodes into the bulk water, where they recombine, releasing energy and thereby produce additional $H^+$ and $OH^-$ ions. When the electrodes are relatively close together, it is believed that the resulting concentration of $H^+$ and $OH^-$ ions produced at the electrodes and by the recombination events in the bulk water depresses the freezing point of the water.

The first electrode and second electrode layers may comprise any conductive metal at which the reactions represented by Equations (14) and (15) occur. In platinum-plated electrodes, platinum functions as a catalyst for the reactions represented by Equations (14) and (15).

In certain embodiments in accordance with the invention, an AC power source is utilized. The frequency of the AC power source may be selected from range of from zero through the MHz range, with practically no upper limit. In other words, in the lower end of the range, virtually DC voltage may be applied across the electrodes. An advantage of using AC voltage is that it is often more readily available and it inhibits corrosion, as mentioned above. Preferably, an AC power source generates an AC having a frequency in a range of from 15 Hz to 1 kHz. The preferred lower limit of 15 Hz is the frequency at which the amounts of electrolysis gases collecting at the electrodes become insignificant. As a result, the tendency of electrodes to corrode decreases significantly above 15 Hz. The preferred upper limit of approximately 1 kHz is determined by the time period required for so-called Helmholtz double-layers to form on each electrode and in the corresponding adjacent layer of water surrounding an electrode. A Helmholtz double layer is essentially a surface charge at each surface of the electrode-water interface necessary for the reactions of Equation (14) and Equation (15) to occur at the negative and positive electrodes, respectively. As frequency exceeds 1 kHz, there is essentially not enough time for Helmholtz layers to form, and the reactions of Equations (14) and (15) do not occur sufficiently to achieve substantial increases in intrinsic water ion concentration to effect freezing point depression.

Systems and methods in accordance with the invention are useful in a wide variety of circumstances and applications to prevent freezing of a liquid water layer and thereby prevent ice formation on the solid surface. Examples of surfaces that may be protected in accordance with the invention include, nonexclusively: airplane wings and helicopter blades; windshields and windows of planes, automobiles, and trains; and heat exchanger coils.

Certain embodiments in accordance with the invention increase friction between ice and a solid surface by applying an electric field at the ice-solid contact interface. Preferred embodiments are described herein with reference to FIGS. 69-81. It should be understood that the structures and systems depicted in schematic form in FIGS. 69-81 are used to explain the invention and are not precise depictions of actual structures and systems in accordance with the invention. Furthermore, the embodiments described herein are exemplary and are not intended to limit the scope of the invention, which is defined in the claims below.

When an electric field exists at the contact interface between an ice surface and the surface of the solid, friction between the ice and the solid surface is increased relative to the friction in the absence of an electric field. This can be largely explained as a result of the well-known physical phenomenon that an electric field attracts a dielectric object. In the absence of an electric field, the region of the contact interface between a solid surface and an ice surface contains many air gaps or voids. Indeed, the area of actual contact between the surface of the solid object and the ice in the absence of an electric field may be less than one percent. Generally, ice has a high relative dielectric constant Air has a low dielectric constant A strong electric field in the region of the ice-solid interface attracts high-dielectric ice into the gaps. Thus, the high electric field may be viewed as causing rapid growth of tiny ice bridges connecting the solid surface and the ice. The resulting increased area of actual ice-solid contact causes an increase in friction between the solid and the ice. Actual physical mechanisms known to provide rapid mass transport that fills the air gaps are: water flow in a liquid-like layer on the ice surface; and water vapor diffusion. The electric field may be either a DC electric field or a low-frequency AC field. When the ice is subjected to AC or to an AC electric field having a frequency not exceeding about 1000 Hz, or 1 kHz, the "relative dielectric constant" ("∈" or simply "dielectric constant") is typically about 100 or greater, depending significantly on ice purity and temperature. When the AC frequency exceeds 1000 Hz, however, the dielectric constant decreases significantly. For example, the relative dielectric constant of ice at a frequency of 10 kHz is only about 10 or less, and at 100 kHz, it has a value of about 3. The dielectric constant of ice in a DC field or current is high, as with low-frequency AC. Nevertheless, DC current flowing between electrodes through ice at the contact interface causes electrolysis reactions. Hydrogen and oxygen gas bubbles that form as a result of electrolysis at the contact interface decrease the area of actual ice-solid contact, and thereby decrease friction between the solid and the ice. The formation of gas bubbles by electrolysis also occurs at very low AC frequencies up to about 5-10 Hz. At frequencies in excess of 5-10 Hz, the cycle time of alternating polarities of the electrodes is too short for nucleation of hydrogen and oxygen gas bubbles at each electrode to occur. Thus, an AC electric field having a frequency greater than about 5-10 Hz is preferred over a DC electric field. For these reasons, embodiments in accordance with the invention typically include an AC electric field at the contact interface having a frequency not exceeding 500 Hz, and most preferably in a range of about 5 to 100 Hz.

The term "contact interface" is used herein to denote the region in which the surface of the solid object and the surface of ice are adjacent and contiguous to each other. It is understood that the contact interface typically includes air gaps and voids and perhaps areas occupied by a liquid-like water layer, as well as areas of actual physical contact between the solid and the ice.

It is believed that electrostatic pressure is a second physical phenomenon that contributes to the friction between a solid surface and ice in the presence of an electric field. An electric field, E, at the interface between ice and the surface of a solid object may reach a significant magnitude and provide additional electrostatic pressure, $P_{el}$, normal to the surface of the solid. The additional pressure normal to the solid surface increases friction. The increase in electrostatic pressure between a solid surface and ice produced by an electric field, E, at the solid-ice contact interface is expressed by the following equation:

$$P_{el} = \epsilon_o E^2 = \epsilon_o (V/d)^2 \quad (16)$$

where $\epsilon_o$ is a dielectric constant of free space, V is the potential difference between electrodes proximate to the contact interface, and d is the distance between electrodes. Because the friction force is proportional to the normal force of the electrostatic pressure, $P_{el}$, friction increases with $P_{el}$. Generally, in systems and methods in accordance with the invention, a pair of electrodes is located in the solid object, and the electrodes are separated by a small interelectrode spacing having high resistance. By providing high electrical resistance in the small interelectrode spacing, d', and by maintaining low resistances throughout the remainder of the circuit, the potential difference, V', across the interelectrode spacing, d', between the electrodes is maximized. As a result, the strength of the electric field, V'/d', is maximized for a given applied voltage.

Fundamentally, an electric field is generated at the contact interface by providing a voltage difference between closely spaced electrodes proximate to the contact interface. The relative locations of electrodes having opposite polarities is not important The important factor is strength of the electric field at the ice-solid interface. For example, it is not important whether two electrodes are located within the solid object at or proximate to the contact interface, or whether one electrode is located in the solid object, and the other electrode is located in an ice layer or beneath an ice layer. The solid object may be any object, for example, tires, tracked vehicle treads, train wheels, the sole of a shoe, parts of sports equipment. If a plurality of electrodes having different polarities is located in the solid object, then the solid object must include electrical insulation between electrodes so that a potential difference exists to generate an electric field.

Figure 69:
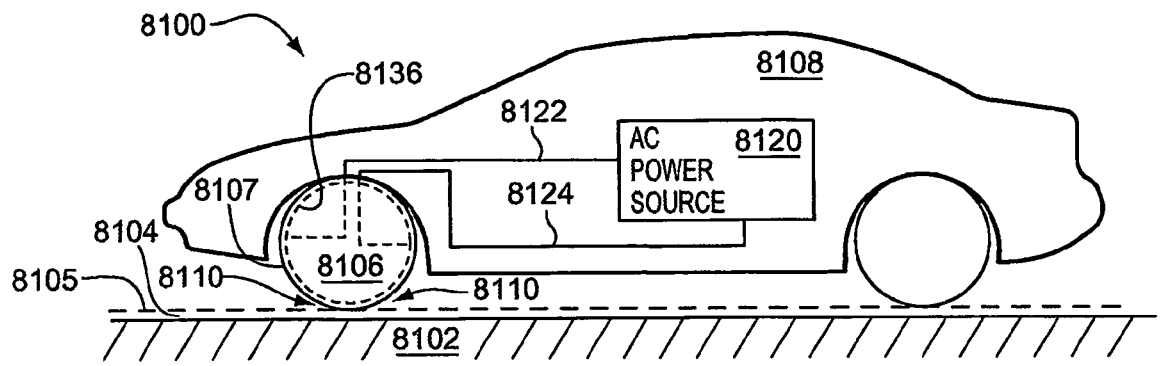
FIG. 69 depicts a system in accordance with the invention in which an AC power source generates an electric field at the contact interface between an automobile tire and a layer of ice.

In a typical embodiment, the electrodes are separated by an interelectrode spacing of the order of 1-10 mm, or even several cm, and a power source provides an AC potential of about 500-2000 volts. If a DC power source is used to make a DC electric field, then a higher voltage is required (e.g., 2 kV). In an automobile tire, for example, the electrodes may be strips of conductive rubber embedded in the rubber tire. In more preferred embodiments, electrodes of the AC power source are located very close to each other. As distance separating electrodes is decreased, voltage required also decreases. For example, if the electrodes are within 100 μm of each other, the required voltage is only 5 to 100 volts. The electrodes in the solid object should have an electrical conductivity greater than $10^{-10}$ S/cm. For example, in an exemplary embodiment in accordance with the invention, a rubber automobile tire comprises electrically conductive portions and electrically nonconductive portions. The electrically conductive portions function as the electrodes. The electrically nonconductive portions include the insulating interelectrode spacing between the electrodes. The solid object may contain dopants to increase electrical conductivity in the solid object FIG. 69 depicts a system 8100 in accordance with the invention. FIG. 69 shows a road surface 8102 covered by an ice layer 8104, which has a top ice surface 8105. Automobile tire 8106 of automobile 8108 is disposed on ice layer 8104. Tire 8106 has an outer, cylindrical tire surface 8107. At any given moment, tire surface 8107 and ice surface 8105 form a contact interface 8110 at the region where tire 8106 rests on ice layer 8104. System 8100 further comprises a power source 8120 located in automobile 8108. Power source 8120 is preferably an AC power source. Alternatively, power source 8120 is a DC power source. Two terminals of power source 8120 are electrically connected to automobile tire 8106 by power wires 8122, 8124. In accordance with the invention, tire 8106 contains a plurality of alternately disposed, oppositely polarized electrodes 8136. Power source 8120 provides a potential difference between adjacent electrodes, thereby generating an electric field at contact interface 8110.

It is understood that electrodes in a solid object in accordance with the invention may possess the characteristic of "electrical conductivity" in many various ways. For example, tire 8106 comprises electrically conductive rubber portions fabricated by including conductive dopants in the conductive rubber portions. Carbon black is an example of a conductive dopant. Power wires 8122, 8124 are connected to at least one electrode each. Preferably, power wires 8122, 8124 are each connected to a plurality of electrodes, the electrodes being arranged alternately so that an electrode having one polarity at a given moment is adjacent to one or more electrodes having the opposite polarity. Preferably, the electrodes in tire 8106 are located close to or at tire surface 8107 and are closely spaced to each other so that they generate a strong electric field at contact interface 8110. Power wires 8122, 8124 are assembled in system 8100 to be non-interfering with wheel rotation of tire 8106. For example, power wires 8122, 8124 may connect power source 8120 with electrodes 8136 by passing through a wheel axle.

Figure 70:
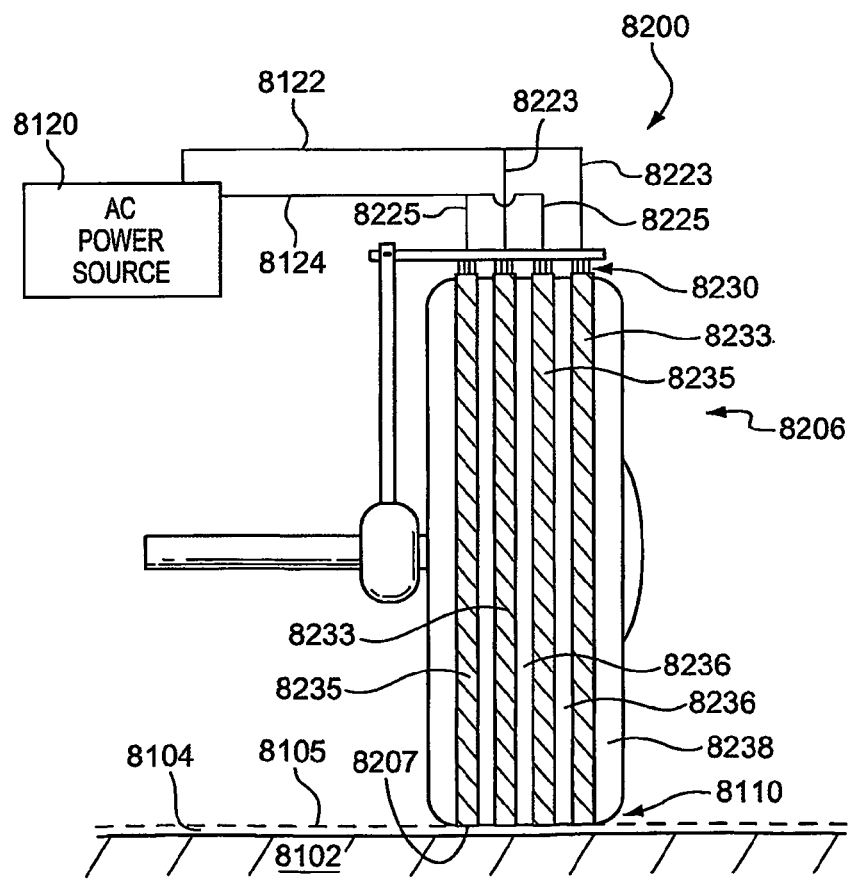
FIG. 70 depicts a portion of a system in which an automobile tire comprises a plurality of electrodes located on its outside surface that are electrically connected to the terminals of an AC power source.

An alternative embodiment 8200 is depicted schematically in FIG. 70. An automobile tire 8206 in accordance with the invention forms contact interface 8110 with ice surface 8105 of ice layer 8104. Power wires 8122, 8124 electrically connect AC power source 8120 via power leads 8223, 8225, respectively, to a series of flexible fiber electrodes 8230. Flexible fiber electrodes 8230 are, in turn, in electrical contact with a series of tire electrodes 8233, 8235. As depicted in FIG. 70, the plurality of tire electrodes 8233 in contact with power leads 8223 via flexible electrodes 8230 are arranged alternately with tire electrodes 8235, which are electrically connected to power leads 8225 via flexible electrodes 8230. A total of only four tire electrodes 8233, 8235 are depicted in FIG. 70. It is understood, however, that a higher number of closely-spaced tire electrodes 8233, 8235 and correspondingly higher number of flexible fiber electrodes 8230 and power leads 8223, 8225 are usually desirable. Electrodes 8233, 8235 are separated from each other by an interelectrode spacing 8236, comprising electrically insulating material. Tire 8206, or other solid object, usually also comprises nonconductive regions 8238, which include interelectrode spacings 8236 and other portions of the solid object not occupied by electrodes 8233, 8235. A tire 8206 in accordance with the invention typically comprises from 10 to 100 tire electrodes spaced from 1 mm to 1 cm apart in the form of thin metal wire strips embedded in rubber in a range of from 0 to 1 cm from outside tire surface 8207. Alternatively, electrodes 8233, 8235 may be rings of electrically conductive rubber located proximate to outside tire surface 8207. Clearly, the electrodes in a solid object in accordance with the invention may comprise any of a variety of shapes and compositions. Embodiments in accordance with the invention may comprise a plurality of conductive solid objects. For example, an automobile typically comprises at least two tires, such as tires 8106, 8206, and preferably four tires, in a system for selectively increasing ice friction.

Figure 71:
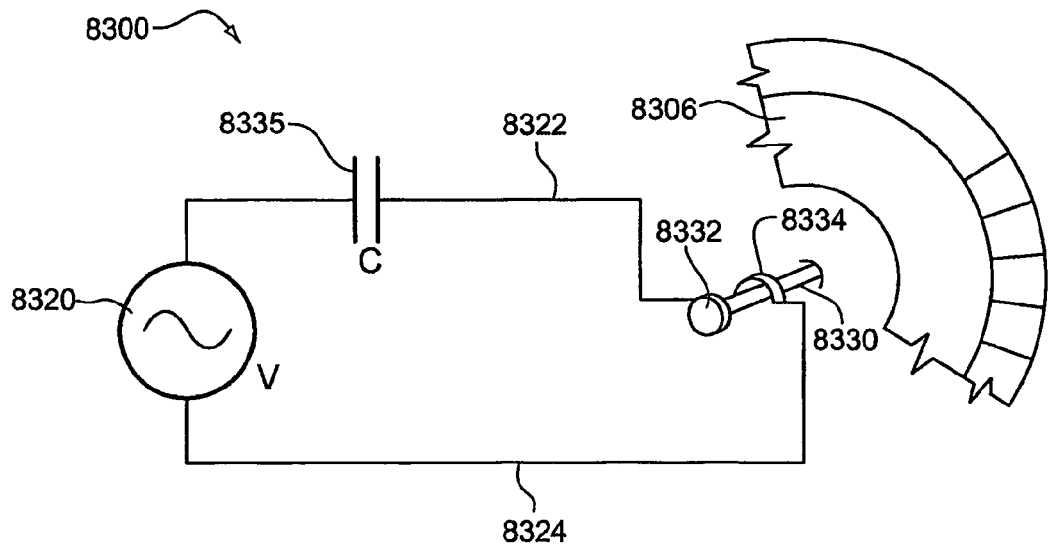
FIG. 71 shows a circuit diagram of a system containing a capacitor to reduce current flow.

Operating voltages in certain embodiments are sufficiently high to cause physical discomfort or injury to persons in electrical contact with the power source. Furthermore, knowledge of potential physical injury may cause concern among manufacturers and users of the invention. Two variations of embodiments in accordance with the invention reduce or eliminate the risk of physical injury and the anxiety arising from potential exposure to electrical shock. A first variation includes an additional impedance between the AC power source of and the electrodes to limit AC at the electrodes. Typically, a capacitor is located in series between the electrodes and the AC power source. FIG. 71 depicts in schematic form a system 8300 including a rubber tire 8306 containing electrodes (not shown). The electrodes are electrically connected to AC power source 8320 through axle 8330, slip-rings 8332, 8334, and power wires 8322, 8324. Slip-rings 8332, 8334 are located on axle 8330. Capacitor 8335 is disposed along power line 8322 in series between power source 8320 and electrodes in tire 8306. Capacitor 8335 limits the current flowing through the electrical circuit of system 8300. Since the electrical conductivity of a human hand or other conductor in a potentially harmful circuit is considerably higher than the electrical conductivity of the capacitor, most of the voltage drop occurs across the capacitor. A safe current for a human is about 5 milliamps ("mA"). The current in an AC circuit, such as system 8300, is generally expressed by the equation $$I = V/Z = V \times (2\pi f C), \qquad (17)$$

where I represents current, V represents voltage, Z is impedance, f is frequency and C represents capacitance. Thus, for known values of f and V, the capacitance of capacitor 8335 is selected using the formula $$C < (5 \text{ mA})/(2\pi f V) \qquad (18)$$

Figure 72:
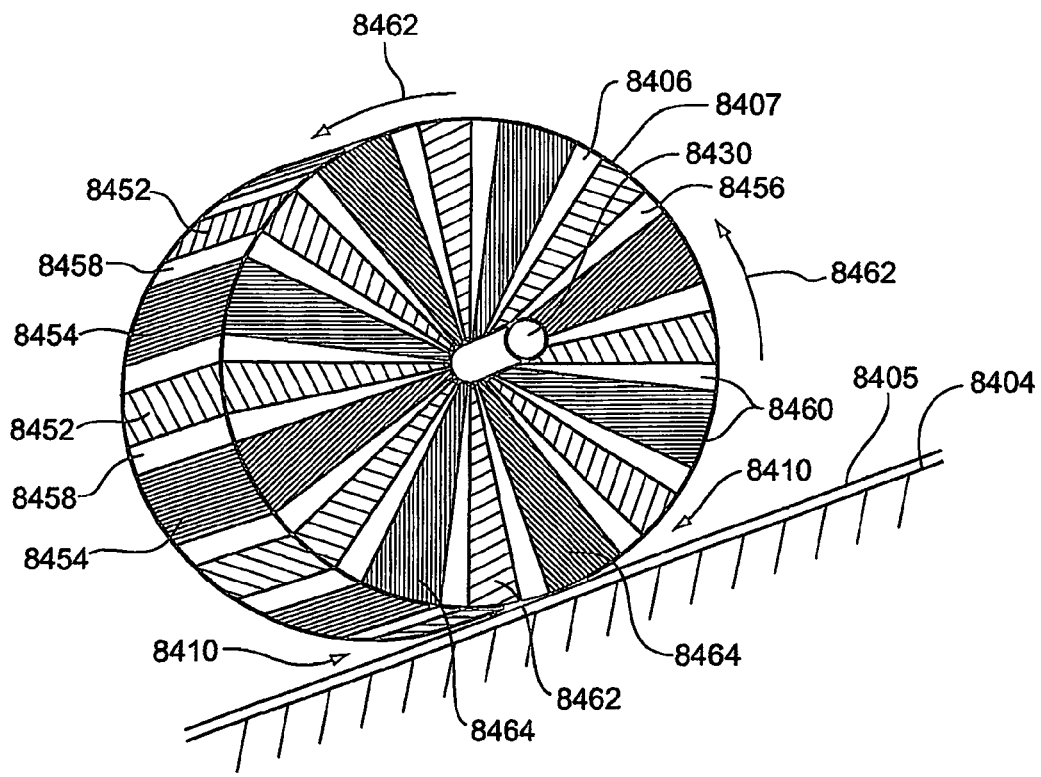
FIG. 72 shows a diagram of a tire in which conductive electrode portions at the contact interface are connected to power supply, while other portions are not connected.

As a result, very little current flows through a human hand or other conductor in contact with electrodes. A second variation includes a method and an apparatus in which voltage is applied only proximate to the ice-solid contact interface, which is least likely to come into electrical contact with the person. FIG. 72 shows in schematic form a preferred embodiment of a tire 8406 as utilized in a preferred embodiment of system 8300 of FIG. 71. Tire 8406 has a cylindrical outer surface 8407 and it is disposed on the ice layer 8404, which has an ice surface 8405. A plurality of conductive portions 8451, 8452 in tire 8406 function as electrodes. Electrodes portions 8451, 8452 are alternately connected to power lines 8322, 8324, respectively, (see FIG. 71) so that the polarity of an electrode is oppositely disposed to the polarity of electrodes adjacent to it Electrodes portions 8452, 8454 are separated by nonconductive portions 8456, which provide an interelectrode spacing 8458 between electrodes 8452, 8454 at cylindrical surface 8407. At any given moment, as tire 8406 rotates on axle 8430, tire surface 8407 and ice surface 8405 form a contact interface 8410 at the region where tire 8406 rests on the ice layer. 8404. At any given time, only several electrodes 8462, 8464 of the total number of electrodes 8452, 8454 are present at or near contact interface 8410. In a preferred embodiment in accordance with the invention, only electrodes 8462, 8464 located proximate to contact interface 8410 are electrically connected to power source 8320. The remaining electrodes 8452, 8454 that are not proximate to contact interface 8410 at any given time are not electrically connected to power source 8320. As a result, there is virtually no electrical voltage or electrical current present at the surface of the tire except that contact interface 8410. Tire 8406, or other solid object containing electrodes in accordance with the invention, may be designed in various ways. Tire 8406 may include electrical insulation covering its outside surfaces, except for the surface 8407 that comes in contact with the ice to form contact interface 8410. For example, conductive rubber portions that function as electrodes 8452, 8454 may be wedge portions that extend from the axis region of the tire at axle 8430 through the interior of the tire, reaching the exterior of the tire only at surface 8407. One of various techniques is used to accomplish selective "on-off" switching between power source 8320 and electrodes 8452, 8454 so that only electrodes 8462, 8464 at contact interface 8410 are in electrical contact with power source 8320 at any given time. Conventional slip-ring devices, such as slip rings 8332, 8334 depicted in FIG. 71, may be used in a switching mechanism to connect selectively electrodes 8462, 8464 to power source 8320 when the electrodes are proximate to or approaching contact interface 8410, and to disconnect the electrodes as they rotate away from contact interface 8410.

Application of voltage only to conductive regions in the vicinity of the contact interface has a further advantage. As the voltage is turned "off" to regions 8460 as they rotate in the direction of arrows 8462 away from the contact interface, the adhesion strength between the ice and the surface of the solid decreases in regions 8460. As a result, snow is more easily removed from the surface of the solid. For example, any snow that accumulates on surface 8407 of tire 8406 when it is in contact with a snow-covered road is more easily spun off by the action of centrifugal forces as the tire rotates.

It is understood that many different compositions of material, physical structures and devices, and fabrication methods may be used in accordance with the invention to provide electrodes and electrical connection between electrodes and the power source.

Related co-pending U.S. patent application Ser. No. 09/426,685 disclosed application of a high-frequency AC of 1 kHz to 1000 kHz and one to several kilovolts to a conductive automobile tire to generate a potential difference between the tire and electrical ground. Such systems rely on a high-frequency high-voltage AC to generate a capacitive electric field at the ice interface. In contrast, in embodiments in accordance with the current invention, terminals of a power source are connected to a plurality of closely-spaced conductive or semiconductive electrodes in the solid object at or proximate to the solid-ice contact interface. As a result, a very strong electric field is generated at the interface. Preferably, the power source provides AC having a relatively low-frequency, for example, 60 Hz.

In some embodiments, the electrodes are "interdigitated". The term "interdigitated" means that a plurality of "fingers" of a first electrode are disposed alternately with a plurality of "fingers" of a second electrode. Typically, a first electrode stem is disposed proximate to a surface and parallel with a second electrode stem, proximate to the same surface. The first electrode stem is connected to one terminal of a power source, and the second electrode stem is connected to a second terminal of a power source, so that the first electrode stem in the second electrode stem have opposite polarities. A series of "fingers" of the first electrode extend in a substantially normal direction from the first electrode stem forwards the second electrode stem, without touching the second electrode stem. Similarly, a series of "fingers" of the second electrode extend in a substantially normal direction from the second electrode stem forwards the first electrode stem, without touching the first electrode stem. The fingers of the respective stems are spaced so that the fingers of the first electrode stem are adjacent to and substantially parallel with fingers of the second electrode stem. As a result of the alternating arrangement, an electrode having one polarity at a given moment is adjacent to one or more electrodes having the opposite polarity.

Example 9

Figure 73:
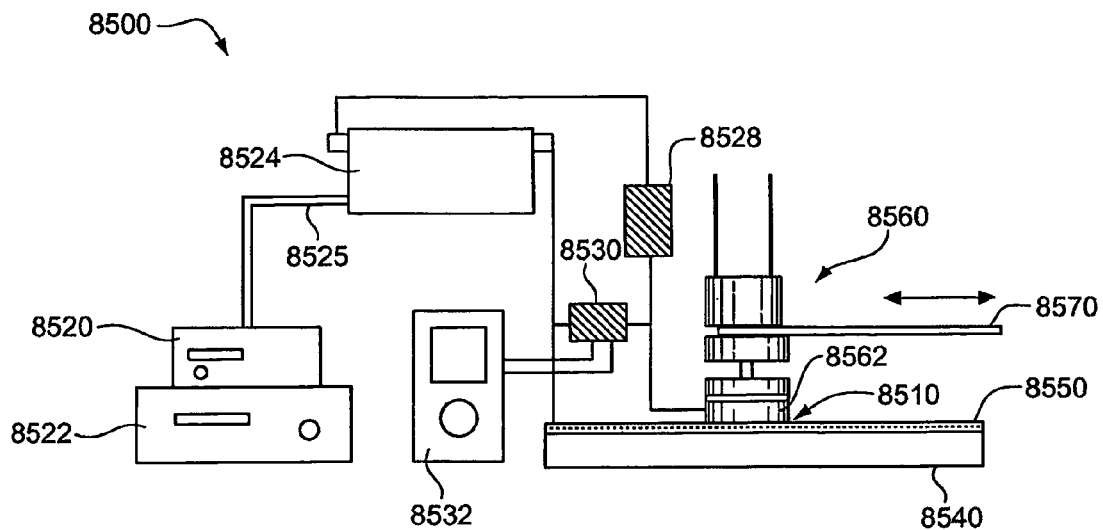
FIG. 73 depicts in schematic form an apparatus for measuring friction force generated in accordance with the invention.

Friction measurements were performed using an apparatus 8500, as depicted in FIG. 73. An AC voltage having a frequency of from 5 Hz to 500 Hz was applied to an ice-solid metal contact interface 8510 using an AC power supply system with a signal generator. The signal generator 8520 sent a sinusoidal wave to a high power audio amplifier 8522, which multiplied the current. This high current was needed to work a high voltage transformer 8524. The transformer was capable of multiplying the input voltage 8525 by a factor of about 100 in a frequency range of from 5 Hz to 1.5 kHz. This made it possible to generate voltages up to 500 V. Because of the safety circuit 8528, which limited the current in the system, only a fraction of the voltage was applied at the ice-metal interface 8510. Therefore, the voltage was measured directly at the interface using voltage measurement circuit 8530, having a voltage divider made of 100 kΩ and 100 MΩ resistors, together with a digital multi-meter 8532.

Ice samples were prepared using distilled water or a mixture of tap water and distilled water. The electrical resistivity of mixed water samples was $6 \times 10^4$ Ωcm. Each water sample was frozen on a stainless steel plate 8540 (12 cm×18 cm) in a cold room at −10° C. to form ice layer 8550. Ice layers 8550 contained polycrystalline ice and had a thickness of 3.7 mm. The surface of each ice layer 8550 was carefully prepared with a microtome to insure a very smooth surface. Sandpaper (No. 1500) was used in a few cases to refresh the ice surface after sliding. A slider 8560 included a stainless steel disk 8562 having a diameter of 40 mm at the ice-metal contact interface 8510. Slider 8560 comprised stainless steel contact disc 8562 and a load disc separated by an electric insulator (Teflon) to apply a high-voltage at ice-slider contact interface 8510 safely. The weight of slider 8560 was 191 g, and the normal force applied to the ice surface was 1.87 N for all the tests. Slider 8560 was pulled by an XY-plotter arm 8570 at a constant speed of 5 mm/s. The frictional force was measured by a small load cell (Kulite Semiconductor Products, Inc., model BG-1000GM), which uses a piezo-resistive gauge with a sensitivity of 2.48 g/mV. The measured force was recorded by a computer through an A/D converter. The acquisition frequency was 1 kHz and the resolution was 12 bits. The resolution of the force was generally about 5.9 mN.

The cold room temperature was regulated at temperatures of −5° C., −10° C. and −20° C., alternatively. The applied voltage across the ice-metal slider interface ranged from 100 V to 550 V. Variations in the surface quality of the ice, e.g. smoothness, caused the voltage to change with the slider position, and this variation was uncontrollable.

Table 1 shows representative measurements to show fluctuation of applied voltage measured at the contact interface. Table 1 also shows the average force or friction and the maximum friction force for various values of frequency and temperature. In Table 1, "F" denotes frequency; "V" denotes applied voltage, in units of volts; "I" is current, in units of microamps; "$F_{ave}$" denotes the average friction force in the presence of the applied electric field; and "$F_{max}$" denotes the maximum friction force in the presence of the electric field. The superscript "*1" of single value entries in the voltage column indicates that the fluctuation of the voltage was less than 20 V.

TABLE 1

Operating conditions and results.

| F (Hz) | V (volts) | I (µA) | $F_{ave}$ (N) | $F_{max}$ (N) |
|---|---|---|---|---|
| −5° C. | | | | |
| 5 | 220*1 | 40 | 0.85 | 3.1 |
| 10 | 300-360 | 65 | 1.1 | 3.5 |
| 20 | 250-380 | 90 | 0.95 | 2.9 |
| 50 | 350-420 | 180 | 0.80 | 2.9 |
| 100 | 360-410 | 360 | 0.96 | 3.4 |
| 200 | 250-420 | 400 | 0.86 | 3.1 |
| 300 | 380-470 | 670 | 0.74 | 4.0 |
| 400 | 400-500 | 600 | 0.44 | 1.7 |
| 500 | 350-450 | 580 | 0.36 | 1.7 |
| −10° C. | | | | |
| 5 | 100-140 | 30 | 0.98 | 3.8 |
| 10 | 360*1 | 80 | 1.6 | 8.2 |
| 20 | 250-420 | 100 | 1.4 | 5.6 |
| 50 | 370*1 | 170 | 1.4 | 8.3 |
| 100 | 360*1 | 320 | 1.6 | 6.9 |
| 200 | 360*1 | 660 | 1.2 | 5.8 |

TABLE 1-continued

Operating conditions and results.

| F (Hz) | V (volts) | I (µA) | $F_{ave}$ (N) | $F_{max}$ (N) |
|---|---|---|---|---|
| 300 | 250-450 | 650 | 0.46 | 0.6 |
| 400 | 280-550 | 780 | 0.50 | 0.77 |

Example 10

Electrical properties of ice were measured at the ice-metal contact interface. The dielectric constant and the conductivity of ice were measured in a frequency range of from 5 Hz to 100 kHz at temperatures of −5° C. and −10° C.

Figure 74:
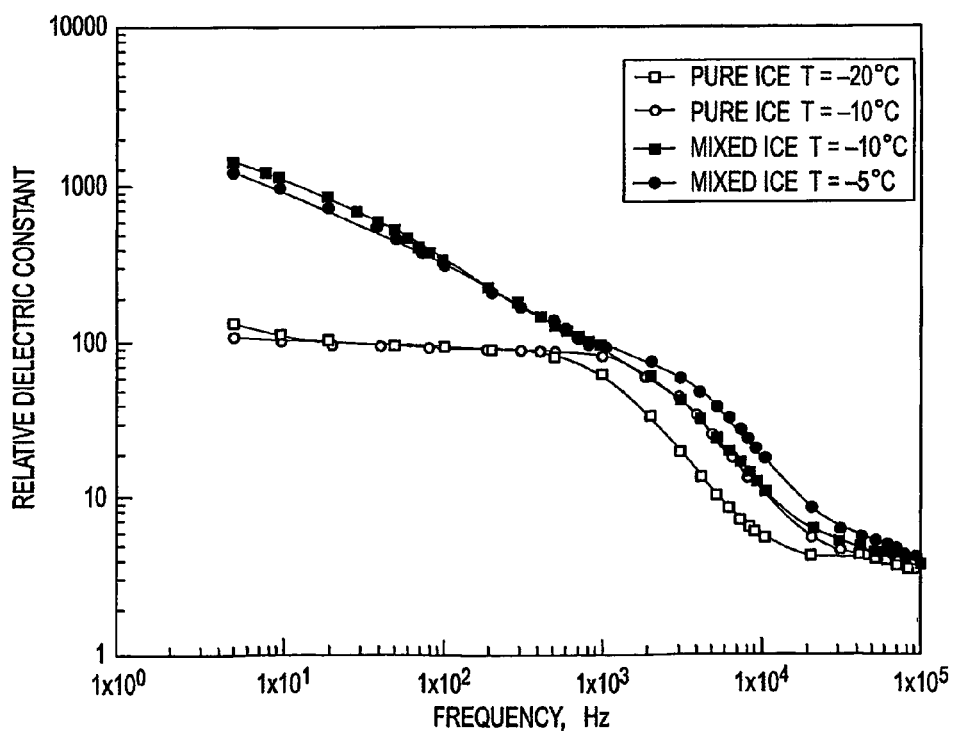
FIG. 74 shows a graph in which the relative dielectric constant of ice is plotted as a function of AC frequency.
Figure 75:
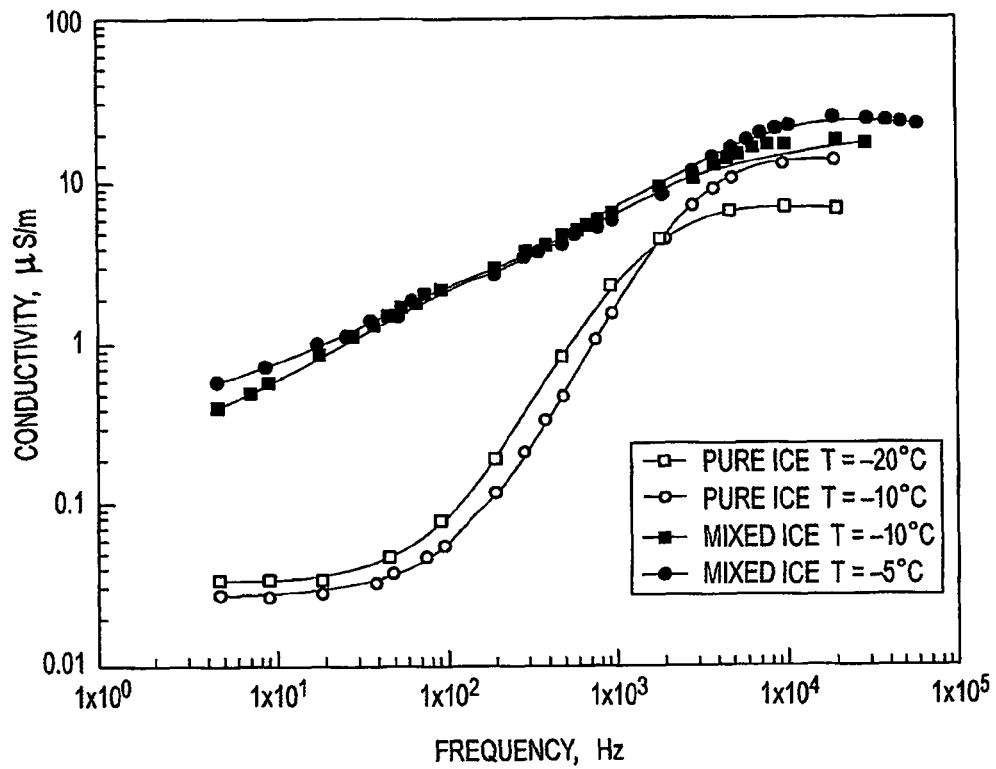
FIG. 75 shows a graph in which the conductivity of ice is plotted as a function of AC frequency.

Two disk electrodes made of brass with a diameter of 40 mm were arranged with an interelectrode spacing of 2.39 mm between them. The water mixture was disposed in the interelectrode spacing and frozen to form an ice layer. An impedance analyzer (Hewlett Packard 4192A) was used to measure the capacitance and the conductance of this thin layer of ice over a range of frequencies at both −5° C. and −10° C. Similarly, the layer of ice was made from pure water and capacitance and conductance was measured at both −10° C. and −20° C. The results of the measurements are shown in the graph of FIG. 74, in which the relative dielectric constant of ice is plotted as a function of frequency. As is well known in the art, the relative dielectric constant of the pure ice was about 100 at frequencies in a range of from 5 Hz to 1 kHz. The relative dielectric constant of the mixed ice was about 1000 at about 10 Hz. The apparent dielectric constant decreased with increasing frequency, and it was approximately equal to the dielectric constant of pure ice at 1 kHz. At a frequency higher than 2 kHz, the dielectric constants of pure and mixed ice were approximately the same. In the graph of FIG. 75, conductivity of the ice samples, in units of µS/m, are plotted as a function of frequency. The mixed ice sample had conductivity more than one order of magnitude greater than that of pure ice. As the frequency increased from 5 Hz to 1 kHz, conductivity increased from 0.5 µS/m to 10 µS/m. The difference between the conductivity of the pure ice and the mixed ice decreased as the frequency increased, but even at 10 kHz, the conductivity of the mixed ice was slightly higher than that of pure ice.

Figure 76:
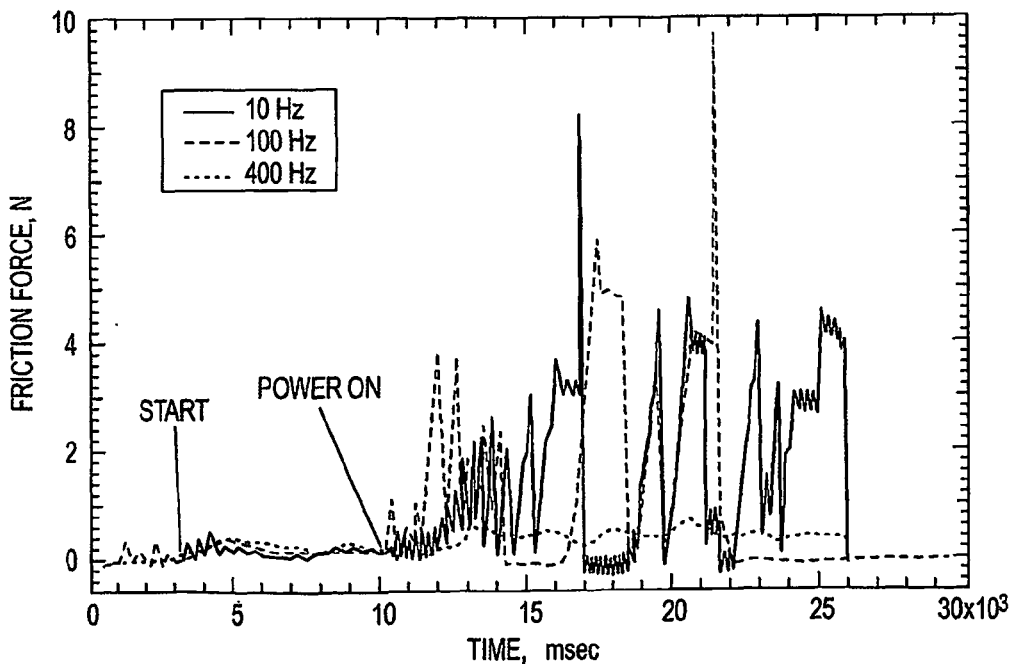
FIG. 76 shows a graph in which friction force, in units of Newtons, is plotted as a function of time, in units of milliseconds, for a stainless steel slider on an ice surface.

Measurements of frictional force between mixed ice and a stainless steel slider for AC voltages having a frequency of 10, 100 and 400 Hz are shown in FIG. 76, in which friction force, in units of Newtons ("N"), is plotted as a function of time, in units of milliseconds. The average frictional force without an applied voltage was 0.23 N. This force means that the friction coefficient between the ice and the slider was 0.12 in the absence of an electric field. The frictional force increased rapidly after the voltage was applied. The applied voltage was about 400 V at the time the power was turned "ON", that is, at about 10 msec. The frictional force with a frequency of 10 Hz averaged about 1.5 N, with a maximum of 8 N. The corresponding friction coefficient is 0.8. The friction showed a "stick and slip" feature during sliding when voltage was applied. The friction with a frequency of 100 Hz shows the behavior similar to that at 10 Hz. But, the friction with a frequency of 400 Hz was very different. The stick and slip feature disappeared. The frictional force with an applied electric field at 400 Hz was lower than that at 10 Hz and 100 Hz, having an average value of about 0.5 N.

Figure 77:
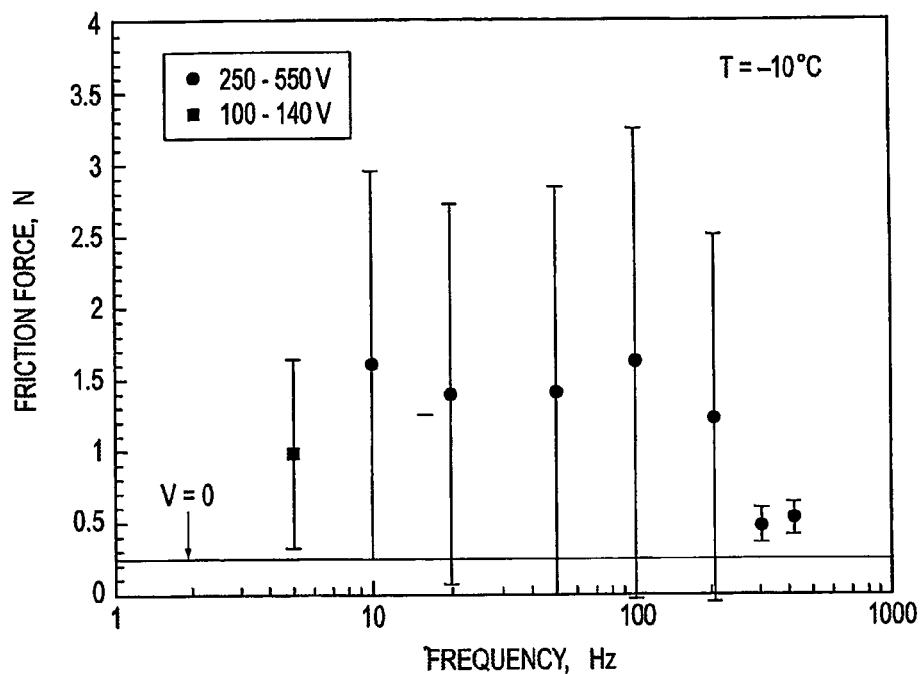
FIG. 77 shows a graph in which friction force, in units of Newtons, is plotted as a function of AC frequency at −10° C., for a stainless steel slider on an ice surface.

Friction force between mixed ice and a stainless steel slider at a temperature of −10° C. is plotted in the graph of FIG. 77 as a function of frequency. The measured applied voltage at 5 Hz was lower than at other frequencies because of the technical difficulty of inducing a high voltage at this frequency. As presented in Table 1, the applied voltages at the various frequencies were in a range of from 250 V to 550 V, except for a range of from 100 V to 140 V at 5 Hz. The solid square (5 Hz) and the solid circles indicate average friction force values. The bar associated with each square or circle designates the standard deviation of measured friction force at the corresponding frequency. The standard deviation is usually very large (about 1.5 N) because of the stick and slip feature. The straight horizontal line at a friction force value of about 0.25 N indicates the friction force between the ice and the slider when no voltage is applied. The average friction force was almost constant at about 1.5 N from 10 Hz to 200 Hz. The frictional force droped sharply at 300 Hz and the friction at 400 Hz is almost the same as that at 300 Hz.

Figure 78:
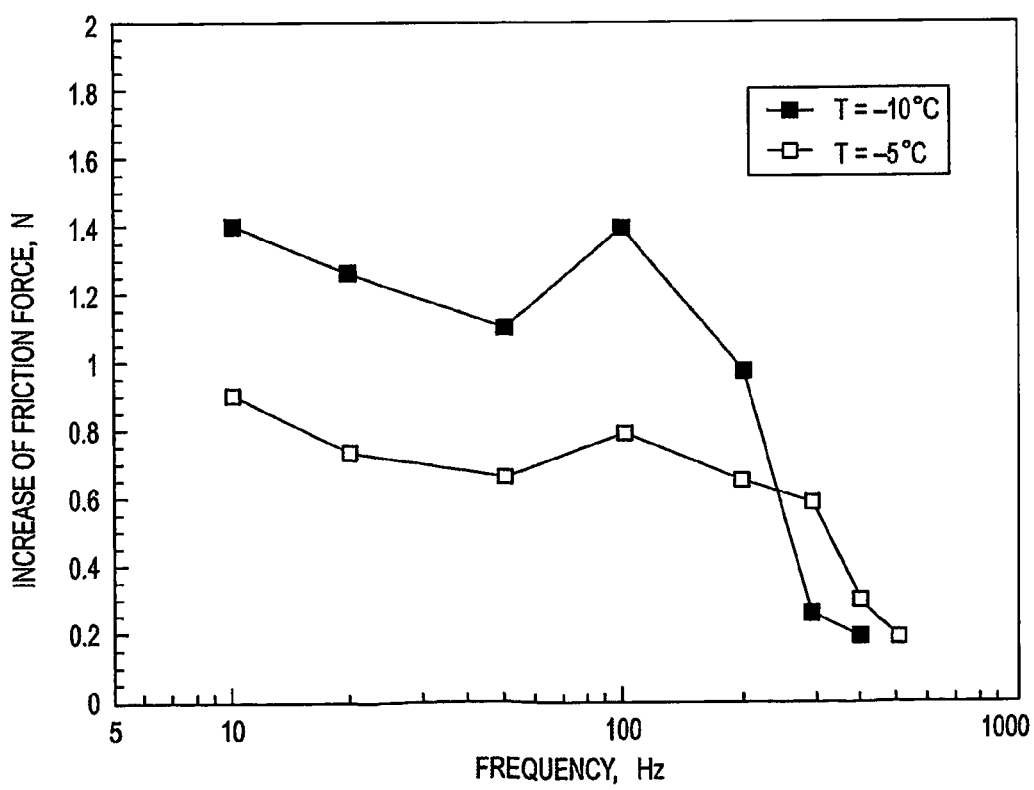
FIG. 78 shows a graph in which the increase of friction force is plotted as a function of frequency for a series of friction force measurements taken at two different temperatures, −5° C. and −10° C.

In the graph of FIG. 78, the increase of friction force is plotted as a function of frequency for a series of friction force measurements taken at two different temperatures, −5° C. and −10° C. The increase of friction force was calculated as the average friction force at an applied voltage minus the friction force present without an applied voltage. The solid squares represent increase of friction force at −10° C. The empty squares represent increase of friction force at −5° C. Comparison of the data in FIG. 78 clearly shows that the increase in frictional force at −10° C. is larger than at −5° C., but the friction force begins to drop significantly at frequencies greater than 200 Hz at both temperatures.

Example 11

An apparatus similar to that in Example 9 was used to measure the increase in friction force at the contact interface between a stainless steel slider and a layer of ice as both AC and DC applied voltages were gradually increased.

Figure 79:
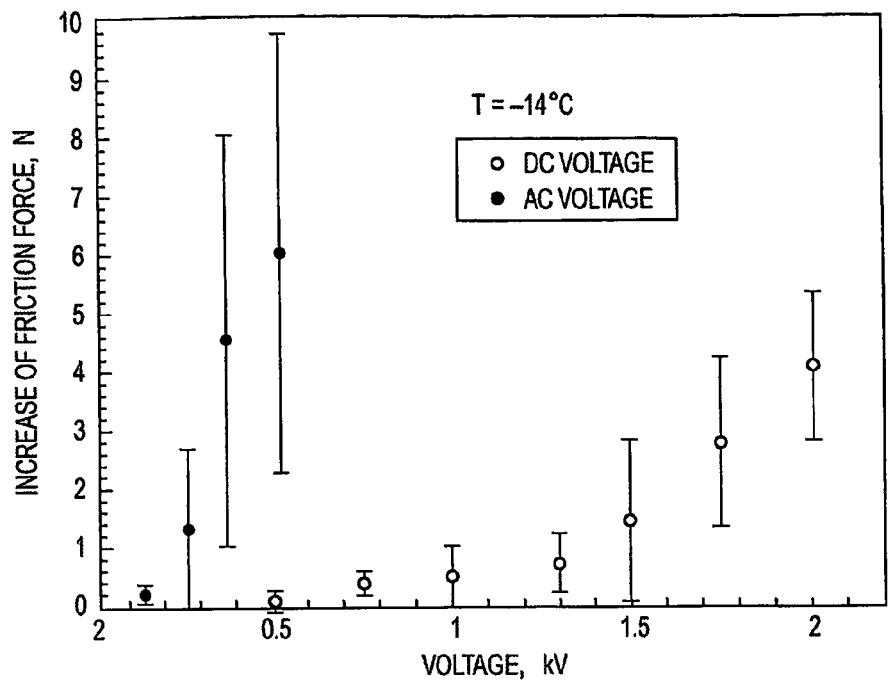
FIG. 79 shows a graph in which the increase in friction force, N, in units of Newtons, is plotted as a function of applied voltage, both AC and DC, in units of kilovolts, kV, for a stainless steel slider on ice.

Measurements were conducted at −14° C. FIG. 79 shows a graph in which the increase in friction force, in units of Newtons, is plotted as a function of applied voltage, in units of kilovolts, kV. The solid circles represent the average increase in friction force at a given applied AC voltage at 60 Hz. The bars associated with each plotted solid circle represent the standard deviation of measured increase in friction force at the corresponding AC voltage. Similarly, the hollow circles represent the average increase in friction force at a given applied DC voltage, and the bars associated with each plotted hollow circle represent the standard deviation of the of measured increase in friction force at the corresponding DC voltage. The plotted data indicate that AC voltage applied at the contact interface causes a greater increase in friction force than a DC voltage having the same magnitude. For example, an applied 60 Hz AC voltage of 0.5 kV resulted in an average increase in friction force of about 6.0 N. In contrast, an applied DC voltage of 0.5 kV caused virtually no increase in friction force. An applied DC voltage of 2.0 kV resulted in an average increase of friction force of approximately 4.0. The data indicate that use of only about 350 volts of AC voltage could achieve a similar friction force increase of 4 N. Thus, this example shows that an AC electric field at the contact interface causes a greater increase in friction force than a DC electric field of similar strength.

Example 12

An apparatus similar to that in Example 9 was set up to measure the friction force caused by an AC electric field at the contact interface between a conductive rubber disk and a layer of ice. The contact disc had a diameter of 40 mm and was made of conductive rubber, doped with carbon black and having a conductivity of about $10^{-4}$ S/cm. The sole of the rubber disc was polished by fine, No. 2000 grade sandpaper. The ice layer was made from mixed water having a resistivity of about $6 \times 10^5$ Ωcm. The water was frozen at $-10°$ C. gradually to make polycrystalline ice without bubbles, and the ice surface was finished by a microtome to make a plane surface without visible roughness. The ice layer had a thickness of 3 to 4 mm.

The X-Y plotter arm was moved at a constant speed of 0.33 cm/sec, which was the slider speed. One terminal of an AC power supply was connected to the conductive rubber contact disc of the slider, and a second terminal of the AC power supply was connected to the stainless steel plate beneath the ice. At a temperature of $-10°$ C., the slider was pulled without voltage for about 40 seconds. Then, a 60 Hz AC voltage of 1.1 kV was applied at the ice-metal contact interface. At the time of about 75 seconds, the applied voltage was turned "off". The electric signals from the force sensor during the time period 0 to 80-plus seconds were recorded using an A/D converter and converted into a measured friction force value.

Figure 80:
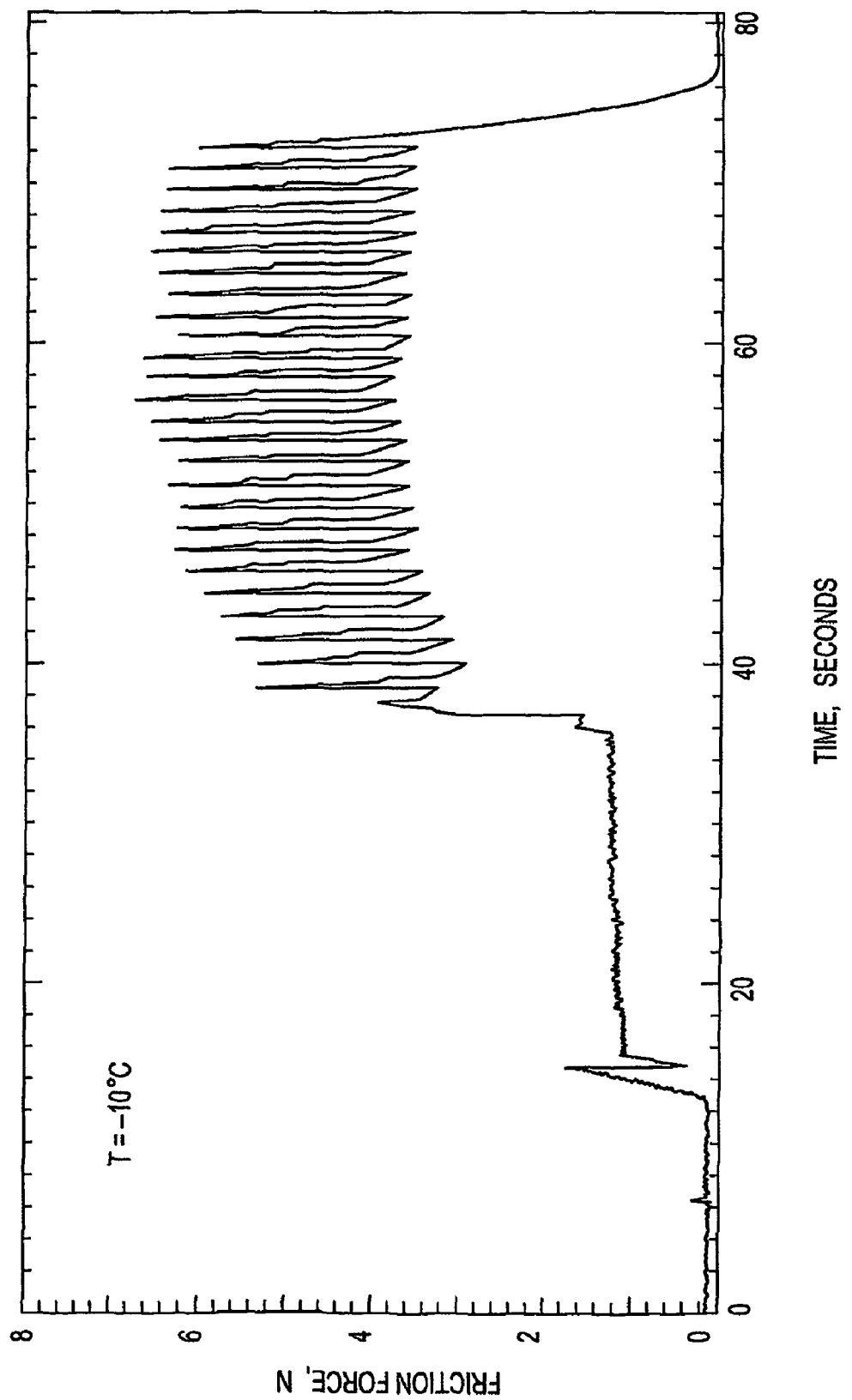
FIG. 80 shows a graph in which friction force, N, in units of Newtons, is plotted as a function of time, in units of seconds, for a conductive rubber slider on an ice surface.

FIG. 80 shows a graph in which friction force, in units of Newtons, is plotted as a function of time, in units of seconds. Friction force measured before application of the voltage indicates a kinetic friction force of about 1 N. The graph in FIG. 80 shows that application of 1.1 kV resulted in a significant increase in friction force, with maximum peaks exceeding 6.0 N, and an average measured value of about 4 N.

Example 13

Figure 81:
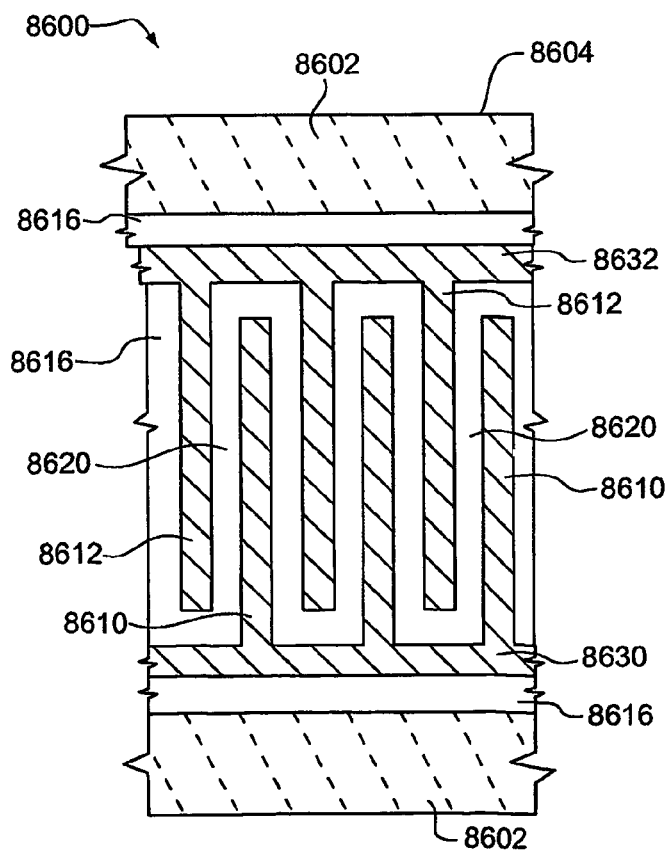
FIG. 81 depicts in diagrammatic form a section of interdigitated copper electrodes having narrow interelectrode spacings and located on the surface of a solid object.

A series of interdigitated electrodes were deposited on a nonconductive solid substrate using standard photolithographic techniques. FIG. 81 depicts in diagrammatic form a section 8600 of the bottom surface 8602 of a glass slider disk 8604. Interdigitated copper electrodes 8610, 8612 were formed using photolithography on Kapton film 8606. Kapton film 8606 was then attached to bottom surface 8602 for friction force measurements using the apparatus described in Example 9. Electrodes 8610, 8612 had a thickness of approximately 3 µm and a width of approximately 50 µm. Interelectrode spacings 8620, separating adjacent electrodes 8610, 8612, had a width of approximately 50 µm. A first terminal of the AC power source was connected to electrode stem 8630, and a second terminal of the power source was connected to electrode stem 8632. Thus, adjacent electrodes 8610, 8612 were oppositely polarized in accordance with the invention during the AC power cycles applied to the electrodes.

An AC voltage having a frequency of 60 Hz was applied to the electrodes. The applied voltage measured at the disk-ice contact interface variant arrange of from 25 to 50 volts. Friction force measurements indicated in increase in friction force at the contact interface of approximately 30 times the friction force presents in the absence of the electric field generated by the applied voltage. The measurements showed that a small interelectrode spacing between electrodes increases friction force at the solid-ice contact interface.

In embodiments in accordance with the invention, it is critical that the electric field at the contact interface be strong. Generally, the electric field has a value not less than 100 V/cm. A strong electric field, V/d, is generated in the system or a method in accordance with the invention by selecting the variables V or d accordingly. As shown in Example 13, when interelectrode spacing is narrow, a relatively low voltage achieves a large increase in friction. Preferably, the AC electric field has a value in a range of from 100 V/cm to $10^5$ V/cm.

Of course, an AC electric field greater than $10^5$ V/cm is useful when a very large increase in friction is desired and the values of the variables V or d can be selected accordingly. As shown by the data plotted in a graph of FIG. 79, an AC voltage applied to the electrodes to generate an AC electric field at the contact interface is more effective than a DC electric field to increase friction. Nevertheless, in certain circumstances, an embodiment in accordance with the invention in which DC voltage generates a DC electric field is useful. In such circumstances, if the interelectrode spacing exceeds one mm, then the applied DC voltage is greater than 1000 volts. In embodiments using DC voltage and having an interelectrode spacing less than one mm, the applied DC voltage may be less than 1000 volts. Nevertheless, when the interelectrode spacing is less than one cm, and especially if it is one mm or less, then formation of electrolysis gases at the closely spaced electrodes significantly decreases friction. The detrimental effect of electrolysis can be controlled by carefully selecting the applied DC voltage to keep formation of electrolysis at a minimum, while generating a sufficiently strong electric field to increase friction at the contact interface.

It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above apparatus and methods without departing from the scope of the invention, it is intended that all subject matter contained in the above description or shown in the accompanying drawing be interpreted as illustrative and not in a limiting sense. Consequently, the invention is to be construed as embracing each and every novel feature and novel combination of features present in or inherently possessed by the systems, methods and compositions described in the claims below and by their equivalents.

The invention claimed is:

1. A system for melting interfacial ice 132, comprising:
a first electrode 110, 412, 510, 610, 710, 810
a second electrode 114, 414, 514, 614, 714, 814, the first electrode and the second electrode defining an interelectrode space 116 between the first electrode and the second electrode, the first electrode and the second electrode defining an interelectrode distance that separates the first electrode and the second electrode;
an AC power source 120, 520, 974 for providing an AC voltage across the first and second electrodes having a frequency greater than 100 Hz.

2. A system as in claim 1, wherein the AC power source provides an AC voltage in a range of about from 10 volts to 500 volts.

3. A system as in claim 1, further comprising an electrical insulator 112, 512, 712, 812, 813, 972 located in the interelectrode space.

4. A system as in claim 3, wherein the insulator comprises a nonconductive rubber windshield wiper blade 712, 813.

5. A system as in claim 1, wherein the interfacial ice 132 is located in the interelectrode space 116.

6. A system as in claim 1, wherein the interelectrode distance has a value in a range of about from 50 µm to 500 µm.

7. A system as in claim 1, wherein the interelectrode distance has a value less than 50 µm.

8. A system as in claim 1, wherein the interelectrode distance has a value greater than 500 µm.

9. A system as in claim 1, wherein the first electrode comprises a layer of conductive glass 110, 510.

10. A system as in claim 1, wherein the second electrode 114 comprises a layer of conductive glass.

11. A system as in claim 1, wherein the first electrode 110 comprises a transparent conductive metal oxide 304.

12. A system as in claim 1, wherein the first electrode comprises a conductive grid.

13. A system as in claim 1, wherein the second electrode comprises a conductive grid 304.

14. A system as in claim 1, wherein the first and second electrodes 412, 414, 960 are interdigitated.

15. A system as in claim 1, wherein the second electrode comprises a conductive rubber windshield wiper blade 514.

16. A freezer system 2700 for melting ice in a freezer, comprising:
 a freezer including a housing 2701;
 a first movable electrode 2702;
 a second electrode 2704, the first movable electrode 2702 movable for forming an interelectrode space 2706 to accommodate a freezer package between the first movable electrode and the second electrode; and
 an AC power source 2710 for providing an AC voltage across the first and second electrodes with a frequency not less than about 1000 Hz.

17. A system as in claim 16, wherein the second electrode 2704 is a movable electrode.

18. A system 2300 for melting ice, comprising:
 a first electrode 2302;
 a second electrode 2304, the first electrode and the second electrode defining an interelectrode space 2306 between the first electrode and the second electrode;
 a conductive layer 2364 located in the interelectrode space and proximate to the ice, the conductive layer being electrically insulated from the first and second electrodes and from ice;
 an AC power source 2310 for providing an AC voltage across the first and second electrodes with a frequency not less than about 1000 Hz.

19. A system as in claim 18, further comprising an outer dielectric film 2363 that electrically insulates the conductive layer from the first and second electrodes and from ice.

20. A system as in claim 18, wherein the AC voltage has a frequency in a range of about from 10 kHz to 30 kHz.

21. A system as in claim 18, wherein the AC voltage has an amplitude in a range of about from 10 V to 10 kV.

22. A system of melting and preventing ice using a high-frequency electric field, comprising:
 a first electrode;
 a second electrode, the first electrode and the second electrode separated by an interelectrode distance in a range of about from 100 µm to 2 cm;
 an interelectrode space defined by the first electrode and the second electrode and located between the first electrode and the second electrode;
 a power source for providing an AC voltage across the first electrode and the second electrode with a frequency not less than 100 Hz.

23. A system as in claim 22, further comprising a plurality of first electrodes and a plurality of second electrodes, wherein the first electrodes alternate with the second electrodes, and wherein the interelectrode distance between adjacent first and second electrodes is in a range of about from 100 µm to 2 cm.

24. A system as in claim 23, wherein the first electrodes and the second electrodes are interdigitated.

25. A system as in claim 23, wherein the first and second electrodes are disposed on a surface of a solid object.

26. A system as in claim 25, wherein the solid object is selected from the group consisting of: a cooling coil, a heat exchanger, an interior of a freezer, an external surface of an aircraft, an external surface of a ship, and a transportation surface.

27. A system as in claim 23, wherein the first electrodes and the second electrodes include heat exchanger fins.

28. A system as in claim 27, wherein each side surface of first electrode fins and second electrode fins has a surface area in a range of about from 1 $cm^2$ to 100 $cm^2$.

29. A system as in claim 23, wherein the first electrodes are physically connected to a cooling coil and are electrically connected to ground, and the second electrodes are electrically connected to the AC power source.

30. A system as in claim 23, wherein the AC power source provides a voltage in a range of about 250 volts (rms) to 2.5 kV (rms).

31. A system as in claim 23, wherein the AC power source generates an alternating electric field in a plurality of interelectrode spaces having a field strength in a range of about from 100 V/cm to 100 kV/cm.

32. A system as in claim 22, wherein the AC power source provides a voltage having a frequency in a range of about from 100 Hz to 100 MHz.

33. A system as in claim 22, wherein the AC power source provides power in a range of about from 1 $W/m^2$ to 50 $kW/m^2$ of protected surface area.

* * * * *

UNITED STATES PATENT AND TRADEMARK OFFICE
CERTIFICATE OF CORRECTION

PATENT NO.        : 7,883,609 B2
APPLICATION NO.   : 10/466940
DATED             : February 8, 2011
INVENTOR(S)       : Victor Petrenko et al.

It is certified that error appears in the above-identified patent and that said Letters Patent is hereby corrected as shown below:

Column 6, Line 43, "to to be" should read --to be--;
Column 12, Line 49, "land-base sure" should read --land-based surface--;
  Line 51, "land-base" should read --land-based--; Line 61, "C., and" should read --C, and--;
Column 13, Lines 28 and 33, each instance of "C." should read --C--;
Column 32, Line 24, "fist electrode" should read --first electrode--;
Column 34, Line 44, "Joule heat" should read --Joule heat. --;
Column 38, Line 6, "is present" should read --is present.--; Line 14, "within it" should read --within it.--;

Column 44, Line 26, "tan ∈" should read --tan δ--;
Column 48, Line 14, "present" should read --present.--; Line 52, "and and" should read --and--;
Column 59, Line 59, "or close" should read --are close--;
Column 62, Line 35, "apart" should read --a part--;
Column 64, Line 20, "base surface" should read --based surface--;
Column 68, Line 2, "The data show" should read --The data shows--;
Column 76, Line 9, "not important, The" should read --not important. The--;
  Line 41, "solid object" should read --solid object.--;
Column 78, Line 29, "adjacent to it" should read --adjacent to it.--;

Signed and Sealed this
Tenth Day of May, 2011

David J. Kappos
*Director of the United States Patent and Trademark Office*